US009403261B2

(12) United States Patent
Weinberger et al.

(10) Patent No.: US 9,403,261 B2
(45) Date of Patent: Aug. 2, 2016

(54) SCRAPER ASSEMBLY

(71) Applicant: MIW Associates, LLC, Havertown, PA (US)

(72) Inventors: Marvin Weinberger, Havertown, PA (US); Tucker J. Marion, Holliston, MA (US)

(73) Assignee: MIW ASSOCIATES, LLC, Havertown, PA (US)

( * ) Notice: Subject to any disclaimer, the term of this patent is extended or adjusted under 35 U.S.C. 154(b) by 134 days.

(21) Appl. No.: 14/175,287

(22) Filed: Feb. 7, 2014

(65) Prior Publication Data

US 2014/0206267 A1 Jul. 24, 2014

Related U.S. Application Data

(62) Division of application No. 13/195,693, filed on Aug. 1, 2011, now Pat. No. 8,683,641.

(60) Provisional application No. 61/369,424, filed on Jul. 30, 2010, provisional application No. 61/369,449, filed on Jul. 30, 2010, provisional application No. 61/369,487, filed on Jul. 30, 2010.

(51) Int. Cl.
*A47L 13/06* (2006.01)
*A46B 15/00* (2006.01)
(Continued)

(52) U.S. Cl.
CPC .............. *B24D 15/02* (2013.01); *A46B 5/0012* (2013.01); *A46B 5/0062* (2013.01);
(Continued)

(58) Field of Classification Search
CPC .............. A46B 3/00; A46B 3/06; A46B 9/00;
A46B 15/00; A46B 2200/3093; A47L 13/06;
A46D 1/00; A46D 1/02; A46D 1/0207;
A46D 1/0284; A46D 1/0292
USPC ................................ 15/197, 198, 200, 207.2
See application file for complete search history.

(56) References Cited

U.S. PATENT DOCUMENTS

| 99,475 A | 2/1870 | Rhindelander |
| 681,707 A | 9/1901 | Johnson |

(Continued)

FOREIGN PATENT DOCUMENTS

| JP | 3-242111 | * 10/1991 |
| JP | 2008-206798 | * 9/2008 |

OTHER PUBLICATIONS

Swieskowski, Design and Application of Stranded Wire Springs, Spring Manufacturers Institute, Springs, Spring 2000, vol. 39, No. 2, pp. 65-69. (http://www.smihq.org/public/publications/springsmag_archive/Springs_2000Vol_39_No2/index.html).

(Continued)

*Primary Examiner* — Mark Spisich
(74) *Attorney, Agent, or Firm* — Duane Morris LLP

(57) ABSTRACT

The invention pertains to a novel scraper assembly having a plurality of interchangeable scraper heads and handles and corresponding method for use. The scraper assembly further comprises a plurality of abrasive mechanisms, namely spring bristles, coiled springs, chainmail abraders and wire cloth abraders capable of effectively cleaning a surface without scoring or otherwise damaging the surface. The invention may be particularly useful for cleaning grills and ovens. Additionally, the invention may also be useful for shaping, adding texture to, stripping materials from or otherwise preparing a surface, including wood, metal or ceramic surfaces.

21 Claims, 45 Drawing Sheets

(51) Int. Cl.
  *A46D 1/00* (2006.01)
  *B24D 15/02* (2006.01)
  *A47J 43/28* (2006.01)
  *A47L 13/08* (2006.01)
  *B08B 1/00* (2006.01)
  *A46B 5/00* (2006.01)
  *A46B 11/00* (2006.01)

(52) U.S. Cl.
  CPC ............. *A46B 15/0081* (2013.01); *A46D 1/02* (2013.01); *A46D 1/0207* (2013.01); *A47J 43/288* (2013.01); *A47L 13/06* (2013.01); *A47L 13/08* (2013.01); *B08B 1/00* (2013.01); *A46B 5/0095* (2013.01); *A46B 11/002* (2013.01); *A46B 2200/3033* (2013.01); *A46B 2200/3093* (2013.01); *Y10T 29/4561* (2015.01); *Y10T 29/4594* (2015.01)

(56) References Cited

U.S. PATENT DOCUMENTS

| | | | |
|---|---|---|---|
| 921,136 A | 5/1909 | Marsolais | |
| 1,493,670 A * | 5/1924 | Galvin | A46B 7/10 15/179 |
| 1,903,520 A | 4/1933 | Sturgis | |
| 2,100,138 A | 11/1937 | Heldt | |
| 2,140,578 A | 12/1938 | Goodloe | |
| 2,599,271 A | 6/1952 | Michel | |
| 3,055,034 A * | 9/1962 | Halg | A46B 7/04 15/194 |
| 3,284,833 A | 11/1966 | Von Tersch et al. | |
| 3,583,020 A * | 6/1971 | Bateman | A46D 1/00 15/198 |
| 3,696,563 A * | 10/1972 | Rands | B24D 18/00 15/197 |
| 3,969,090 A * | 7/1976 | Sasena | B24D 13/10 15/198 |
| 4,071,983 A | 2/1978 | Thielen | |
| 4,091,579 A | 5/1978 | Giangiulio | |
| 4,473,217 A | 9/1984 | Hashimoto | |
| 4,534,080 A * | 8/1985 | Young | A46B 7/04 15/104.066 |
| 4,925,516 A | 5/1990 | Phillips et al. | |
| 4,936,055 A | 6/1990 | Ishihara | |
| 5,098,493 A | 3/1992 | Taylor | |
| 5,511,241 A | 4/1996 | Ziegler | |
| 5,581,840 A | 12/1996 | Chen | |
| 5,735,014 A | 4/1998 | Noga | |
| 6,725,492 B2 | 4/2004 | Moore et al. | |
| 6,944,899 B2 | 9/2005 | Gladney | |
| 7,044,560 B1 | 5/2006 | Miller et al. | |
| 8,225,451 B2 | 7/2012 | Weinberger et al. | |
| 8,683,641 B2 | 4/2014 | Weinberger et al. | |
| 8,870,630 B2 | 10/2014 | Weinberger et al. | |
| 2003/0019059 A1 | 1/2003 | Rooke | |
| 2006/0016034 A1 | 1/2006 | Hillenbrand | |
| 2007/0157945 A1 | 7/2007 | Lhoyer et al. | |
| 2009/0188061 A1 | 7/2009 | Cybulski et al. | |
| 2012/0028551 A1 | 2/2012 | Weinberger et al. | |
| 2012/0028554 A1 | 2/2012 | Weinberger et al. | |

OTHER PUBLICATIONS

MSU Libraries, Digital Collections, The Historic American Cookbook Project, Museum Objects, "Feeding America".
McMaster-Carr, "About Wire Rote", p. 1390 (catalog).
http://www.spring-makers-resource.net/compression-springs.html, Spring-Makers Resource.net, "Compression Springs and Other Sprint Types".
http://home.earthlink.net/-bazillion/types.html, "Other Types of Springs".
http://www.latchandbatchelor.co.uklrope-info/rope-components/, Latch & Batchelor L TO, "Wire Rope for Every Application."
http://www.eng-tips.com/viewthread.cfm?qid=94102&page=8, Spring Engineering Forum discussion thread, israelkk (Aerospace), May 10, 2004(10:12).
Images of coil wire rope used in firearms retrieved from Glocktalk. com public forum.
Response to Non-final Office Action filed in connection with U.S. Appl. No. 13/195,690, Aug. 4, 2015, 8 pages.
In the United States Patent and Trademark Office: Notice of Allowance issued in connection with U.S. Appl. No. 13/195,690, Aug. 26, 2015, 7 pages.

* cited by examiner

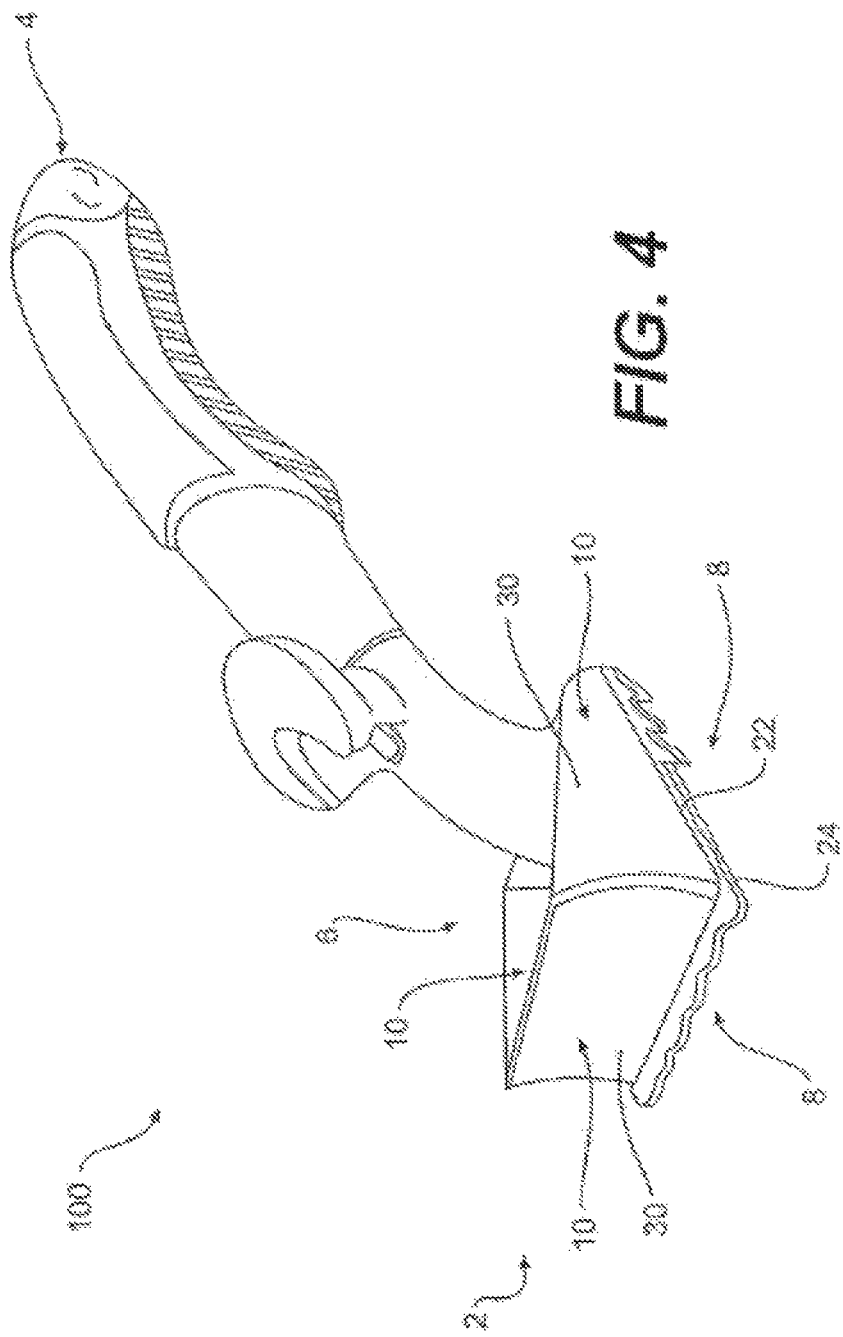

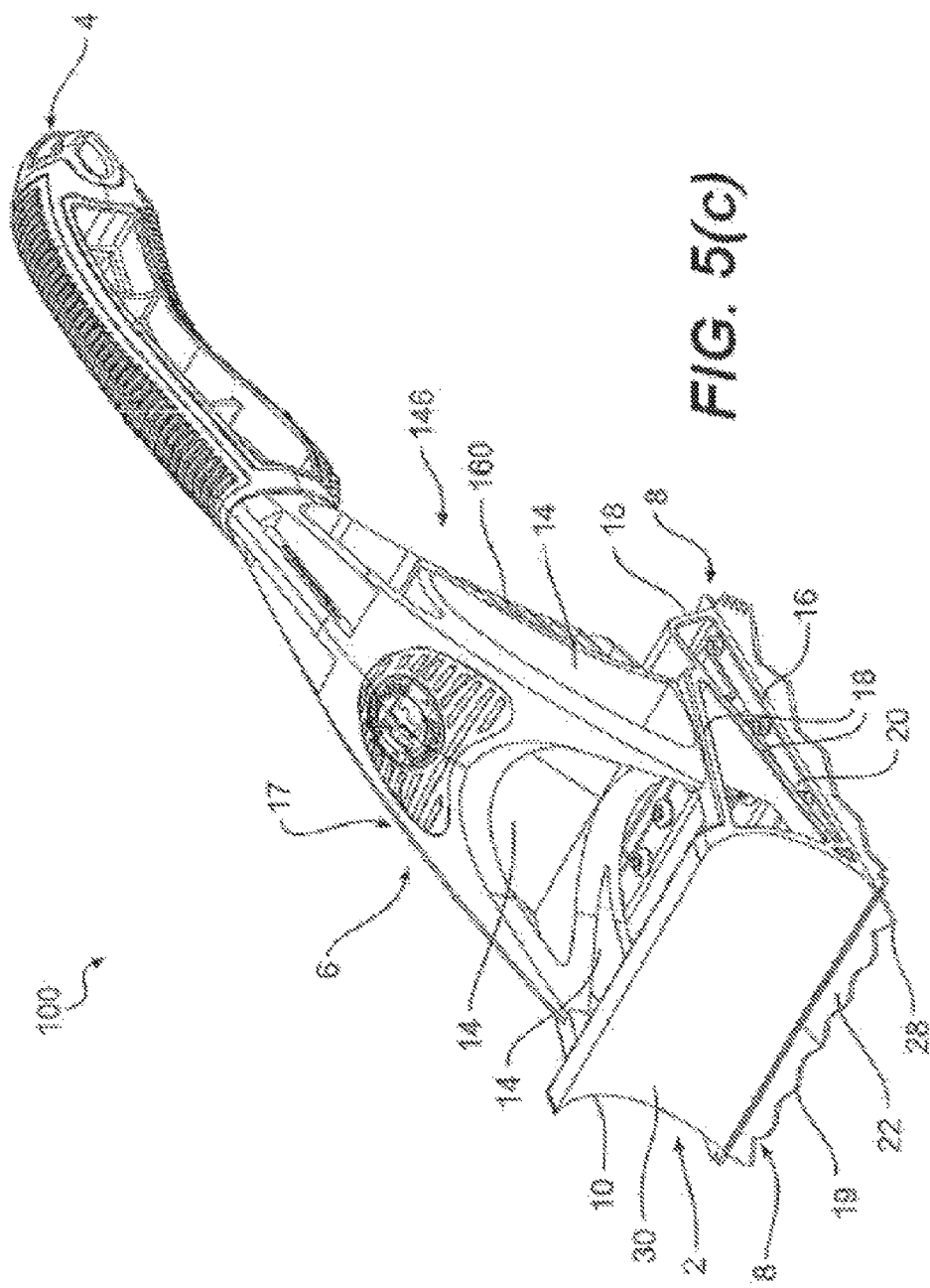

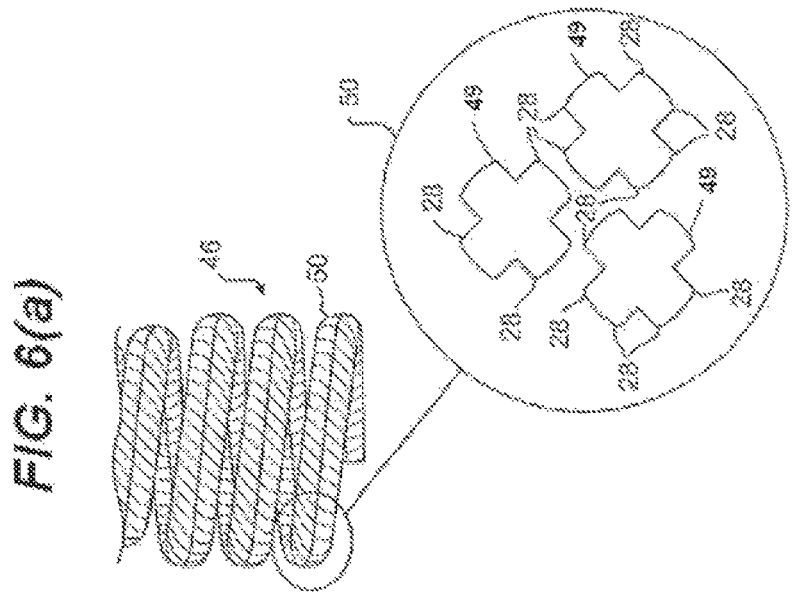
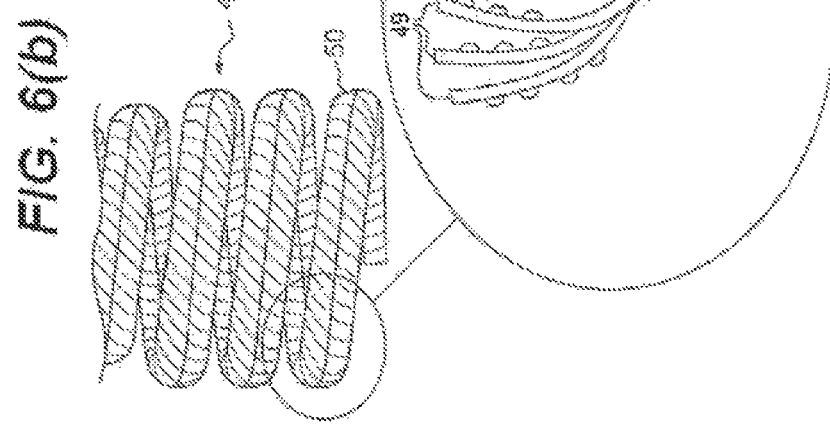
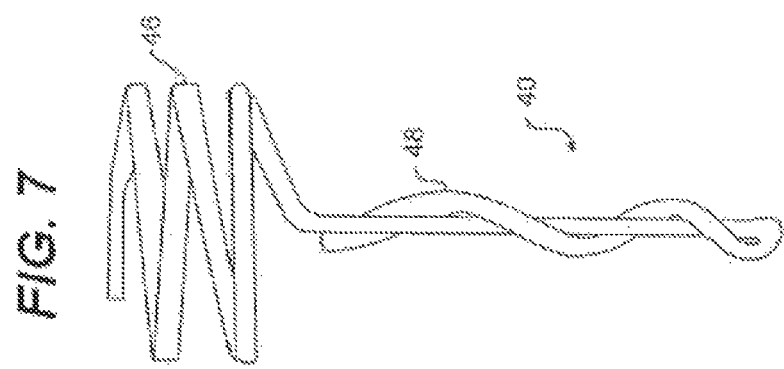

FIG. 8
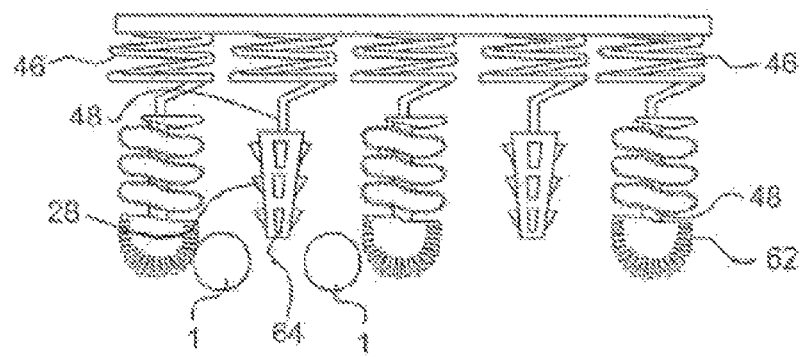
FIG. 9(a)  FIG. 9(b)  FIG. 11
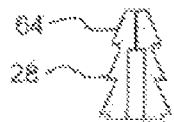 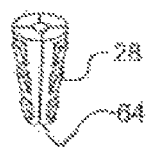 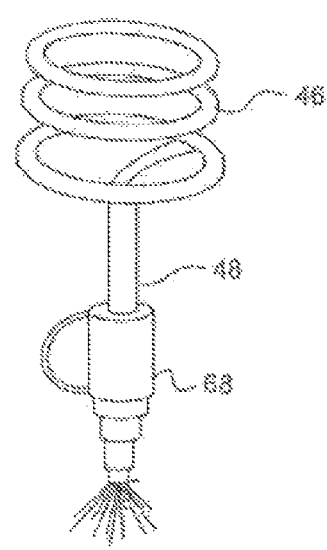
FIG. 10(a)  FIG. 10(b)
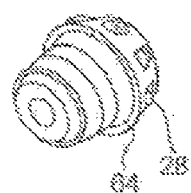 

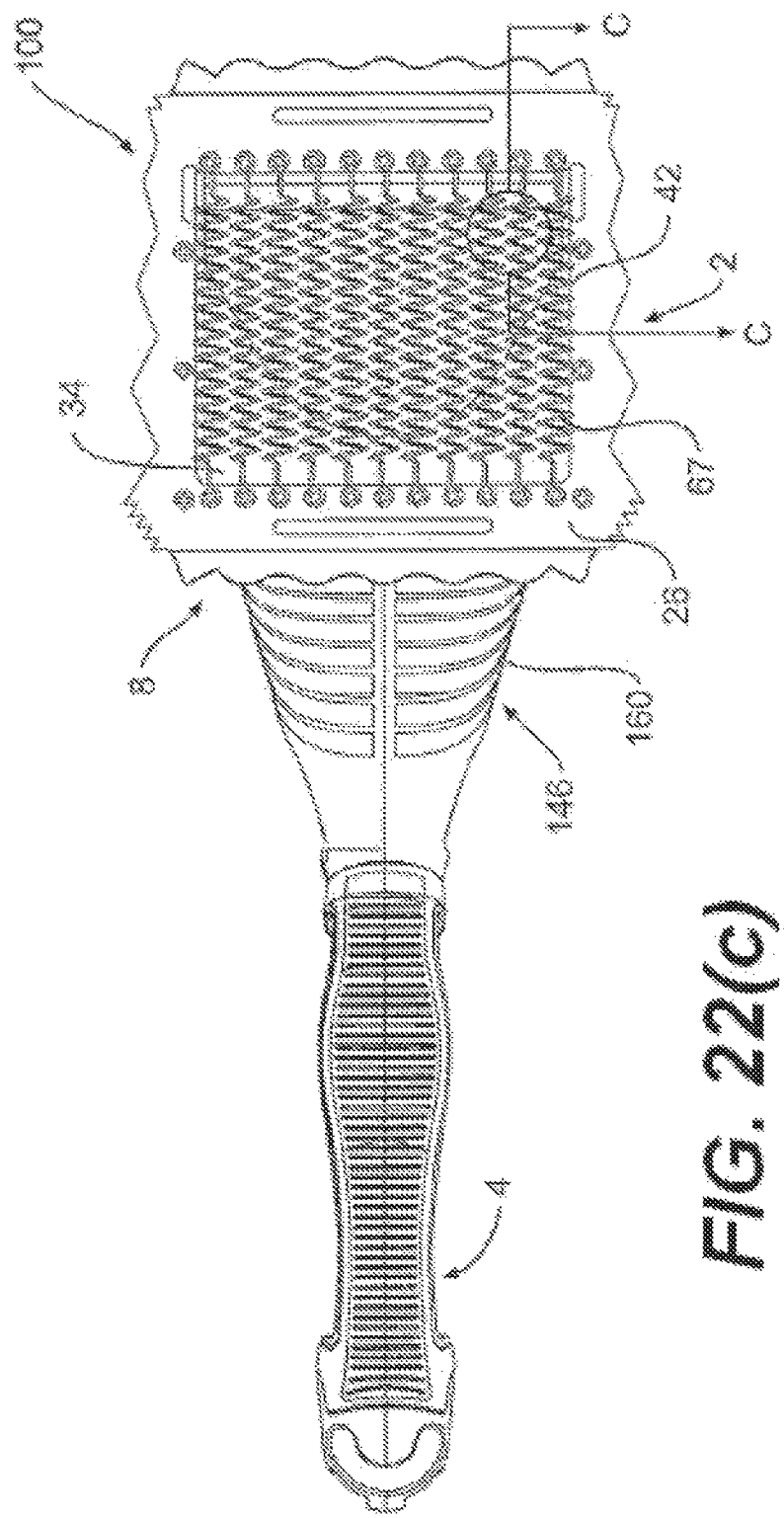

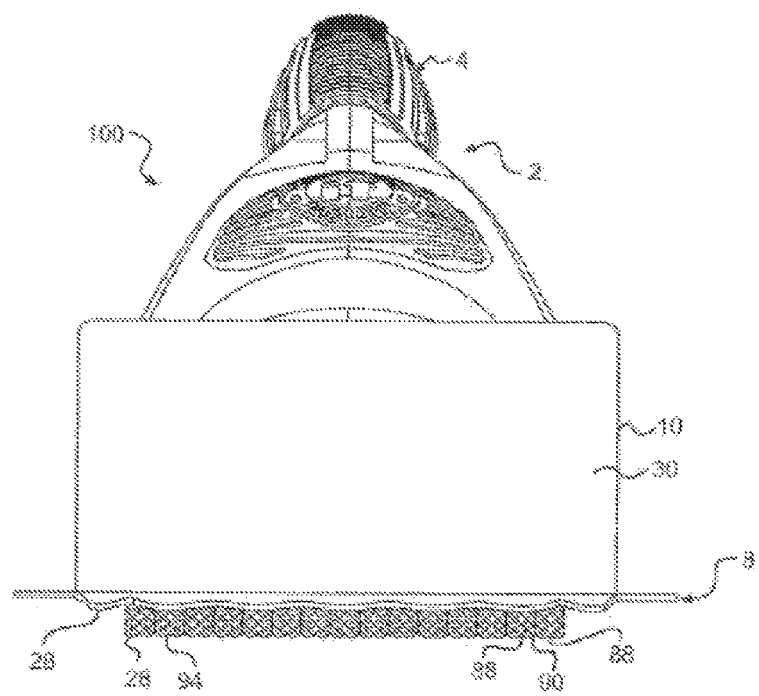
FIG. 30(d)
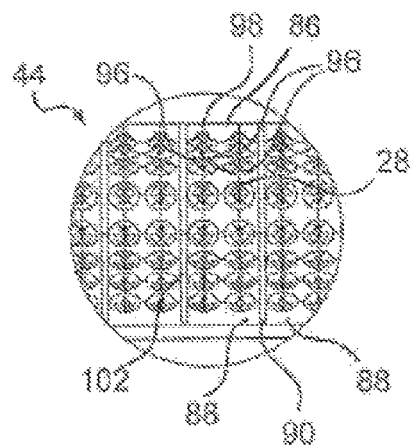 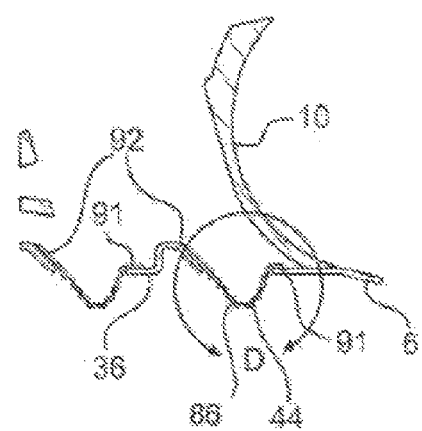
FIG. 30(e)　　　FIG. 30(f)

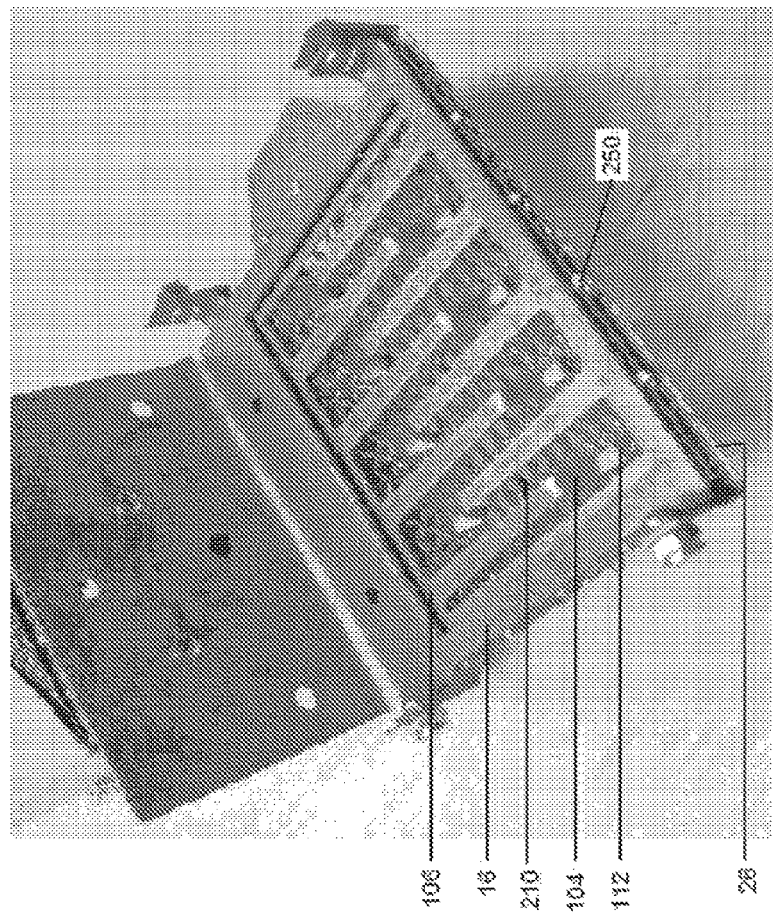
FIG. 33(d)
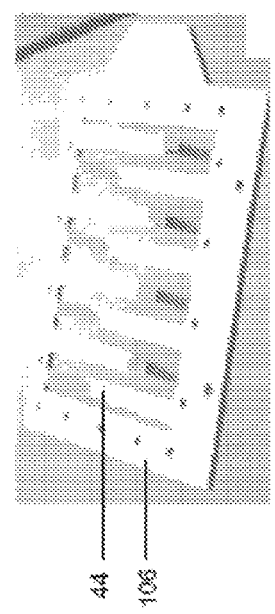
FIG. 33(c)
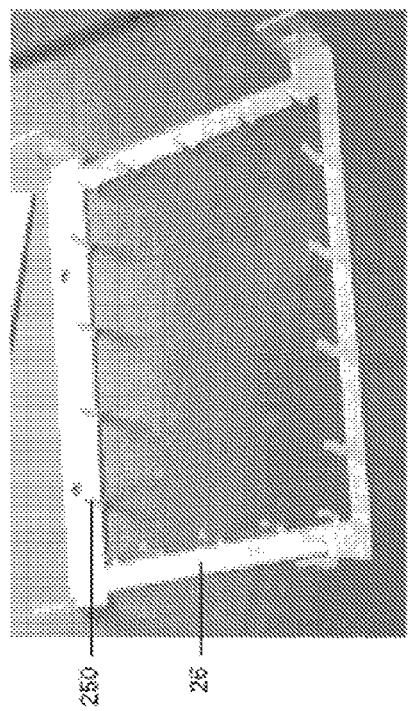

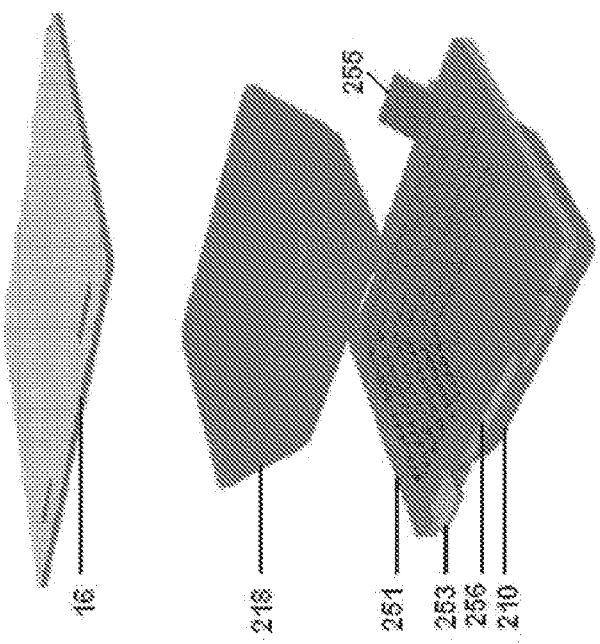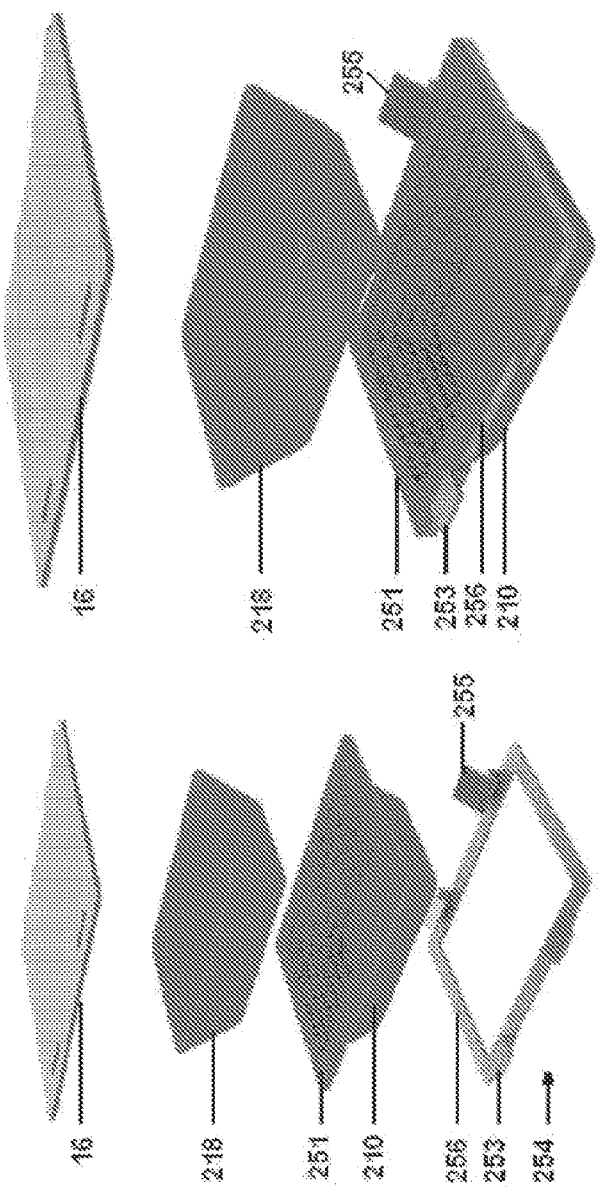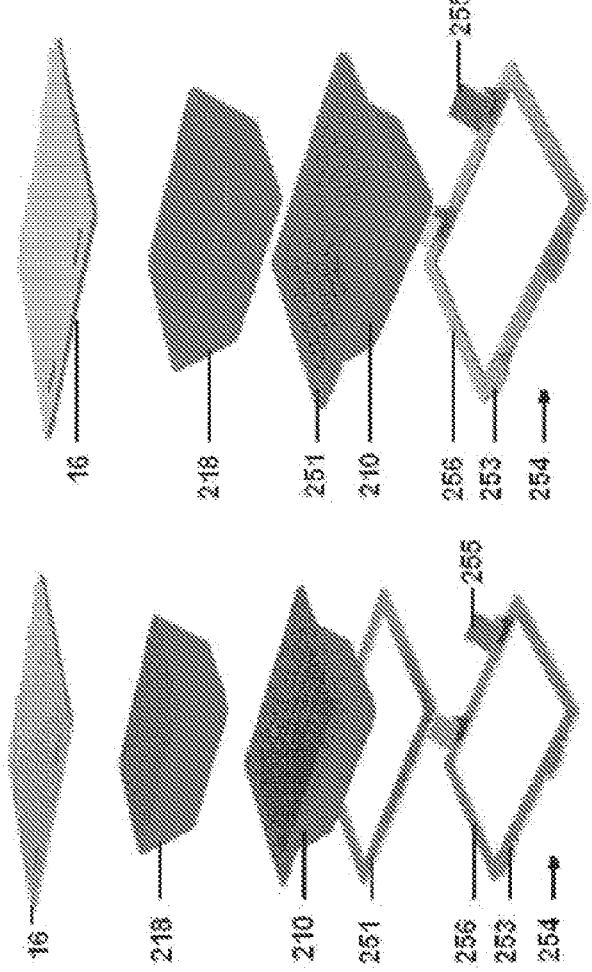

FIG. 39(a)
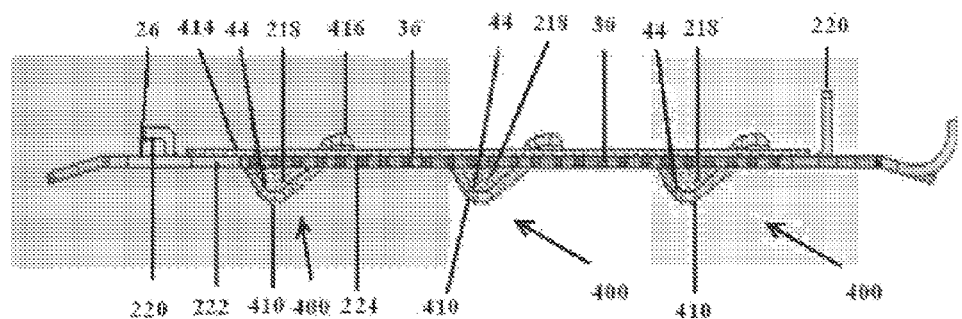

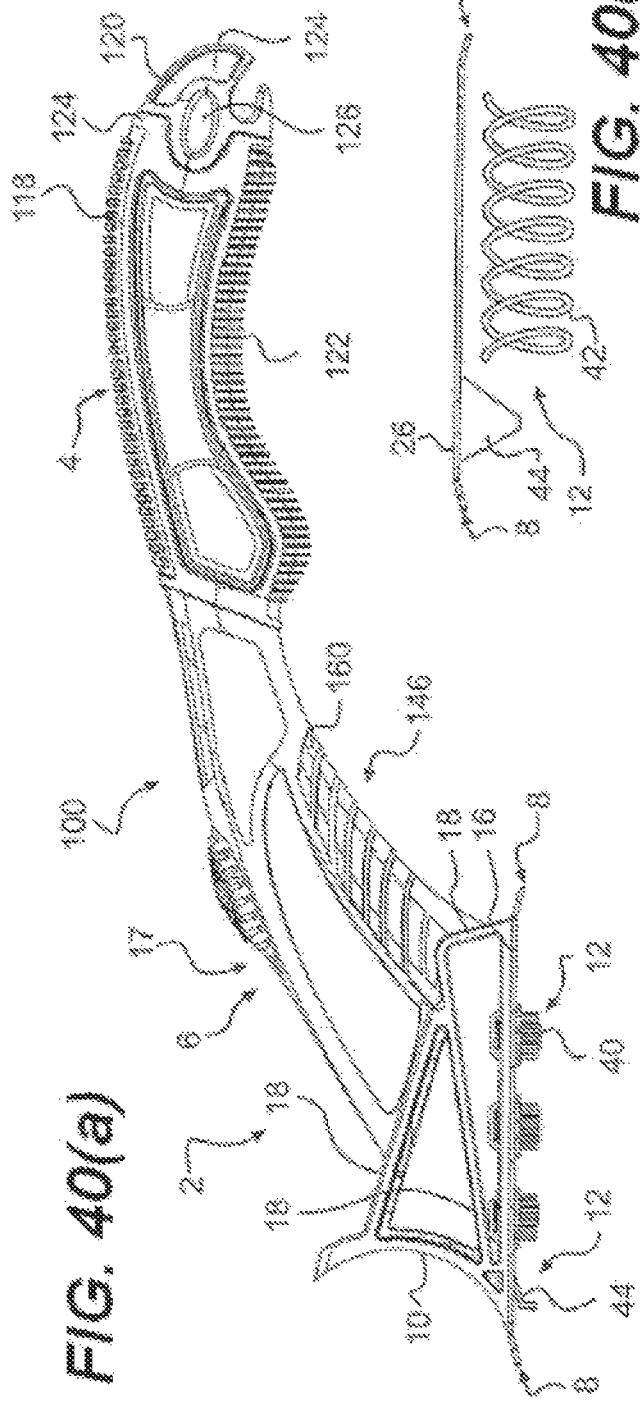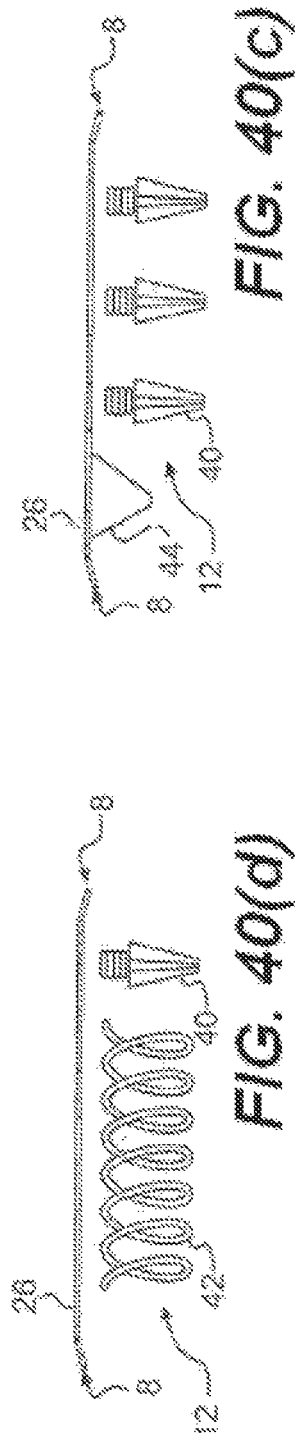

SCRAPER ASSEMBLY

CROSS-REFERENCE TO RELATED APPLICATIONS

This application is a divisional application of U.S. patent application Ser. No. 13/195,693 filed Aug. 1, 2011, now U.S. Pat. No. 8,683,641 the entire disclosure of which is herein incorporated by reference in its entirety. U.S. patent application Ser. No. 13/195,693 is a non-provisional of and claims the benefit of U.S. Provisional Patent Application Nos. 61/369,424 filed on Jul. 30, 2010; 61/369,449 filed on Jul. 30, 2010 and 61/369,487 filed on Jul. 30, 2010; the entire disclosures of which are herein incorporated by reference in their entirety.

BACKGROUND OF THE INVENTION

1. Field of the Invention

This invention relates generally to the field of scrapers, particularly scraper assemblies useful for cleaning.

2. Description of the Related Technology

The adequate sterilization of grate cooking surfaces, such as grills and ovens, is essential to proper food preparation and maintaining one's health and well-being. Ideally, cooking surfaces should be regularly cleaned before and after usage to remove any food particles or debris that may contaminate the cooking surface and propagate bacteria. Regular cleaning can also prolong the lifespan of cooking surfaces and kitchen appliances.

Conventional brushes that have wire or plastic bristles have few abrasive surfaces, lack durability, and are difficult to clean. Typically, the only abrasive surfaces of these brushes are the bristles tips, which lack resilience and quickly become permanently deformed with repeated use. The inelastic properties of the bristles render them subject to fracture and a high failure rate. Additionally, conventional brushes have a number of crevices and tightly packed bristles that are difficult to clean. Food particles and bacteria accumulate in these crevices and between bristles, which is unsanitary and contributes to brush degradation. Furthermore, conventional bristle brushes are ineffective in removing substances from grate cooking surfaces and tend to scratch these delicate surfaces in the course of cleaning.

In view of the deficiencies, there is a need to develop a more effective device for cleaning a grate cooking surface. In particular, there is a need to develop a scraper having an improved abrasive surface to efficiently and effectively clean a grate cooking surface.

SUMMARY OF THE INVENTION

Accordingly, the invention is directed to an improved scraper and method for using the scraper to abrade a surface. In a first aspect, the invention is directed to a scraper for use in abrading a surface including a handle attached to a scraper head. The scraper head has chainmail abrader mounted to a frame. The chainmail abrader includes a chainmail body constructed from a plurality of interlinked rings and an elastic member positioned adjacent to the chainmail body such that the elastic member is capable of applying pressure against the chainmail body enabling the chainmail body to resiliently conform to the contours of the surface.

In a second aspect, the invention is directed to a scraper for use in abrading a surface including a handle attached to a scraper head. The scraper head has a chainmail abrader mounted to the frame. The chainmail abrader includes a chainmail body constructed from a plurality of interlinked rings and a back pressure means positioned adjacent to the chainmail body such that the back pressure means is capable of applying pressure against the chainmail body enabling the chainmail body to resiliently conform to the contours of the surface.

In a third aspect, the invention is directed to an apparatus including a wire cloth constructed from wire ropes that are knitted or woven together, wherein the wire ropes are constructed from one or more strands and wherein each strand is constructed from two or more wires.

In a fourth aspect, the invention is directed to a scraper for use in abrading a surface including a handle and a scraper head. The scraper head as has a wire cloth abrader mounted to a frame. The wire cloth abrader includes a wire cloth body constructed from wire ropes that are knitted or woven together, wherein the wire ropes are constructed from one or more strands and wherein each strand is constructed from two or more wires and a backpressure means positioned adjacent to the wire cloth body, wherein the back pressure means is capable of applying pressure against the wire cloth body enabling the wire cloth body to resiliently conform to the contours of the surface.

In a fifth aspect, the invention is directed to an apparatus for use in abrading a surface including a handle and a scraper head. The scraper head as has a frame attached to a coiled spring constructed from wire rope and adapted to abrade a surface. The wire rope used to construct the coiled spring includes one or more strands and wherein each strand is constructed from one or more wires.

In a sixth aspect, the invention is directed to an apparatus for use in abrading a surface including a handle and a scraper head. The scraper head as has a frame attached to a bristle constructed from wire rope. The wire rope used to construct the bristle comprises one or more strands, wherein each strand comprises two or more wires.

In a seventh aspect, the invention is directed to an apparatus for use in abrading a surface including a handle and a scraper head. The scraper head as has a frame attached to a coiled spring and a bristle. The coiled spring and the bristle are each constructed from wire rope, which is constructed from one or more strands, wherein each strand comprises two or more wires.

In an eighth aspect, the invention is directed to an apparatus including a coiled spring constructed from wire rope, wherein the wire rope is constructed from one or more strands and wherein at least one of the strands is constructed from nineteen or more wires. The coiled spring has a spring constant of about 15 N/m to about 90 N/m.

BRIEF DESCRIPTION OF THE DRAWINGS

FIG. 1(*b*) is a perspective view of the scraper head of FIG. 1(*a*).

FIG. 4 is a perspective view of a scraper assembly embodiment having a plow shield.

FIG. 6(a) is a perspective side view and cross-sectional view of one embodiment of a spring bristle suspension mechanism constructed from wire rope.

FIG. 6(b) is a perspective side view and cross-sectional view of another embodiment of a spring bristle suspension mechanism constructed from wire rope.

FIG. 7 is a side view of another spring bristle embodiment.

FIG. 8 is a side view of two different spring bristle embodiments.

FIG. 9(a) is a cross-section of the sheath of FIG. 9(b).

FIG. 9(b) is a perspective view of a spring bristle sheath.

FIG. 10(a) is a perspective rear view of another spring bristle sheath.

FIG. 10(b) is a perspective view of the sheath of FIG. 10(a).

FIG. 11 is a perspective view of a spring tip embodiment.

FIG. 22(c) is a bottom view of FIG. 22(a).

FIG. 30(d) is a front view of FIG. 30(a).

FIG. 30(e) is a close-up of the flat spring of FIG. 30(a).

FIG. 30(f) is a cross-section of the flat spring of FIG. 30(a).

FIG. 33(c) illustrates the assembly of a flat spring base relative to the modular frame component using the mounting means of FIG. 33(a).

FIG. 33(d) is a perspective top view of the assembled mounting means of FIG. 33(a).

FIG. 35(a) is a schematic diagram showing a scraper head frame and another assembly for retaining a chainmail body between a back pressure means and a positioning frame.

FIG. 35(b) shows the assembly of FIG. 35(a) once the plastic frame is welded to the chainmail body.

FIG. 35(c) shows the assembly of FIG. 35(a) once the plastic frame welded chainmail body is coupled to the positioning frame.

FIG. 39(a) is a side view of another wire cloth abrader embodiment attached to a modular frame component.

FIG. 39(b) is a bottom view of a portion of the wire cloth abrader of FIG. 39(a).

FIG. 40(a) is a side view of one scraper assembly of the present invention including a spring bristle and flat spring in accordance with an embodiment of the present invention.

FIG. 40(b) is a perspective view showing a flat spring and coiled spring mounted to a modular frame that may be interchangeably mounted to the scraper assembly of FIG. 40(a).

FIG. 40(c) is a perspective view showing a flat spring and spring bristles mounted to a modular frame that may be interchangeably mounted to the scraper assembly of FIG. 40(a).

FIG. 40(d) is a perspective view showing a coiled spring and a spring bristle mounted to a modular frame that may be interchangeably mounted to the scraper assembly of FIG. 40(a).

DETAILED DESCRIPTION OF THE PREFERRED EMBODIMENT(S)

Figure 1:
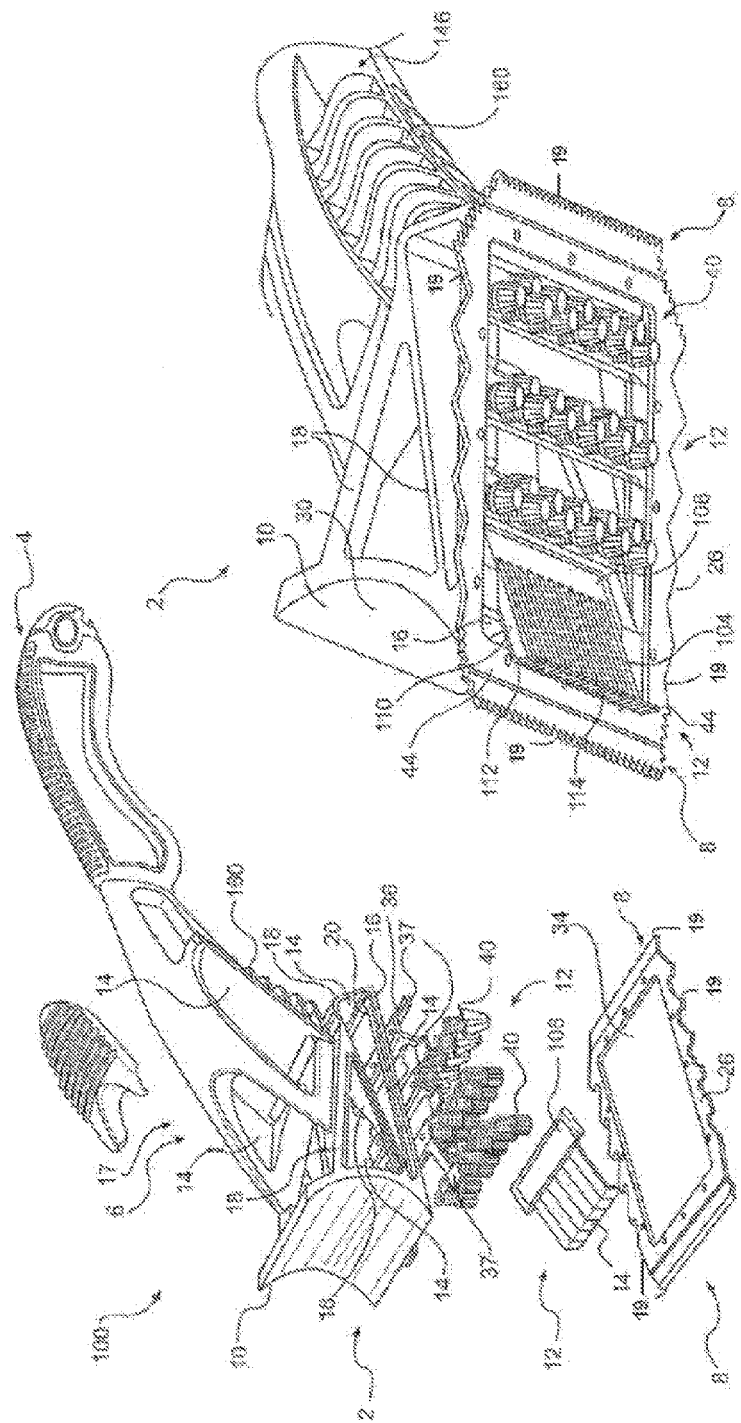
FIG. 1(*a*) is an exploded view of a scraper assembly embodiment showing a housing, modular frame and plurality of spring abraders.

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other apparatuses and methods. Before explaining the disclosed embodiments of the present invention in detail, it is to be understood that the invention is not limited in its application to the details of any particular embodiment shown. The terminology used herein is for the purpose of description and not of limitation. Further, although certain methods are described with reference to certain steps that are presented herein in certain order, in many instances, these steps may be performed in any order as may be appreciated by one skilled in the art, and the methods are not limited to the particular arrangement of steps disclosed herein.

It must be noted that as used herein and in the appended claims, the singular forms "a", "an", and "the" include plural references unless the context clearly dictates otherwise. Additionally, the terms "a" (or "an"), "one or more" and "at least one" can be used interchangeably herein. The terms "comprising", "including", and "having" can also be used interchangeably.

Unless otherwise defined, all technical and scientific terms used herein have the same meaning as commonly understood by one of ordinary skill in the art to which this invention belongs.

For purposes of the present application, the term, "cleaning" refers to any means for removing an unwanted material from a surface, such as by abrading or polishing a surface.

As used herein, the term "abrasive elements" may include any abrasive structure designed to cut, scrape or otherwise induce wear. Exemplary abrasive elements include, but are not limited to, teeth, serrations, ridges, barbs, spikes, dimples, threads, hooks, rasps, graters, or any combination thereof. For purposes of the present application, abrasive elements may further include protrusions formed on a surface by virtue of applied coatings, pitting, sandblasting or other techniques for texturing a surface.

For purposes of the present application, the term "substances" as used herein may refer to any material that is positioned on or adhered to a surface. In an exemplary embodiment, substances can include food particles, microorganisms, carbonized or other heat entrained debris, or combinations thereof.

Additionally, as used herein, "wire rope" refers to a flexible cord constructed from about one or more strands, wherein each strand is configured from about two or more wires that are twisted, coiled or braided together. When the wire rope is constructed from about two or more strands, the strands are twisted, coiled or braided together. In one embodiment, the wire rope is constructed from about two or more strands, preferably, about three or more strands, more preferably, about five or more strands and most preferably, about seven or more strands. In another embodiment, the wire rope may be constructed from at least about seven or more wires, preferably, about nineteen or more wires. In an exemplary embodiment, the wire rope may be constructed from a single strand composed of about seven or more wires, preferably, about nineteen or more wires. In another embodiment, the wire rope may be constructed from about two or more strands, wherein each strand is composed of about three or more wires. The strands and wires used to form the wire rope may be constructed from any metals, preferably stainless steel or aluminum. The wire rope may have a hollow central core. Alternatively, the strands may be twisted, coiled or braided around a central core material, such as a strand, a cord or a flexible wire. Similarly, each strand may have a hollow central core or the wires may be twisted, coiled or braided around a central core material, such as a flexible wire. The strands and wires may be twisted, coiled or braided together in any suitable pattern. Exemplary patterns are shown in FIGS. 15(a)-(c) and FIGS. 13-14. Two or more strands and two or more wire ropes may have the same or different types of twisted, coiled, braided pattern.

The present invention relates to a novel scraper assembly and method for use thereof that may be used to effectively and efficiently remove debris from a surface by abrading, scraping, cutting debris away from or otherwise cleaning a surface. This technology may be predicated upon the importance of: improving the scraping ability and minimizing surface damage by providing one or more highly flexible spring abraders and/or scraper blade; providing improved spring abraders, namely wire rope bristles, wire rope coiled springs, chainmail abraders, wire cloth abraders, or combinations thereof, for abrading a surface; and improving cleaning efficiency by incorporating a back pressure means that enables or enhances the ability of the spring abraders to flexibly conform to multiplanar and curved surfaces.

Referring now to the drawings, wherein like reference numerals designate corresponding structures throughout the various figures, FIGS. 1(a)-1(b) show an exemplary scraper assembly 100 having a scraper head 2 and handle 4. Scraper head 2 may further include a housing 6, scraper blade 8, plow shield 10 and one or more spring abraders 12. Scraper assembly 100 may be any scraper or brush for cleaning a surface.

FIGS. 1(a)-1(b) show an exemplary scraper assembly 100 having a scraper head 2 and handle 4. Scraper head 2 may further include a housing 6, scraper blade 8, plow shield 10 and spring abraders 12. Variations of scraper head 2, handle 4 and their components are described below. Specifically, FIGS. 1(a)-3 show various exemplary embodiments of housing 6; FIGS. 1(a)-1(b), 4-5(d) show various exemplary embodiments of scraper blade 8; FIGS. 1(a)-2 and 4-5(c) show various exemplary embodiments of plow shield 10; FIGS. 1(a)-3, 5(a)-12 and 16(a)-40(c) show various exemplary embodiments of spring abraders 12, wherein FIGS. 1(a)-1(b), 5(a)-12, 16(a)-21(b), 40(a) and 40(c)-40(d) show variations of spring bristle 40, FIGS. 2-3, 22(a)-23, 16(a)-29(d), 40(b) and 40(d) show variations of coiled spring 42; FIGS. 1(a)-1(b), 30(a)-30(f) and 40(a)-40(c) show variations of flat spring 44, FIGS. 31(a)-35(e), show variations of chainmail abrader 200 and FIGS. 36-39(b) show variations of wire cloth abraders 400. Furthermore, FIGS. 40(a) and 41-46 show various exemplary embodiments of handle 4. Scraper assembly 100 may further include other features, such as exemplary embodiments of hand shields 146 shown in FIGS. 40(a), 42-43 and 45-47; exemplary embodiments of sweep brush 148 shown in FIG. 48 and an exemplary embodiment of liquid dispenser 150, light 152, thermometer 154 and power source 158 shown in FIG. 49.

Scraper head 2 may include a housing 6 having any structure, shape or configuration that protects, provides a mounting surface for and/or transfers a force from handle 4 to spring abraders 12 and scraper blade 8. Housing 6 may be constructed from a frame 16 suitable for mounting a plurality of spring abraders 12 and an outer shell 15.

As shown in FIG. 1(a)-1(b), frame 16 may have one or more ledges 20 and a modular frame component 26 suitable for mounting a plurality of spring abraders 12. Ledge 20 may either extend inward from frame 16 towards a central region of scraper head 2 or may extend in an opposite outward facing direction. A plurality of apertures may be positioned on ledge 20 for mounting spring abraders 12. Additionally, a surface of ledge 20 or any surface of frame 16 may further include conventional fasteners, such as a track, apertures for receiving threaded fasteners, recesses, slots or protrusions for mating with a snap fit component, male or female fastener, latching mechanism or quick connect mechanism, for mating with modular frame component 26.

Modular frame component 26 may have one or more of surfaces having any size, shape or configuration, including a flat surface, convex surface, concave surface, curved surface or any combination thereof, suitable for mounting spring abraders 12. In an exemplary embodiment, modular frame component 26 may have a continuous surface that may be flat, curved and/or include regions of different elevations. The surface may include a plurality of apertures for mounting spring abraders 12. In another exemplary embodiment, modular frame component 26 may have one or more one or more openings 34, which may be configured as slots, that may be appropriately sized to enable the expulsion of debris through open housing 6.

Figure 5A:
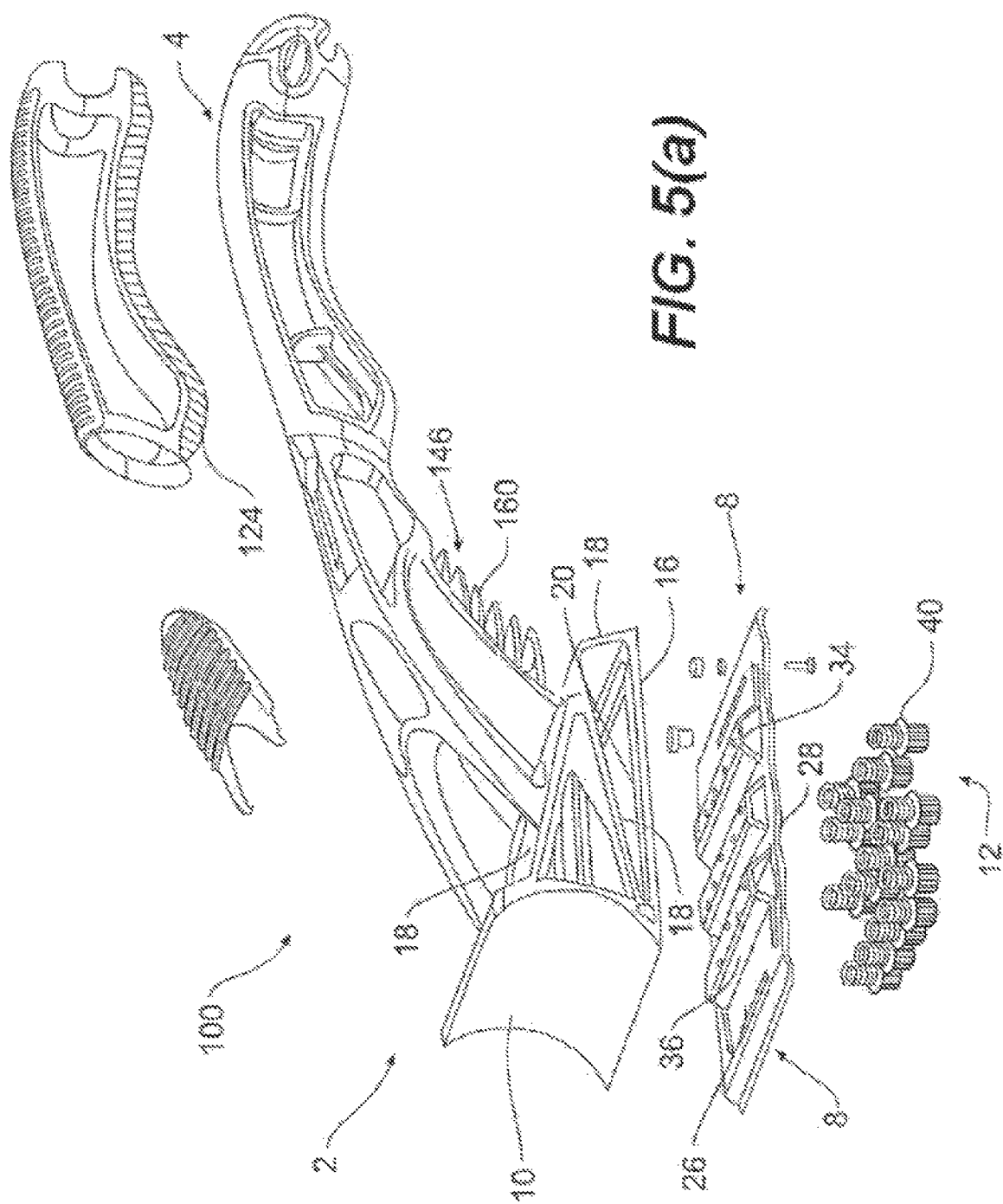
FIG. 5(*a*) is an exploded view of a scraper assembly showing a modular frame and spring bristles in accordance with an embodiment of the present invention.
FIG. 5(b) is a side view of the scraper assembly of FIG. 5(a).
FIG. 5(c) is a perspective view of the scraper assembly of FIG. 5(a).
FIG. 5(d) is a bottom view of the scraper assembly of FIG. 5(a).
FIG. 5(e) is a cross-section of a portion of the scraper assembly of FIG. 5(a).
FIG. 5(f) is a close-up of the spring bristle of FIG. 5(e).
FIG. 5(g) is an exploded view of the spring bristle of FIG. 5(f).
FIG. 5(h) is a bottom view of the spring bristle of FIG. 5(f).

In the exemplary embodiment of FIGS. 1(a)-1(b), modular frame component 26 may have a surface with an enlarged central opening 34 and a plurality of plates 36 that bridge opening 34. Plate 36 may be a simple planer structure that spans opening 34 or may have feet 37 located at its distal ends to elevate plate 36 relative to the surface surrounding opening 34. In an exemplary embodiment, modular frame component 26 may include plates 36 having different levels of elevation. As shown in FIGS. 1(a) and 5(a), distal ends of plate 36 and/or feet 37 may be integral with or removably attached, using any conventional fastening means, to modular frame component 26. Plates 36 may be spaced apart from one another so as to create a plurality of slotted openings therebetween sized to facilitate the passage of debris through housing 6. The surface surrounding opening 34 and/or plate 34 may include a plurality of apertures for mounting spring abraders 12.

Modular frame component 26 may be removably mounted to any surface of frame 16, including ledge 20 and/or strut 18, or other surface of housing 6 via conventional fasteners, such as a rail, apertures for receiving threaded fasteners, snap fit component, latching mechanism or quick connect mechanism that cooperates with the fasteners of frame 16. In an alternative embodiment, modular frame component 26 may be integrally formed with ledge 20 of frame 16 or any other surface of housing 6.

Modular frame component 26 may be fabricated from any suitable material, such as metal, plastic, ceramic or any combination thereof. In an exemplary embodiment, modular frame component 26 may be designed to resist deformation and may be constructed from a material that has a high compressive strength, such as stainless steel. In another embodiment, modular frame component 26 may be fabricated from a flexible and resilient material that imparts flexibility to and offsets the stiffness of spring abraders 12. The material may also be constructed from a thermoplastic.

Housing 6 may further include a shell 17 having any structure, shape or configuration suitable for protecting the components of scraper head 2 and for connecting scraper head 2 to handle 4. In an exemplary embodiment, shell 17 may be a substantially continuous exterior covering that protects the various components of scraper head 2.

In an alternative exemplary embodiment, shell 17 may have one or more openings 14 designed to allow debris passing between and/or through spring abraders 12 to be easily expelled through housing 6. Openings 14 may prevent accumulation of debris within the scraper assembly 100 that would clog or inhibit the efficiency of scraper head 2, facilitates cleaning of the scraper assembly 100 and/or provides a clear field of view of a surface as it is being cleaned.

In an exemplary embodiment, housing 6 may have an open framework wherein shell 17 is constructed from one or more strut 18 and may be arranged with one or more frame 16 to create a three dimensional lattice structure. Each frame 16 may be connected to one or more struts 18 to form one or more opening 14 through which debris is expelled. Additionally, the surface of frame 16 and/or strut 18 may be directionally tapered, grooved or otherwise contoured to guide debris out of scraper head 2. Housing 6 may include one or more openings 14 positioned above, to a rear of and/or to a side of spring abraders 12. In an exemplary embodiment, housing 6 may have one or more central openings positioned above spring abraders 12 sized to receive a user's hand or tool, such as a screw driver or brush, and two or more side openings to facilitate cleaning, repair, assembly or adjustment of scraper head. These openings may further provide a clear field of view of the surface being cleaned. Openings 14 may have any shape, size or configuration suitable for expelling debris removed by spring abraders 12, such as elliptical, circular, triangular, rectangular, square, trapezoidal shape or any combination thereof.

Figure 5B:
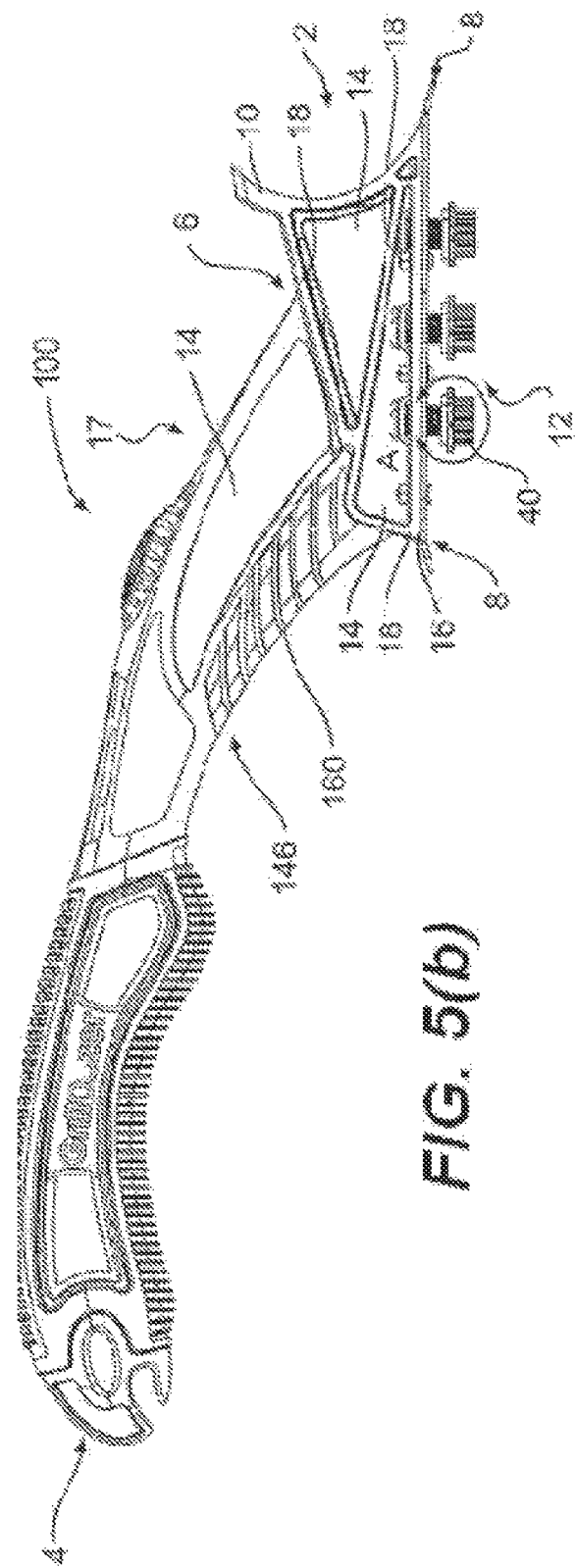

Referring to the exemplary embodiment of FIGS. 5(b)-5(c), housing 6 may include a frame 16 and a plurality of struts 18 forming six side openings adjacent to spring abraders 12 and an enlarged central opening positioned above spring abraders 12. Struts 18 may be slanted, overlapping and/or stacked on top of one another to provide structural support other components of scraper assembly 100, such as handle 4 and plow shield 10. As shown, in this embodiment, the framework of housing 6 may also have an open and upward extending vaulted configuration to further prevent debris build-up.

Figure 2:
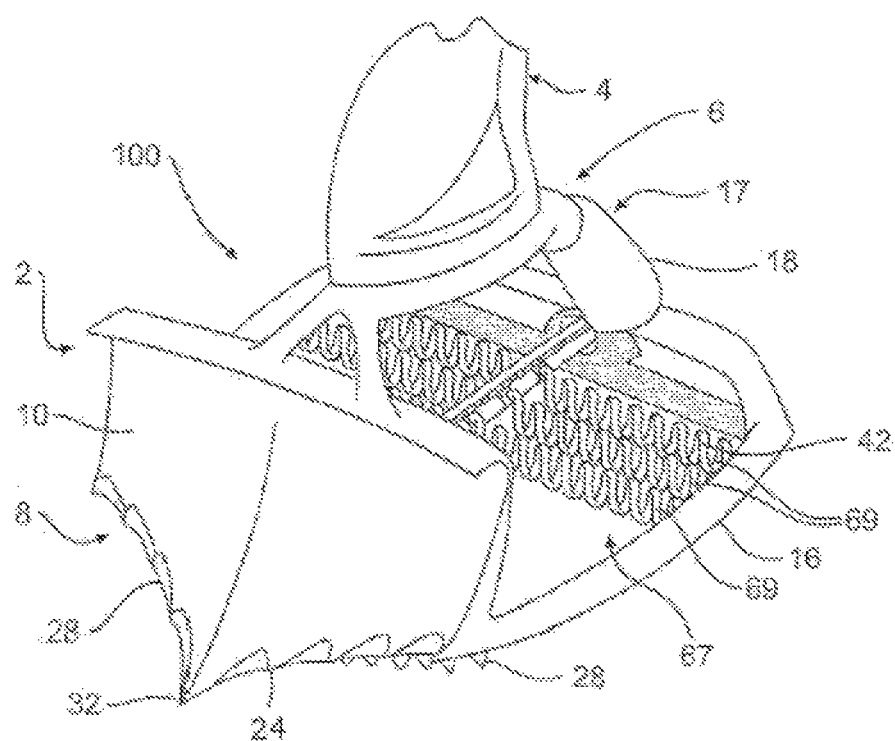
FIG. 2 is a perspective view of a scraper assembly embodiment having an open housing.
Figure 3:
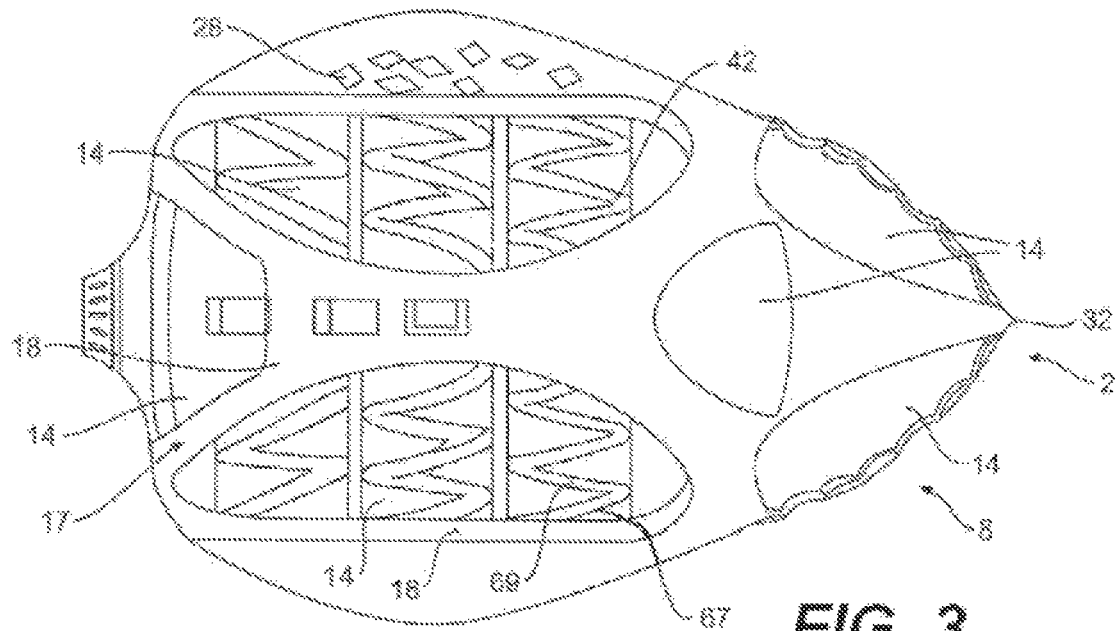
FIG. 3 is a top view of another scraper assembly embodiment having an open housing.

In another exemplary embodiment shown in FIG. 2, housing 6 may have a simple open framework constructed from a planer frame 16 and three struts 18 connected to handle 4. The frame may have any geometric shape, including an elliptical, circular, triangular, rectangular, square, trapezoidal shape or any combination thereof, and one or more edge the frame 16 may be elevated. In this embodiment, struts 18 and frame 16 form an open pyramid or basket like structure. FIG. 3 shows a similar framework wherein frame 16 and a plurality of struts 18 form a semi-circular dome or square based pyramid like shape with a plurality of angled openings 14.

Housing 6 may be fabricated from any suitable material suitable for mounting spring abrader 12 and force transference, including metals, plastics, ceramics or any combination thereof. In an exemplary embodiment, housing 6 may be designed to resist deformation and may be constructed from a material with a high compressive strength, such as stainless steel. Housing 6 may also be fabricated from a flexible and resilient material that imparts flexibility to and offsets a stiffness of spring abraders 12 and/or scraper blade 8. An exemplary material may be a thermoplastic high-temperature polymer with a low durometer, such as polyetheretherketone (PEEK). One or more surfaces of housing 6, preferably, an entire structure of, may have a non-stick coating, such as a non-toxic fluoropolymer resin or Teflon®, to prevent debris from adhering to a surface of housing 6.

One or more scraper blades 8 may be integral with or removably attached to housing 6 and may function to provide a first macrocleaning pass of a surface. When applied to a grate, scraper blades 8 may be designed to remove debris from an upper surface of the grate bars, which may clog, damage or otherwise impede the operation of spring abraders 12 that are intended for finer cleaning. Additionally, one or more scraper blades 8 may extend outward from scraper head 2 and/or housing 6 so as to sit on and support scraper assembly 100 above one or more grate bars. Therefore scraper blades 8 may rest on top of one or more grate bars while spring abraders 12 that may either be suspended between and/or rest on top of the grate bars.

Scraper blades 8 may have any shape, size or configuration suitable for effectively cleaning a surface and may include a blade body 22 having a sharpened blade edge 19 suitable for scraping. Blade body 22 may have a planar, curved or angular configuration. Blade body 22 and blade edge 19 may be angularly inclined with respect to frame 16 and/or modular frame component 26 so as to be angled to a surface to be cleaned. One or more blade edges 19 may be positioned at a distal end of and/or angularly oriented with respect to blade body 22. In an exemplary embodiment, blade edge 19 may be linear, curved, pointed or any combination thereof. Exemplary blade edge 19 configurations may be circular, elliptical, triangular, rectangular, trapezoidal or any combination thereof. A scraper head 2 having two or more scraper blades 8, or additionally, two or more blade edges 19 may have a different size, shape or configuration.

In an exemplary embodiment, scraper blade 8 may be adapted to clean a grate structure. Scraper blade 8 may have a contoured blade edge 19 that is shaped to correspond to the spacing and position of a set of grate bars. Specifically, the curvature of blade edge 19 may either be customized, such as by using a wire form, to correspond to a specific set of grate bars or may be designed to correspond to an average or weighted average spacing of various grate bars. In an exemplary embodiment, blade edge 19 may have a scalloped configuration or have abrasive elements 28 that are periodically positioned so as to conform to the shape and/or spacing of a grate bar. In an exemplary embodiment shown in FIG. 5(c), each scallop curve or the space between the abrasive elements may be about 0.22 inches to about 0.46 inches, preferably, about by 0.31 inches to about 0.46 inches, more preferably, about 0.34 inches to about 0.46 inches and most preferably, about 0.35 inches to about 0.45 inches to optimize contact between blade edge 19 and/or abrasive elements 28 and the grate.

A plurality of abrasive elements 28, such as protrusions, teeth, serrations, ridges, barbs, spikes, dimples, threads, hooks, coils, rasps, graters, any conventional abrasive contours or any combination thereof, may be positioned on a plurality of surfaces of scraper assembly 100, including blade edge 19 to facilitate cleaning. Depending on the application and/or placement, abrasive elements 28 may be a planer or a three dimensional structure. Abrasive elements 28 may be immobile or independently movable relative to the surface on which they are mounted. In an exemplary embodiment, abrasive elements 28 may be configured as tapered protrusions, such as wedges, pyramid shaped teeth, flat triangular shaped teeth, serrations, or any combination thereof, that extend outwards from blade edge 19 and/or any other surface of scraper blade 8 or housing 6 and may be oriented parallel to the bars of a grate. Abrasive elements 28 may have any geometrics shape that increases the amount of scraping surface contact area per given area of the abrasive element. As shown in the exemplary embodiment of FIG. 5(d), two or more abrasive elements 28 may have different shapes, sizes, configurations, angular orientations or any combination thereof.

Abrasive elements 28 may be positioned along any surface of scraper blade 8, including along a blade edge 19, an upper surface of blade body 22 and/or a lower surface of the blade body 22. The surface of scraper blade 8, specifically blade body 22, may be punched to form dimples or grating surfaces. In an exemplary embodiment, abrasive elements 28 may be suspended downward from a lower surface of scraper blade 8 and/or housing 6 to form a set of bottom teeth that function to dislodge debris using either a slicing action or by a pounding or striking action. Abrasive elements 28 may be arranged in one or more rows or may be staggered to further enhance abrasiveness.

One or more scraper blade 8 may be either integrally formed with or removably attached to any surface of housing 6, such as a front, back or side, so that it may be pointed in any direction, such as a forward, backward, side or diagonal direction. In an exemplary embodiment, scraper blade 8 may be attached to an external surface of housing 6, an edge of housing 6, a central region of housing 6, frame 16, ledge 20, modular frame component 26, strut 18 or any combination thereof. These scraper blades 8 may substantially surround a perimeter of housing 6. In another embodiment, two or more scraper blades 8 may be attached to opposite ends, such as a forward and a rear region, opposing side regions, of housing 6.

In an exemplary embodiment, a plurality of scraper blade 8 may be attached to an external surface of housing 6, an edge of housing 6, a central region of housing 6, frame 16, ledge 20, modular frame component 26, strut 18 or any combination thereof so that blade edges 19 may substantially surround housing 6. Scraper blade 8 and/or blade edges 19 may have a curved, circular, elliptical, linear, rectangular, square, trapezoidal, pointed, triangular shape or any combination thereof and may further include a plurality of abrasive elements 28.

Figure 5D:
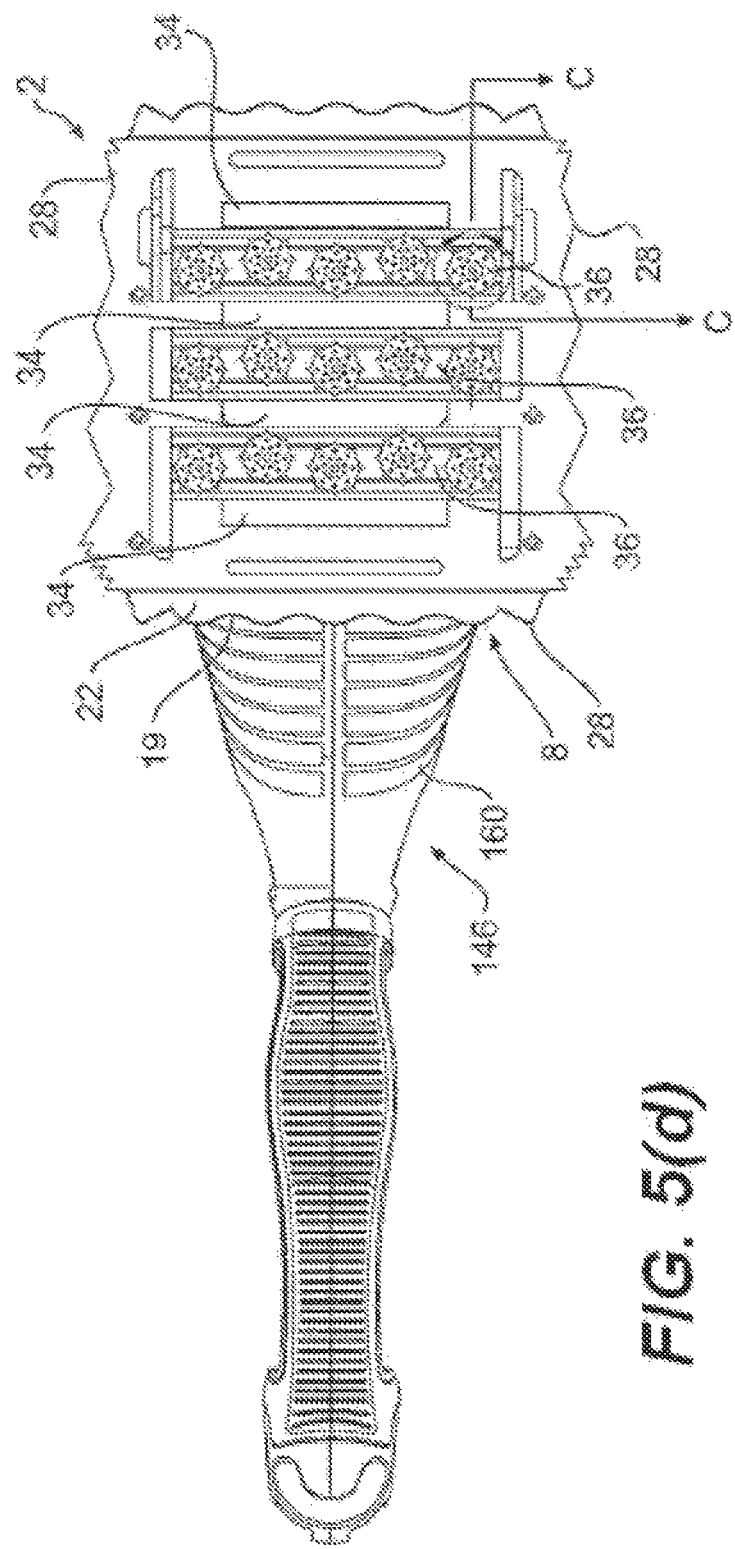
Figure 5E:
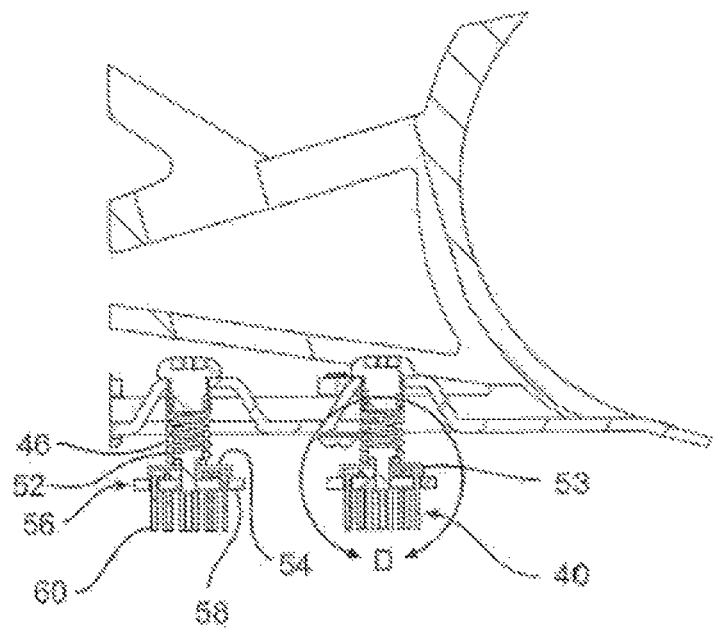
Figure 5F:
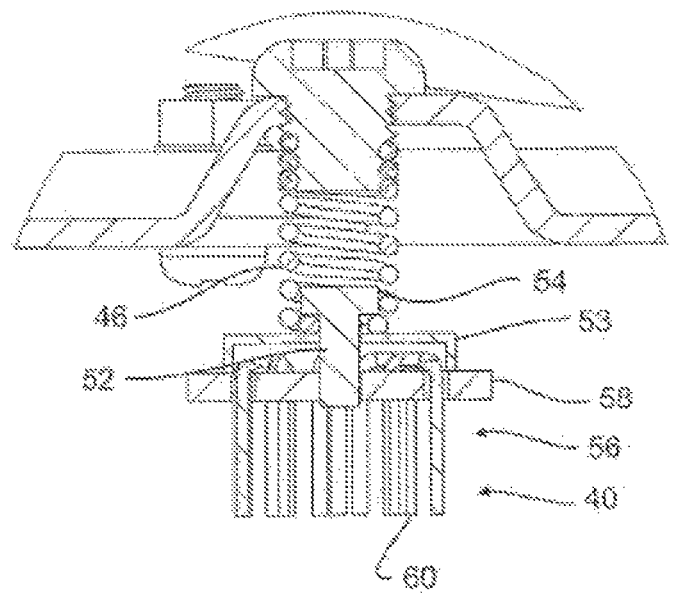
Figure 5G:
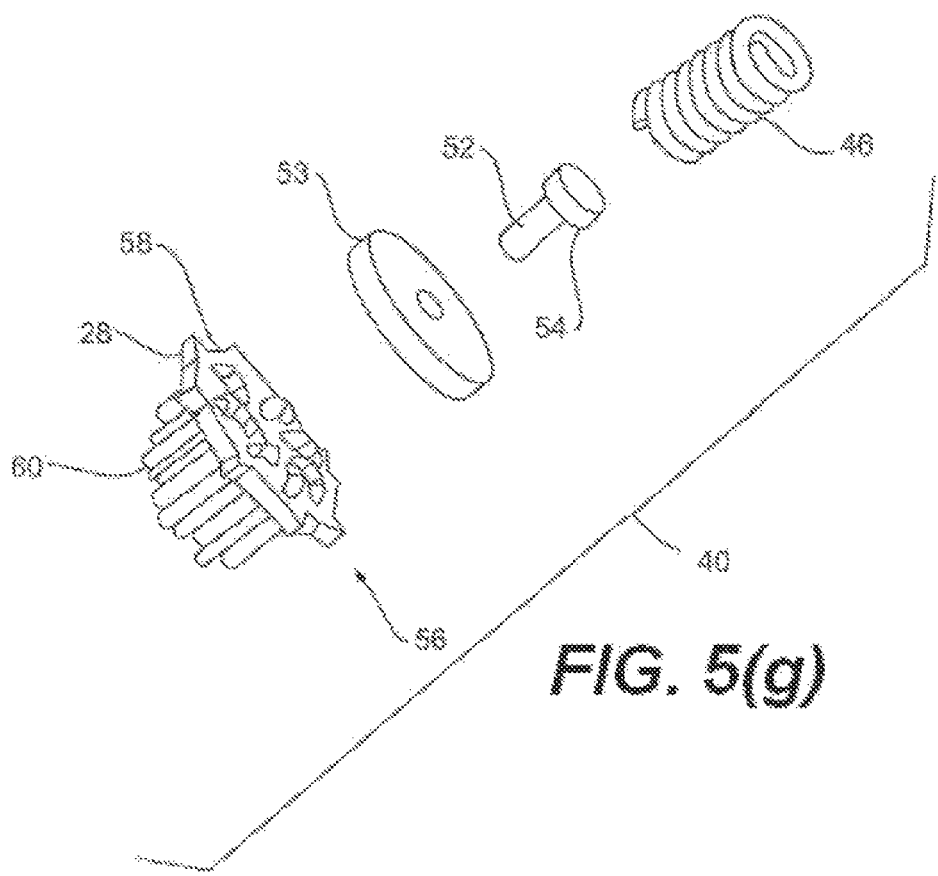
Figure 5H:
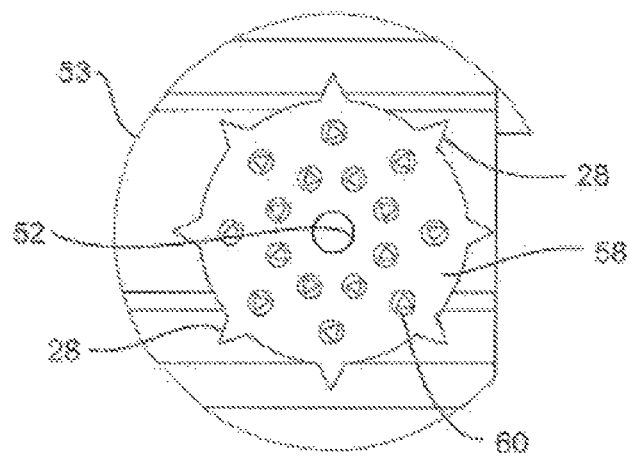

In an exemplary embodiment of FIG. 5(d), scraper blades 8 may be indirectly mounted to housing 6 via a modular frame component 26. In this embodiment two scraper blades 8 may be integrally formed with a front and back region of modular frame component 26. The sides of modular frame component 26 may include additional abrasive elements 28 that may further facilitate cleaning. Alternatively, it is envisioned that four or more scraper blades 8 may also be integrally formed with the front, back and sides of modular frame component 26 so as to create a continuous blade edge 19 that surrounds housing 6. Blade edge 19 may have different configurations and different abrasive elements 28. In an alternative embodiment, the integrally connected scraper blades 8 and/or blade edge 19 may have a collectively circular, elliptical, linear, rectangular, square, trapezoidal, pointed, triangular shape or any combination thereof.

Scraper blade 8 may be fabricated from any suitable material suitable for enabling abrasion, including metals, plastics, ceramics or any combination thereof. In an exemplary embodiment, scraper blade 8 may be designed to resist deformation and may be constructed from a material with a high compressive strength, such as stainless steel. Scraper blade 8 may also be fabricated from a flexible and resilient material. An exemplary material may be a thermoplastic high-temperature polymer with a low durometer, such as polyetheretherketone (PEEK). One or more surfaces of scraper blade 8, preferably, an entire structure of, may have a non-stick coating, such as a non-toxic fluoropolymer resin or Teflon®, to prevent debris from adhering to a surface thereof.

Scraper head 2 may also include a plow shield 10 for removing debris and preventing the accumulation of debris within scraper head 2, i.e. on blade edge 19 and/or spring abraders 12. Plow shield 10 may further function to protect a user's hands by minimizing splatter and backsplash. In an exemplary embodiment, plow shield 10 may include a plow surface 30 positioned adjacent to one or more blade edges 19 to facilitate the removal of debris loosed by scraper blade 8.

Plow surface 30 may have any shape, size or configuration suitable for mass debris removal. It may include a planar, sloped and/or curved region for retaining and removing accumulated debris. In an exemplary embodiment, plow surface 30 may be a planar surface that is angularly oriented relative to a blade edge 19, a concave surface or a V shaped surface.

Plow shield 10 may be fabricated from any substantially flexible and non-deformable material, such as metal, plastic, ceramic or any combination thereof. In an exemplary embodiment, plow shield 10 may be composed of stainless steel; cast zinc or aluminum with a chrome finish; a thermoplastic high temperature-grade polymer such as those in the ABS family, or a super polymer such as PEEK. Plow shield 10 may also be coated with a non-stick material, such as a non-toxic fluoropolymer resin or Teflon®, to prevent debris removed from a surface from adhering to plow shield 10.

In an exemplary embodiment, plow shield 10 may be either integrally formed with or removably attached to, using a standard fastening mechanism, such as a snap fit, latching means or a male/female connector, housing 6 and/or one or more scraper blade 8. Additionally, plow shield 10 maybe positioned adjacent to one or more blade edge 19 of scraper blade 8 to guide debris removed by blade edge 19 away from the scraper assembly. One or plow shields 10 may be connected to a forward facing blade edge, one or more sideways facing blade edges and/or a backward facing blade edge.

In the exemplary embodiments shown in FIGS. 5(b)-5(c), plow shield 10 may be a substantially rectangular or square concave surface and may be attached to an angled stainless steel scraper blade 8 having abrasive elements 28 extending out at an angle from scraper edge 24. Preferably, the abrasive elements 28 extend out in a direction in which scraper head 2 is moving. The curved plow surfaces 30, preferably fabricated from cast zinc with a chrome finish, may extend upward from scraper edge 24 to catch and remove loosened debris removed by scraper edge 24. Preferably, multiple teeth like abrasive elements 28 are located on a bottom surface of scraper blade 8 to further enhance the abrasive properties of the scraper assembly. As shown in FIG. 4, plow shield 10 may be positioned on multiple sides of scraper head 2.

As shown in the exemplary embodiments of FIG. 2, plow shield 10 may have a triangular V shape that facilitates maneuverability and enables scraper assembly 100 to remove debris from corners and crevices. Stainless steel scraper blade 8, located along a front and side portion of plow shield 10 may have scalloped edges that are either customized to correspond to the dimensions of a specific grate bar or may be sized to correspond to an average or weighted average of a set of various grate bars 1. Scraper blade 8 may include a plurality of serrations to further abrade and preferably enable detailed cleaning of the side and upper surfaces of the grate bars 1. A sloped plow surface 30, fabricated from cast zinc with a chrome finish, extends from scraper edges 24 such that debris systematically accumulates on and rolls-off a sloped side of plow surface 30. In an exemplary embodiment, a plurality of abrasive elements 28 may be located on a bottom surface of plow shield 10 to further enhance the abrasive properties of the scraper assembly. A notch or reinforced tip 32 may also be included at the tip of plow shield 10 to enable a user to lift the grate or poke, flip and turn meat cooking on the grill. Plow shield 10 and/or the various abrasive elements 28 of plow shield 10 may be configured to catch debris in only one direction in order to facilitate the removal of debris and cleaning of plow shield 10.

Scraper head 2 may further include one or more spring abraders 12. Spring abrader 12 may have at least one edge, tip or surface capable of effectively clean a surface and may be particularly suited for microcleaning and removing fine particulates. Additionally, one or more, preferably multiple surfaces of spring abrader 12 may be textured and/or contoured with abrasive structures. In an exemplary embodiment, spring abrader 12 may have a substantially 360° textured or contoured surface that enhances frictional contact with a surface to be cleaned, abraded, scraped, cut, shaped, textured or otherwise prepared. Specifically, all faces, such a front, back and sides, of a spring abrader 12, edges and/or tips may be contoured. Exemplary spring abraders 12 may have a coefficient of friction of about 1 to about 2.5. Although capable of removing and/or scraping away debris, spring abraders 12 may be highly flexible and therefore may be operated on any surface, including wooden, ceramic, metal or plated surfaces, without marring, scratching or otherwise damaging the surface.

Spring abraders 12 may be integral with or removably mounted to housing 6. In an exemplary embodiment, spring abrader 12 may be removably mounted to enable replacement of worn-out parts and facilitate cleaning of scraper assembly 100. Spring abrader 12 may be attached to an external surface of housing 6, an edge of housing 6, a central region of housing 6, frame 16, ledge 20, strut 18 or any combination thereof. In an exemplary embodiment, spring abrader 12 may be fastened to housing 6 with one or more conventional fasteners, such as latches, snap fits, male and female connectors, threaded mechanisms or any combination thereof.

Spring abrader 12 may also be directly or indirectly mounted to housing 6. Additionally, spring abraders 12 may be integrally or removably attached to housing 6 via modular frame component 26.

Spring abraders 12 may have a wide variety of configurations suited to different functions and surfaces. Exemplary spring abraders 12 may include spring bristles 40, coiled springs 42, flat springs 44, chainmail abraders 200, wire cloth abraders 400 or combinations thereof, which are discussed in further detail below.

As shown in FIGS. 5(e)-5(h), spring bristles 40 may be designed for a wide variety of cleaning applications and preferably enable fine particulate cleaning of a surface. Highly flexible so as to enable bending without deformation, spring bristles 40 may be particularly effective for cleaning grates and cross-bar structures. This configuration allows multi-axial movement to maximize the ability of the scraper assembly 100 to conform to different surfaces. In a first embodiment, spring bristle 40 may include a suspension mechanism 46 and bristle head 56, as shown in FIGS. 5(e)-5(h). In a second embodiment, spring bristle 40 includes a shaft 48 attached to suspension mechanism 46, as shown in FIG. 7. In a third embodiment, spring bristle 40 consists essentially of a suspension mechanism 46 that functions as a bristle. In a fourth embodiment, spring bristle 40 may be a wire rope bristle 300, as shown in FIG. 13-21(b).

As shown in FIGS. 5(e)-5(h), in a first embodiment spring bristle 40 includes a suspension mechanism 46 that may be connected to a bristle head 56 via a rod 52. Optionally, a washer 53 may be positioned between rod 52 and bristle head 56 to create a secure connection and minimize friction between suspension mechanism 46 and bristle head 56.

Suspension mechanism 46 may be any flexible suspension means, perpendicularly or angularly mounted with respect to housing 6, frame 16, modular frame component 26 or any combination thereof, that enables a wide range of multi-planar motion of spring bristle 40. Preferably, suspension mechanism 46 may be capable of enabling the horizontal, vertical, angular and rotational bending movement of spring bristle 40 and bristle head 56. Suspension mechanism 46 therefore enhances the flexibility of spring bristle 40 and minimizes or eliminates the occurrence of fatigue or fracturing. In one embodiment, suspension mechanism 46 may be adjusted to allow spring bristle 40 a wide range of motion and enhanced flexibility.

Suspension mechanism 46 may be fabricated from any flexible and resilient material, such as metals, including tempered and non-tempered metals; plastics, including thermoplastics; or any combination thereof. In an exemplary embodiment, suspension mechanism 46 is constructed from spring quality steel, such as a hardened stainless steel having a gauge of at least 1060, and can be treated to obtain optimum properties, such as toughness, strength and resilience. Suspension mechanism 46 may also be coated with a non-stick material, such as a non-toxic fluoropolymer resin or Teflon®, to prevent debris from adhering to suspension mechanism 46.

Suspension mechanism 46 may have any flexible and resilient structure that facilitates abrasion and enhances the flexibility of spring bristle 40. Preferably, suspension mechanism 46 may be configured as a resilient coiled suspension spring. Suspension mechanism 46 may also be configured as a flexible spring wire, cantilever flat spring or a buckling column.

Suspension mechanism 46 may be contoured or otherwise shaped to enhance the abrasive properties of spring bristle 40. When configured as a coiled suspension spring constructed from one or more filaments, the filaments may have any geometric configuration, such as a rectangular wire, cylindrical wire, or flat wire and may be die drawn, molded, extruded or otherwise contoured to produce a plurality of grooves, serrations, notches and/or protrusions along its length. These grooves, serrations, notches and/or protrusions increase the efficiency and effectiveness of spring bristle 40 by increasing the amount of abrasive surface area. The cross-section of suspension mechanism 46 and/or its filament may have any geometric shape, preferably a multi-edged configuration, such as a triangle, a square, a cross, a star, a gear like shape or any combination thereof. Optionally, the suspension mechanism 46 and/or its filaments may be: further roughened to create pitting and surface irregularities; embedded with abrasive particles, such as diamonds, tungsten carbide or other hard ceramics; embedded with abrasive elements; coated, dipped and/or heat treated to produce a variety of textured surfaces; or any combination thereof to further increase the abrasive surface area of spring bristle 40. In an exemplary embodiment, suspension mechanism 46 may have a plurality of abrasive elements tapered to an edge or point, such as a wedge, pyramid or triangular structure, arranged in one or more rows or layers. In another exemplary embodiment, the tips and edges of these abrasive elements may be blunted, rounded or curved to avoid damaging a surface to be cleaned. The abrasive surface may be blunted by any suitable means such as applying a material coating to or otherwise mechanically dulling a surface of the abrasive elements. Exemplary abrasive elements may also be independently movable with respect to spring abrader 12. The amount and degree of contouring may be correlated to the efficiency and effectiveness of spring bristle 40 to clean a surface. The degree of contouring may be selected based upon the scraper assembly 100 application. Preferably, suspension mechanism 46 is sufficiently textured to effectively and efficiently clean a surface. In an exemplary embodiment, suspension mechanism 46 and/or the abrasive elements of suspension mechanism 46 may be configured to catch debris in only one direction to facilitate the removal of debris and cleaning of suspension mechanism 46.

In an exemplary embodiment, suspension mechanism 46 is a coiled suspension spring constructed from wire rope. The wire rope suspension spring may be constructed from one or more strands 50, wherein each strand 50 is configured from two or more wires 49, such as a flexible and resilient wire, that are twisted, coiled, or braided together. When the wire rope suspension spring is constructed from two or more strands 50, the strands are twisted, coiled, or braided together. Exemplary wires 49 and strands 50 may be contoured, have one or more abrasive elements or any combination thereof. In one embodiment, the wire rope coiled suspension spring may be made from stainless steel, contoured wires 49 and strands 50 that are twisted or coiled together to enhance resilience, strength and increase the abrasive surface area of suspension mechanism 46.

FIGS. 6(*a*)-6(*b*) show an exemplary suspension mechanism 46 configured as a wire rope coiled suspension spring. In this embodiment, the wire rope coiled suspension spring is constructed from 3 wires 49 that are contoured via metal drawing or extrusion to have a substantially cross shaped cross-section. Wires 49 are coiled or twisted together to form a strand 50, which has a coiled configuration. In an exemplary embodiment, the coils may be circular, oval, rectangular, square, triangular or any other suitable geometric configuration. The pitch of the coiled suspension spring may be fixed or variable. Additionally, the coil diameter, strand diameter, hardness, coil pitch angles, coil shape and coil structure may vary depending upon the application and desired brush properties.

A rod 52 may be used to connect bristle head 56 of spring bristle 40 to suspension mechanism 46. Rod 52 may be any standard connector suitable for fastening suspension mechanism 46 to bristle head 56. In an exemplary embodiment, rod 52 may be used to adjust the stiffness of suspension mechanism 46 by immobilizing a portion of suspension mechanism 46 configured as a coiled suspension spring. As shown in FIGS. 5(*e*)-5(*g*), a portion of suspension mechanism 46 may be immobilized by raising one or more rods 52 disposed within or adjacent to suspension mechanism 46. Rod 52 may have one or more fasteners 54 that may be removably coupled to one or more regions or one or more mating features positioned along the length of suspension mechanism 46. A distal end of rod 52 may be integrally or removably connected to bristle head 56. As rod 52 is raised, a larger portion of suspension mechanism 46 becomes immobilized thereby altering the flexibility of spring bristle 40.

Preferably bristle head 56 is removably attached to rod 52 using any conventional fastener. This ability to removably couple bristle head 56 to rod 52 and suspension mechanism 46 facilitates repair and allows a user to interchangeably mount a variety of different bristle heads 56 suitable for different applications.

In one embodiment bristle head 56 includes a bristle plate 58 and a plurality of bristles 60 extending therefrom. As shown in FIG. 5(*h*), plate 58 may include one or more abrasive elements 28 along a side surface of plate 58. Abrasive elements 28 may also be positioned on a lower surface of plate 58 adjacent to bristles 60. Optionally, plate 58 may further include one or more apertures through which debris trapped between bristles 60 may be expelled.

Bristle 60 may be constructed from standard plastic, wire or fiber filaments. Alternatively, bristles 60 may be constructed from wire rope, wherein the strands 50 and wires 49 of the wire rope have a sufficient stiffness to effectively abrade a surface while maintaining a sufficient flexibility to resist deformation and prevent damaging a surface. Bristle 60 may also be contoured and/or have a plurality of abrasive elements. In an exemplary embodiment, bristles 60 constructed from wire rope including two or more strands 50 of stainless steel contoured wires that are that are coiled or twisted together to enhance resilience, strength and increase the abrasive surface area of bristle 60.

FIGS. 9(*a*)-10(*b*) show sheaths 64 that may be interchangeable with bristle head 56 so as to be coupled to rod 52. In these embodiments, sheaths 64 may be removably and interchangeably coupled to and fitted over an end of rod 52. Additionally, shaft 48 and spring tip 68, discussed below, may be integral with or removably attached to rod 52, bristle head 56 and/or sheaths 64.

In a third exemplary embodiment, spring bristle 40 includes a suspension mechanism 46 integrally formed with or otherwise attached to a shaft 48 to enhance the flexibility of spring bristle 40. Suspension mechanism 46 may be configured to reinforce, offset, compliment or otherwise cooperate and enhance the capabilities of shaft 48. In one embodiment, the stiffness of a rigid shaft 48 may be offset by a flexible suspension mechanism 46, thereby producing a spring bristle 40 that is durable, gentle and effective for cleaning a surface. In another embodiment, the stiffness of suspension mechanism 46 may also be adjustable. When spring bristle 40 is resting, shaft 48 may be either aligned in the same plane as or oriented at an angle with respect to suspension mechanism 46. In an exemplary embodiment, shaft 48 may be capable of multidirectional bending with respect to suspension mechanism 46. In an alternative embodiment, shaft 48 may be stiff and wherein a sheath 64 or spring tip 68 provides multi-axial movement. In an exemplary embodiment, shaft 48 may have a flexibility of −2.2 kN/m to about −15 kN/m, preferably about −5 kN/m to about −15 kN/m. An exemplary shaft 48 may have a variable spring rate. Alternatively shaft 48 may have a limited degree of motion with respect to suspension mechanism 46.

Shaft 48 may be fabricated from any suitable material that resists deformation and that enables efficient cleaning. Exemplary materials may include metals, plastics, including thermoplastics, or any combination thereof. In one embodiment, shaft 48 may be fabricated from a hardened stainless steel having a gauge of at least 1060. Shaft 48 may also be coated with a non-stick material, such as a non-toxic fluoropolymer resin or Teflon®, to prevent debris removed from a surface from adhering to shaft 48.

Shaft 48 may be constructed from a conventional plastic filament or wire filament. Alternatively, shaft 48 may be constructed from wire rope. The wires 49 and/or strands 50 used to construct shaft 48 may have a sufficient stiffness to effectively abrade a surface while maintaining a sufficient flexibility to resist deformation and prevent damaging a surface. In an exemplary embodiment, shaft 48 or one or more wires 49 and strands 50 thereof may be contoured and/or have a plurality of abrasive elements.

In an exemplary embodiment, spring bristle 40 is configured as a coiled spring suspension mechanism 46 constructed from contoured wire rope having a single strand 50 and seven wires 49. In this embodiment, the spring bristle may have a diameter of about 0.375 in and is made from contoured stainless steel wires. Integral with the suspension mechanism 46 is an elongated shaft 48 about 1 in long that is also fabricated from contoured stainless steel wire rope formed from a single strand 50 made from seven wires 49. The stainless steel wire rope shaft 48 has a square cross-section with a dimension of about 0.625 in by 0.625 in.

In one embodiment shown in FIG. 7, shaft 48 is an elongated member integral with a coiled spring suspension mechanism 46 and twists around itself to form a reinforced and flexible shaft 48. In this embodiment, shaft 48 and suspension mechanism 46 may be constructed from a single flexible wire 49 or may be constructed wire rope. Preferably, shaft 48 and suspension mechanism 46 are constructed from a wire rope including two or more stainless steel contoured strands 50 or wires 49 that are coiled or twisted together to enhance resilience, strength and increase the abrasive surface area of shaft 48.

As shown in the exemplary embodiment of FIG. 8, shaft 48 may be intertwined with a plurality of supplemental filaments 62 which may be arranged in tufts and may extend radially outward from shaft 48. Supplemental filament 62 may be the same as the above described filaments used to form the coiled suspension spring, discussed above. In an exemplary embodiment, supplemental filaments 62 may be contoured and/or have a plurality of abrasive elements. In an exemplary embodiment, supplemental filaments 62 are stainless steel contoured wires that are coiled or twisted together to enhance resilience, strength and abrasive surface area of shaft 48. The ends of supplemental filaments 62 may be splayed to facilitate cleaning. In an exemplary embodiment, the splayed tips may be blunted, curved or rounded to avoid scoring of a surface to be cleaned.

In another exemplary embodiment, shaft 48 may optionally include a sheath 64, which may cover at least the distal end of, more preferably the entire length of shaft 48. Sheath 64 may be fabricated from any suitable material, preferably a hardened stainless steel having a gauge of at least 1060. Sheath 64 may also be coated with a non-stick material, such as a non-toxic fluoropolymer resin or Teflon®, to prevent debris removed from a surface from adhering to sheath 64. The surface of sheath 64 may include a plurality of abrasive elements 28, such as grooves, serrations, notches, protrusions or abrasive additives, designed to facilitate scraping and cleaning of any surface. In an exemplary embodiment, sheath 64 may be removably attached to shaft 48. Therefore, when abrasive elements 28 become dull from repeated use, sheath 64 may be removed from shaft 48, and shaft 48 be used to clean a surface. Alternatively, a new sheath 64 may be attached to shaft 48. Sheath 64 may therefore be useful for protecting shaft 48, thus extending the life expectancy of the scraper assembly. In another exemplary embodiment, sheath 64 may be permanently or integrally formed with shaft 48 using any suitable conventional means, such as an epoxy adhesive. Sheath 64 and/or the abrasive elements 28 of sheath 64 may also be configured to catch debris in only one direction to facilitate the removal of debris and cleaning of sheath 64.

As shown in FIGS. 8 and 9(*a*)-9(*b*), sheath 64 may have a tapered conical sleeve including a plurality of ridges and wedges positioned on a surface thereof. The tip of the sleeve may be blunted or curved so as to prevent marring or otherwise damaging a surface. FIGS. 10(*a*)-10(*b*) show another exemplary embodiment of sheath 64. Here, sheath 64 has a domed configuration with a plurality of pyramid shaped teeth positioned on a side surface and tip thereof. Notably, the sleeve may have other configurations, such as a spherical, cylindrical, pyramid or box like shapes.

In an exemplary embodiment, a spring tip 68 may be integrally formed at the tip of or otherwise attached to shaft 48 as shown in FIG. 11. Together, suspension mechanism 46 and spring tip 68 may create a highly flexible bristle configuration that is resistant to deformation. Spring tip 68 may have the same configuration and material composition as suspension mechanism 46. Spring tip 68 may be designed to abrade and preferably microclean any surface, including the various faces of a grate bar 1. The tip and sides of spring tip 68 may be used to clean an upper surface of a grate in a similar manner as a standard bristle. In an exemplary embodiment, the tip may be constructed from wire rope having a plurality of splayed strands 50 or wires 49 for enhance abrasiveness. Spring tip 68 may also be oriented to grip an upper surface, a lower surface and a side of a grate bar 1 between its coils. Debris clinging to a surface of the grate may be removed by running the coils of spring tip 68 along the grate such that the coils contact an upper, a lower or a side surface of the grate bar 1.

Figure 12:
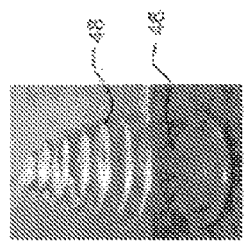
FIG. 12 is a perspective view of another spring bristle embodiment.
Figure 15C:
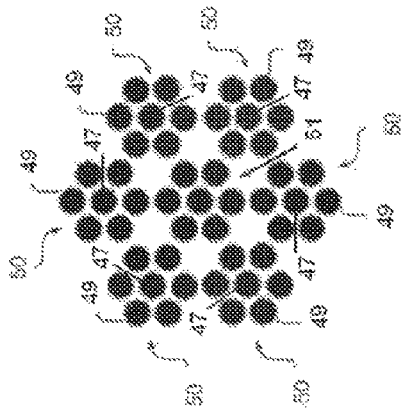
FIG. 15(c) is a cross-section view of a wire rope composed of one strand formed from nineteen wires that are arranged in a coiled pattern around a central wire.
Figure 15B:
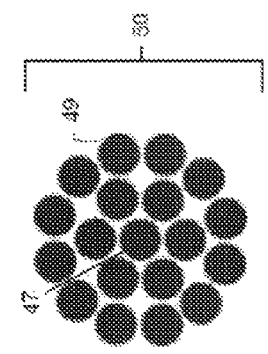
FIG. 15(b) is a cross-section view of a wire rope composed of one strand formed from seven wires that are arranged in a hexagonal coiled pattern around a central wire.
Figure 15A:
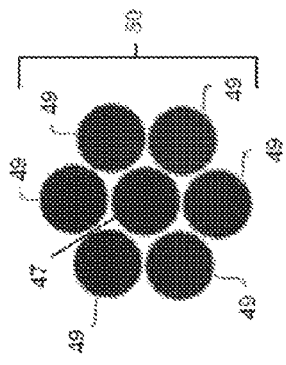
FIG. 15(a) is a cross-section of a wire rope composed of seven strands that are each composed of seven wires, wherein both the strands and wires are arranged in a hexagonal pattern around a central strand core and central wire strand core.

In another embodiment shown in FIG. 12, shaft 48 is configured as a conical coiled spring that tapers to a distal end for abrading a surface. In this embodiment, shaft 48 is preferably integrally formed with a coiled spring suspension mechanism 46. The base of shaft 48 is preferably larger than an end of the coiled spring suspension mechanism 46. As shown in FIG. 12, suspension mechanism 46 is preferably configured as a conical coiled suspension spring with a wide base adapted to be mounted to a surface of the scraper assembly 100. The base of the conical coiled suspension spring has tapered configuration with a narrow end connected to conical coiled shaft 48. Spring bristle 40 may therefore have a substantially tree shaped configuration, as shown in FIG. 12. Shaft 48 and suspension mechanism 46 may be constructed from a single flexible spring wire or may be constructed from wire rope.

In a third embodiment, spring bristle 40 consists essentially of one or more of the aforementioned suspension mechanisms 46 that functions like a flexible bristle for cleaning a surface. With respect to the coiled spring embodiment of suspension mechanism 46, the body of the coiled spring may include an elongate coiled body, such as a cylindrical or conical column of coils. Optionally, the coiled suspension mechanism 46 may taper to a distal tip which is coated or blunted to protect the surface being cleaned. In an exemplary embodiment where the suspension mechanism is constructed from wire rope, the exposed tip may be sealed by fusing or otherwise closed, coated, blunted or any combination thereof. In an alternative embodiment, the tip of the coil may have a plurality of splayed wires 49 or strands 50 and a region proximal to the tip may be sealed to prevent unraveling. In another exemplary embodiment, the ends may form a closed loop, and the closed loop may be flattened.

As previously discussed, various components of spring bristles 40 may be constructed from wire rope. Similarly, in a fourth embodiment shown in FIGS. 15(*a*)-21(*b*), spring bristle 40 may be constructed from wire rope to form a wire rope bristle 300. This wire rope construction enhances the resilience, flexibility and strength wire rope bristle 300 enabling it to effectively clean a surface.

Figure 13:
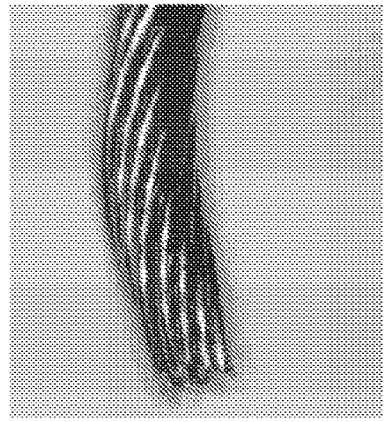
FIG. 13 is a perspective view of a wire rope the wires of which are braided together in a woven configuration.
Figure 14:
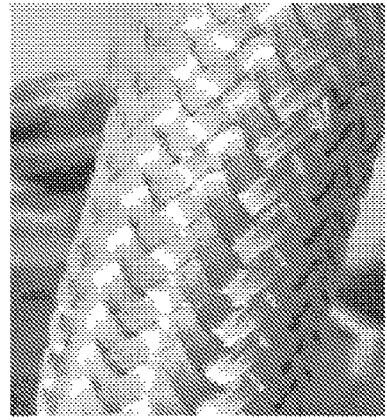
FIG. 14 is a perspective view of a wire rope the wires of which are arranged in a coiled configuration.

Wire rope bristle 300 is constructed from at least one or more strands 50, wherein each strand 50 is constructed from two or more wires 49 that are twisted, coiled or braided together. Wire rope bristle 300 may have a hollow central core or may be constructed from a plurality of strands 50 that are twisted, coiled or braided around a centrally positioned core material, such as a strand 50, cord or flexible wire. Similarly, each strand 50 may have a hollow central core or wires 49 may be twisted, coiled or braided around a centrally positioned core material, such as a flexible wire 49. Strands 50 and wires 49 may be twisted, coiled or braided together in any suitable pattern. FIG. 13 shows a plurality of wires 49 braided together in an exemplary woven pattern to form strand 50, and FIG. 14 shows a plurality of wires 49 that are coiled together in an exemplary coiled pattern to form strand 50. When two or more strands 50 are twisted, coiled or braided together, they may form the same pattern as that shown in FIGS. 13-14. Two or more strands 50 and two or more wire rope bristles 300 may have the same or different types of twisted, coiled, braided pattern.

Any suitable number of strands 50 and wires 49 may be used to form wire rope bristle 300 that enables wire rope bristle 300 to bend in multiple directions while resisting permanent deformation and retaining a sufficient amount of strength and rigidity to abrade a surface. Preferably, at least one strand 50 of the wire rope used to form wire rope bristle 300 is constructed from about two to about nineteen wires 49, more preferably, about five to about nineteen wires 49 and most preferably, about seven to about nineteen wires 49. In another embodiment, at least one strand 50 is constructed from at least about seven or more wires 49, preferably, at least about ten or more wires 49, more preferably, at least about twelve or more wires 49 and most preferably at least about nineteen or more wires 49. In one embodiment, the wire rope used to form wire rope bristle 300 may have at least about two or more strands 50, preferably, at least about three or more strands 50 and more preferably, at least about five or more strands 50. In one embodiment, wire rope bristles 300 is constructed from a single strand 50 having at least about seven wires 49, preferably, at least about ten wires, more preferably, about seventeen wires 49 and most preferably, at least about nineteen wires 49.

Two or more strands 50 may have the same or different numbers and arrangement of wires 49, and two or more wire rope bristles 300 may have the same or different numbers and arrangement of strands 50. For example, wire rope bristles 300 positioned along a front perimeter of scraper head 2 may have more or fewer strands 50 and/or wires 49 relative to wire rope bristles 300 centrally mounted with respect to scraper head 2, thereby producing bristles having different properties adapted to different cleaning applications. Preferably, the wire rope bristle 300 mounted to the front of scraper assembly 100 have a greater flexibility to more readily conforms to a surface to be cleaned.

Strand 50 and/or wire 49 may have any suitable size or configuration that facilitates cleaning and removal of debris from a surface. The dimensions of strand 50, wire 49 and wire rope bristle 300 may be selected to allow for flexibility and enhance the abrasive capability of wire rope bristle 300. Preferably, wire rope bristle 300 may have a diameter of about $\frac{1}{32}$ in to about $\frac{1}{16}$ in. Two or more strands 50, two or more wires 49 and two or more wire rope bristles 300 may have the same or different diameters or lengths. For example, the stands 50 and/or wires 49 of wire rope bristles 300 positioned along a front perimeter of scraper head 2 may have a larger or smaller diameter than the strands 50 and/or wires 49 of wire rope bristles 300 centrally mounted relative to scraper head 2. Additionally, wire rope bristles 300 positioned at the rear of scraper head 2, may have longer strands 50 and wires 49 forming longer wire rope bristles 300 than the central or front mounted wire rope bristles 300 in order to better conform to multiplanar surfaces and catch loose debris as scraper assembly 100 moves over a surface.

Wire 49, strand 50 and wire rope bristles 300 also may have any suitable configuration to facilitate surface abrasion. For example, wire 49 may be a flat rectangular wire or cylindrical wire. Additionally, wire 49, strand 50 and wire rope bristle 300 may be die drawn, molded, extruded or otherwise contoured to produce a plurality of grooves, serrations, notches and/or protrusions along its length. Consequently, the cross-section of wire 49, strand 50 and wire rope bristle 300 may have any geometric shape, preferably a multi-edged configuration, such as a triangle, a square, a cross, a star, a gear like shape or any combination thereof. These contours increase the efficiency and effectiveness of wire rope bristle 300 by increasing the amount of abrasive surface area. Optionally, wire 49, strand 50, wire rope bristle 300 or combinations thereof may be further: roughened to create surface texture and abrasive elements by pitting, sandblasting or other techniques; embedded with abrasive particles, such as diamonds, tungsten carbide or other hard ceramics; embedded with abrasive elements; coated, dipped and/or heat treated to produce a variety of textured surfaces; or any combination thereof to further increase the abrasive surface area of wire rope bristle 300. In an exemplary embodiment, wire 49 and/or strand 50 may have a plurality of abrasive elements that taper to an edge or point, such as a wedge, pyramid or triangular structure, arranged in one or more rows or layers on a surface of wire 49 and/or strand 50. In another exemplary embodiment, the tips and edges of these abrasive elements may be blunted, rounded or curved to avoid damaging a surface to be cleaned. The abrasive surface may be blunted by any suitable means such as applying a material coating to or otherwise mechanically dulling a surface of the abrasive elements. Exemplary abrasive elements may also be independently movable with respect to wire rope bristle 300. The degree, placement, type and density of contouring and abrasive elements may be selected based upon the intended application of brush assembly 100. Preferably, wire rope bristle 300 is sufficiently textured to effectively and efficiently clean a surface. In an exemplary embodiment, wire rope bristle 300 and/or the abrasive elements of wire rope bristle 300 may be configured to catch debris in only one direction in order to facilitate the removal of debris and cleaning of wire rope bristle 300. Two or more strands 50, two or more wires 49 and two or more wire rope bristles 300 may have the same or different degree, placement, type and density of contouring or abrasive elements. For example, wire rope bristles 300 positioned along a front perimeter of scraper head 2 may include strands 50 and/or wires 49 having a greater density of abrasive elements and contouring than more centrally positioned wire rope bristles 300; therefore, the outer forward most wire rope bristle 300 may be designed to have a more abrasive surface area in order to aggressive remove debris from a surface on initial contact.

In the embodiment of FIG. 15(*a*), wire rope bristle 300 is configured as a single strand 50 formed from seven coiled wire 49. Strand 50 and wires 49 are fabricated from 304 stainless steel and may be used to form a wire rope bristle 300 having a diameter of about 0.03 to about 0.033 in and a length of about 2 in. In this embodiment, wire rope bristle 300 has a high degree of flexibility yet is sufficiently thick to effectively abrade a surface and avoid fraying at a distal end of wire rope bristle 300 during use. As shown in FIG. 15(*a*), six wires 49 are coiled together around a wire 47, forming a hexagonal cross-section about the central wire 47.

In another embodiment shown in FIG. 15(*b*), wire rope bristle 300 is configured as a single strand 50 formed from nineteen coiled wire 49. Strand 50 and wires 49 are fabricated from 304 stainless steel and may be used to form a wire rope bristle 300 having a diameter of about 0.062 to about 0.068 in and a length of about 2 in. As shown in FIG. 15(*b*), the wires 49 are arranged in concentric circular layers about a central wire 47, forming a substantially circular cross-section. The outer layer has 13 wires 49, and the inner layer has six wires 49 that surround central wire 47.

FIG. 15(*c*) shows another embodiment, wherein wire rope bristle 300 is configured as seven braided strands 50, wherein each strand is formed from seven braided wires 49. Strands 50 and wires 49 are fabricated from 304 stainless steel and may be used to form a wire rope bristle 300 having a diameter of about $\frac{1}{23}$ in to about $\frac{1}{4}$ in, preferably about $\frac{1}{16}$ in to about 0.21 in, and more preferably, about $\frac{1}{16}$ in to about $\frac{1}{23}$ in. Six strands 50 are coiled together around a central strand 51, and six wires 49 are coiled together around a central wire 47, wherein each strand 50 and each wire 49 forms a hexagonal cross-section about a central strand 51 or central wire 47, as shown in FIG. 15(*c*).

Wire rope bristle 300, strand 50 and wire 49 may be constructed from any suitable material, including metals, metals, metal alloys, natural fibers or plastics. Preferably, wire rope bristles 300 are fabricated from a metal or a metal alloy. Additionally, at least one of wire rope bristle 300, strand 50, wire 49 is preferably fabricated from aluminum or stainless steel. The selected material may be further tempered or otherwise manipulated to achieve the desired strength or flexibility properties suitable for constructing wire rope bristle 300.

Figure 16A:
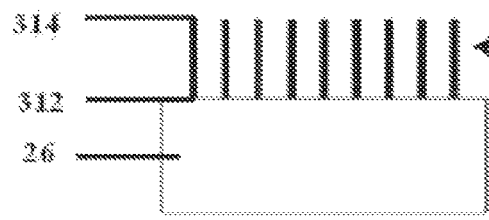
FIG. 16(a) is schematic diagram showing the side of a wire rope bristle mounted on a modular frame component of the scraper assembly.
Figure 16B:
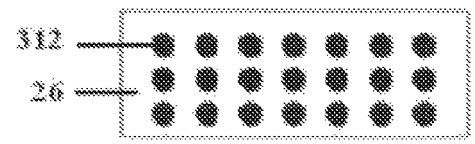
FIG. 16(b) is a bottom view of the wire rope bristles of FIG. 16(a).
Figure 16C:
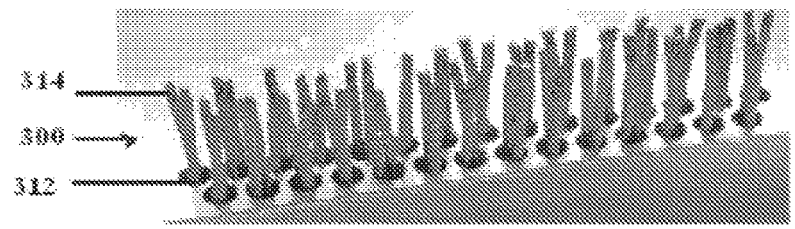
FIG. 16(c) is a perspective view showing the sealed distal ends of the wire rope bristles of FIG. 16(a).

In one embodiment, body 310 of wire rope bristles 300 has a linear or curved configuration. Wire rope bristles 300 may be mounted to a surface of housing 6, modular frame component 26 or frame 16 using any known means, wherein a proximal end 312 of wire rope bristle 300 is attached to the mounting surface and an opposite distal end 314 is freely movable and adapted to engage a surface to be cleaned. As shown in FIGS. 16(*a*)-17, proximal end 312 of wire rope bristles 300 may be directly mounted to or embedded in a surface of modular frame component 26 using any known means. For example, wire rope bristles 300 may be friction fitted, adhesively attached, snapped into, latched into or otherwise mounted or embedded within a plurality of holes, apertures or depressions of housing 6, modular frame component 26 or frame 16. In this embodiment, wire rope bristle 300 is flexible, and distal end 314 is capable of freely bending in multiple different directions.

In one embodiment, shown in FIGS. 16(*c*)-17, distal end 314 of wire rope bristle 300 may be sealed to prevent unraveling of strands 50 and/or wires 49. Preferably, the strands 50 and wires 49 at the distal end of wire rope bristles 300 may be sealed by fusing, crimping, lock-stitch braiding, banding, heat fusion or capping. For example, the strands 50 and wires 49 at the distal end may be melded together, adhesively bonded or covered with a cap. Alternatively, the distal end 314 of wire rope bristle 300 may be splayed, with a plurality of protruding strands 50 and/or wires 49 creating a soft tufted tip for enabling microcleaning without marring the surface to be cleaned. In another embodiment, wire rope bristle 300 may be sealed a location proximal to distal end 314 such that strand 50 and wires 49 are splayed at the distal end but prevents the unraveling of the entire length of wire rope bristle 300.

Figure 17:
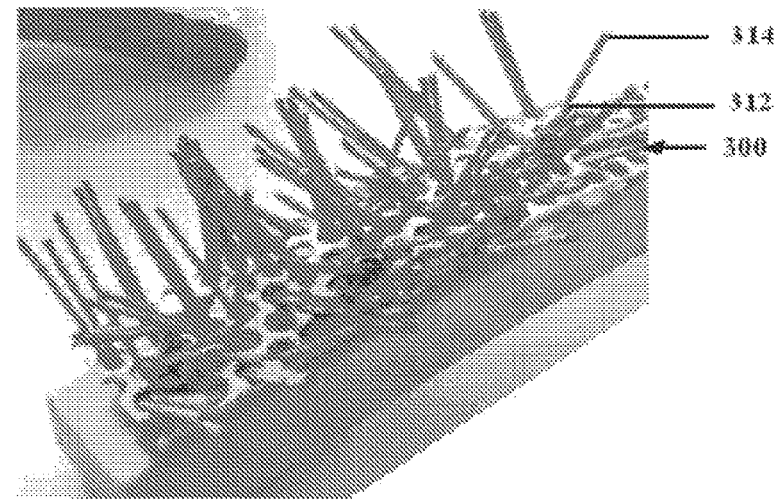
FIG. 17 is a perspective view of straight wire rope bristles having sealed ends that are mounted to a surface of the scraper assembly at various angles.

As shown in FIGS. 16(*c*)-17, the proximal end 312 of wire rope bristle 300 may be attached to a mounting surface in a uniform or scattered arrangement. Wire rope bristles 300 may be arranged in rows and substantially perpendicularly oriented with respect to the mounting surface, as shown in FIG. 16(*c*). Alternatively, wire rope bristles may be splayed at various angles with respect to the mounting surface, as shown in FIG. 17. In this embodiment, wire rope bristles 300 are constructed from about seven strands 50 that are twisted, coiled or braided together, wherein each strand 50 is constructed from about seven wires that are twisted, coiled or braided together. Alternatively, coiled wire rope bristle 300 can be constructed from about seventeen strands 50 that are twisted, coiled or braided together, wherein each strand 50 is constructed from a single wire 49. Preferably, wire rope bristle 300 is constructed from 304 stainless steel and has a diameter of about $\frac{1}{16}$ in.

Figure 18A:
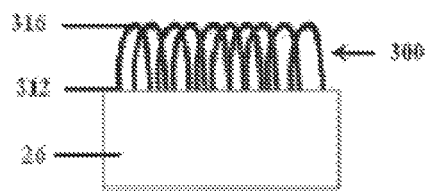
FIG. 18(a) is a schematic diagram showing a side view of a wire rope bristle mounted to a modular frame component of the scraper assembly by its distal and proximal ends.
Figure 18B:
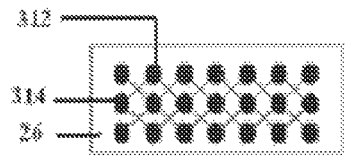
FIG. 18(b) is a bottom view of the wire rope bristles of FIG. 18(a).
Figure 18C:
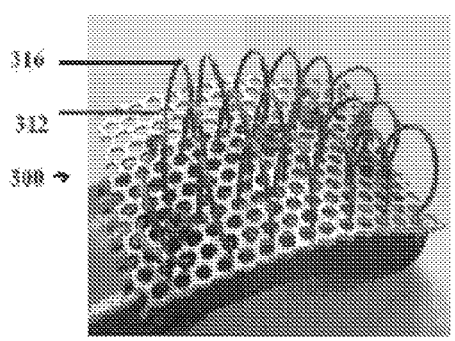
FIG. 18(c) is a perspective of the wire rope bristles of FIG. 18(a).

In another embodiment shown in FIGS. 18(*a*)-18(*c*), both proximal end 312 and distal end 314 of wire rope bristles 300 may be embedded in or mounted to a surface of housing 6, modular frame component 26 or frame 16, such that wire rope bristle 300 is bent in a U or V shaped configuration having a curved distal apex 316 adapted to engage and remove debris from a surface. By virtue of mounting both proximal end 312 and distal end 314 to a surface of brush assembly 100, fraying is minimized and wire rope bristle 300 has enhanced resilience and rigidity.

Figure 19A:
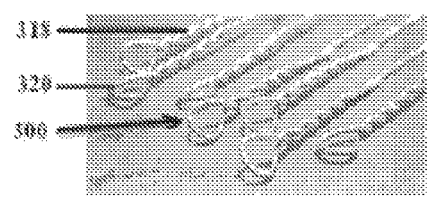
FIG. 19(a) is a perspective view of a wire rope bristle having a loop end.
Figure 19B:
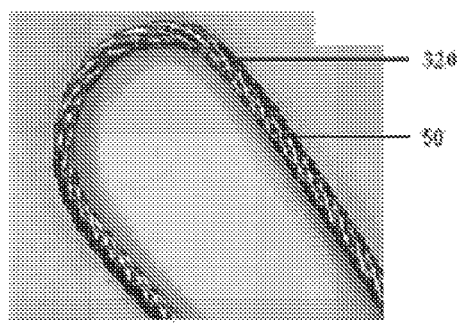
FIG. 19(b) is a close up side view of the loop end of FIG. 19(a).
Figure 21A:
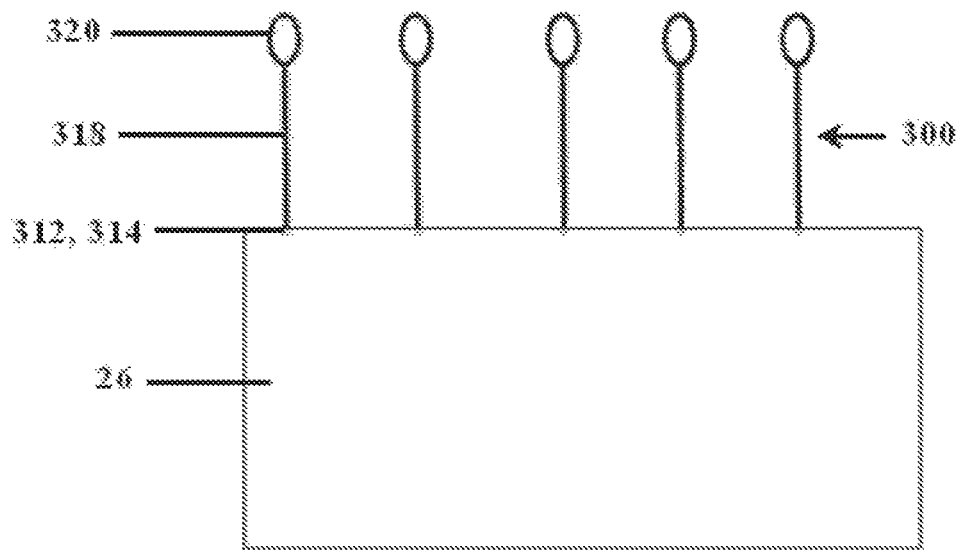
FIG. 21(a) is a schematic diagram showing a side view of a looped end wire rope bristle.
Figure 21B:
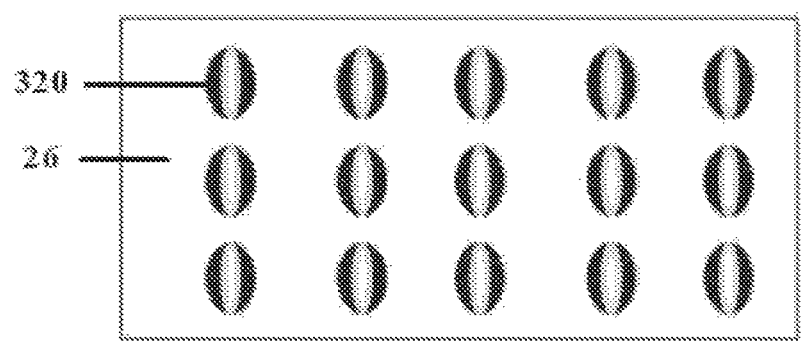
FIG. 21(b) is a bottom view of the wire rope bristles of FIG. 21(a).

In another embodiment shown in FIGS. 19(*a*)-19(*b*), proximal 312 and distal ends 314 of wire rope bristle 300 are twisted together to form a stem 318 having a twisted configuration which is embedded in or otherwise mounted to a surface of housing 6, modular frame component 26 or frame 16. Positioned at a distal end of stem 318 is a highly flexible freely movable distal loop end 320 suitable for abrading a surface. The strands 50 and/or wires 49 of distal loop end 320 are tightly wound relative to one another. Loop end 320 may have a substantially circular, semi-circular, elliptical or tear drop configuration. This configuration of wire rope bristle 300 is preferably highly flexible and heavily contoured or has a concentrated density of abrasive elements along an inner and outer surface of loop end 320 to facilitate abrasion.

Figure 20:
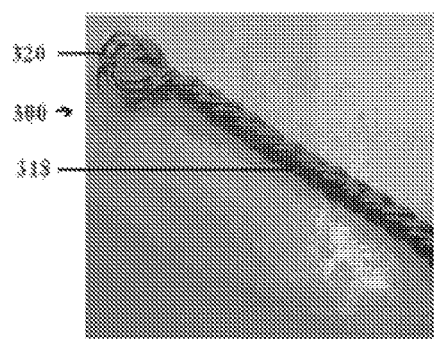
FIG. 20 is a perspective view of another wire rope bristle having a loop end.

FIG. 20 shows another embodiment of the wire rope bristle 300 having a loop end 320. Proximal 312 and distal ends 314 of wire rope bristle 300 are twisted together to form a stem 318 which is embedded in or otherwise mounted to a surface of housing 6, modular frame component 26 or frame 16. In this embodiment, distal loop end 320 is constructed from a plurality of wire strands 50 and/or wires 49 that are loosely wound relative to one another, such that each individual strand 50 and/or wire 49 forming the loop end 320 may be independently movable relative to one another.

Wire rope bristle 300 is resilient, flexible, strong, durable and provides 360 degrees of abrasive surface area to facilitate surface abrasion. In the aforementioned embodiments of wire rope bristle 300, the resilient and flexible spring properties of wire rope bristle 300 acts as an inherent flexible suspension system, and the coiled, twisted and braided structure of wire rope bristle 300 provides enhanced strength and rigidity necessary to effectively abrade a surface. Consequently, no additional suspension mechanism is necessary.

Optionally, wire rope bristle 300 may be integrally formed with or otherwise attached to any of the described embodiments of suspension mechanism 46. Additionally, any of the spring abrader 12 embodiments, spring bristle 40 embodiments or components thereof in the present application may be constructed from wire rope having the same shape, size, configuration, construction, material properties, mechanical properties or combinations thereof as used to form wire rope bristle 300. For example wire rope, having the same or similar configuration, construction, material properties, mechanical properties and abrasive features as wire rope bristle 300, may be used to form any of the spring abraders 12, spring bristles 40 or components thereof in the present application, including suspension mechanism 46, bristles of sheath 64, shaft 48, supplemental filament 62 or spring tip 68.

As shown in FIG. 8, scraper head 2 may include a plurality of any one or a combination of the various above described spring bristles 40 embodiments. Spring bristles 40 may be regularly spaced or irregularly spaced on modular frame component 26, frame 16, and/or housing 6 of scraper head 2. In one embodiment, spring bristles 40 may be arranged in rows, offset or staggered to facilitate cleaning of scraper head 2. Preferably, spring bristles 40 may be positioned to optimize contact with a grate bar 1. In an exemplary embodiment, spring bristles 40 may be aligned so that the bristles contact an upper surface and/or a side surface of each grate bar 1. In a preferred embodiment, spring bristles 40 may be appropriately sized to clean an upper surface, side surface, lower surface of a grate or any combination there of. In another exemplary embodiment, scraper head 2 may be populated with only a few widely dispersed spring bristles 40, preferably less than about 20, more preferably, less than about 15 and most preferably, less than about 10 spring bristles 40. The minimal number of spring bristles 40 and their wide spacing facilitates cleaning of scraper assembly 100. Because spring bristles 40 may have a substantially 360° contoured surface, scraper assembly 100 may be highly effective even with a minimal number of spring bristles 40.

Figure 22A:
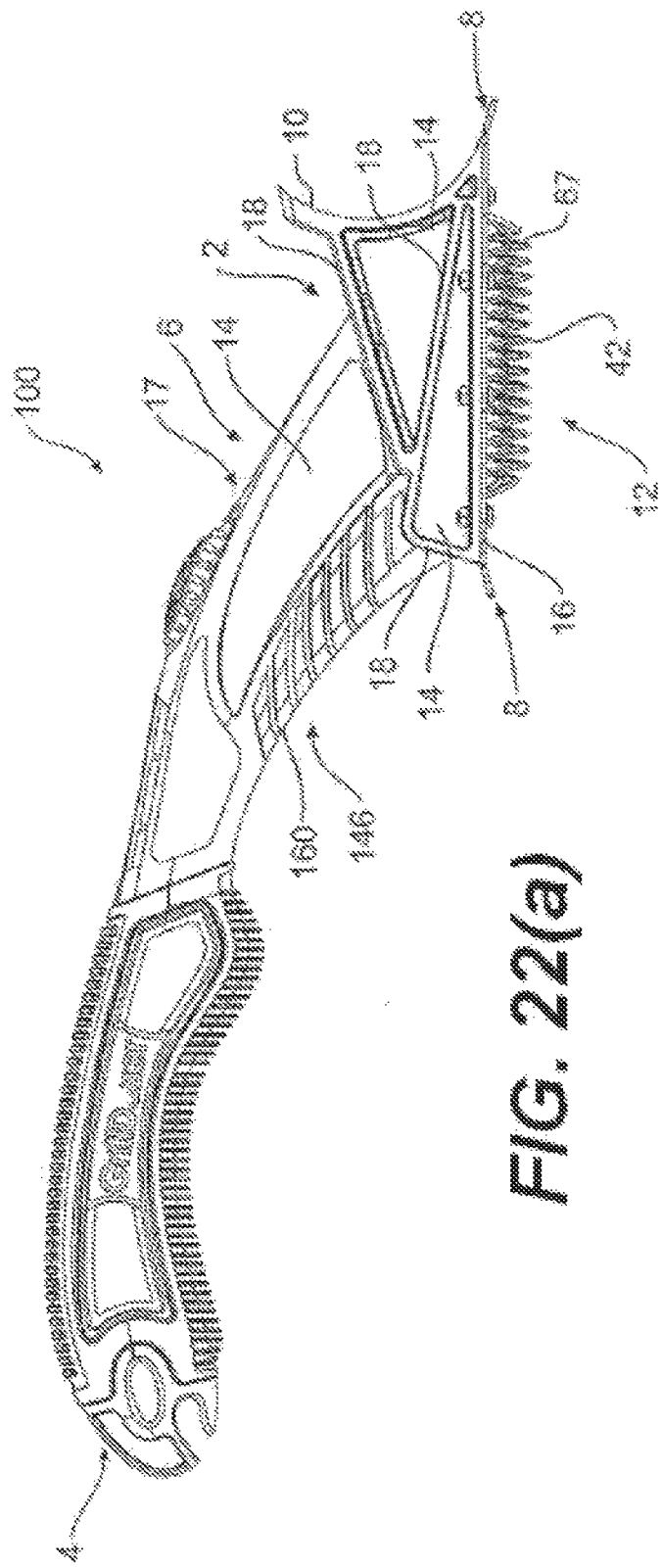
FIG. 22(a) is a side view of a scraper assembly comprising a handle, scraper head and coiled springs in accordance with an embodiment of the present invention.
Figure 22B:
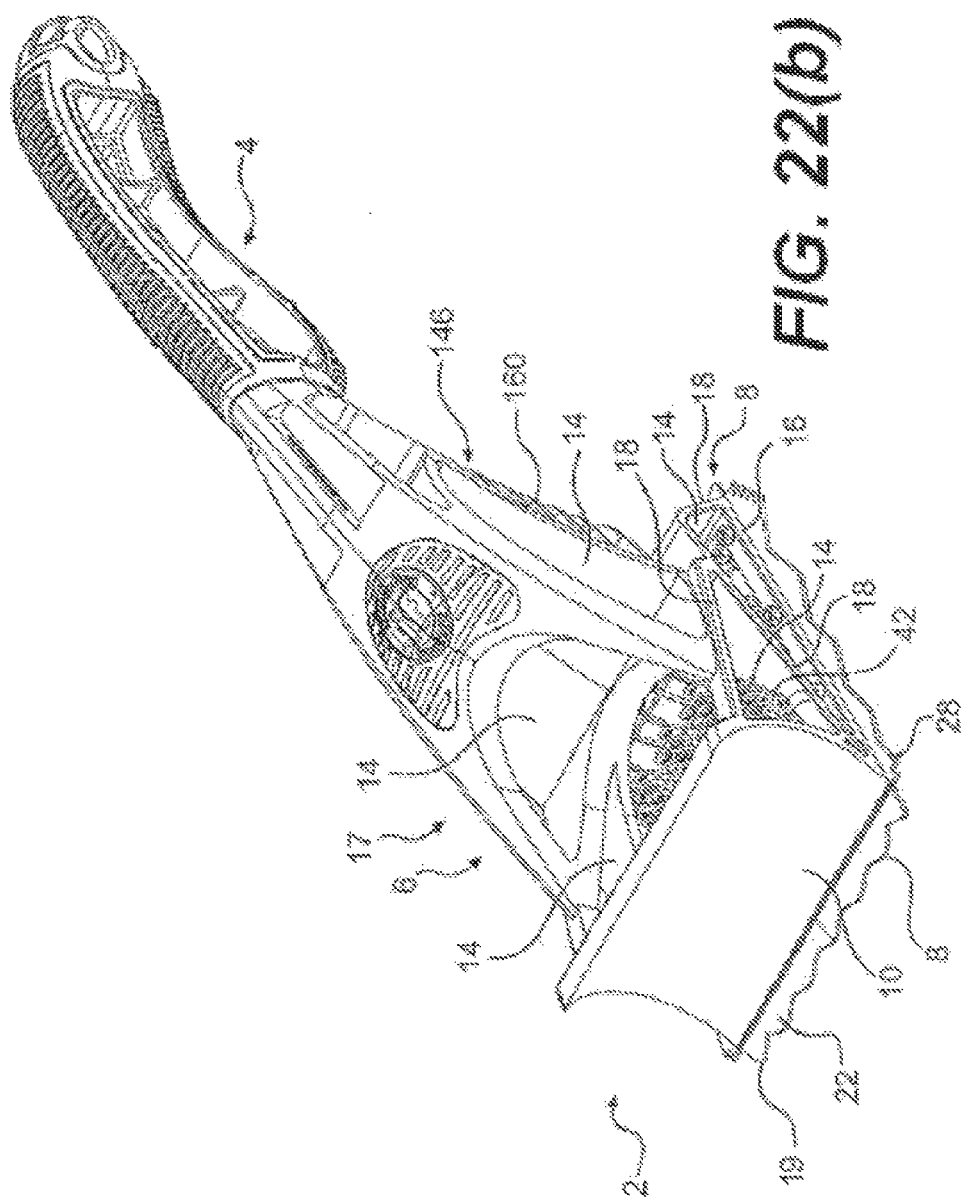
FIG. 22(b) is a perspective elevated front view of FIG. 22(a).
Figure 22D:
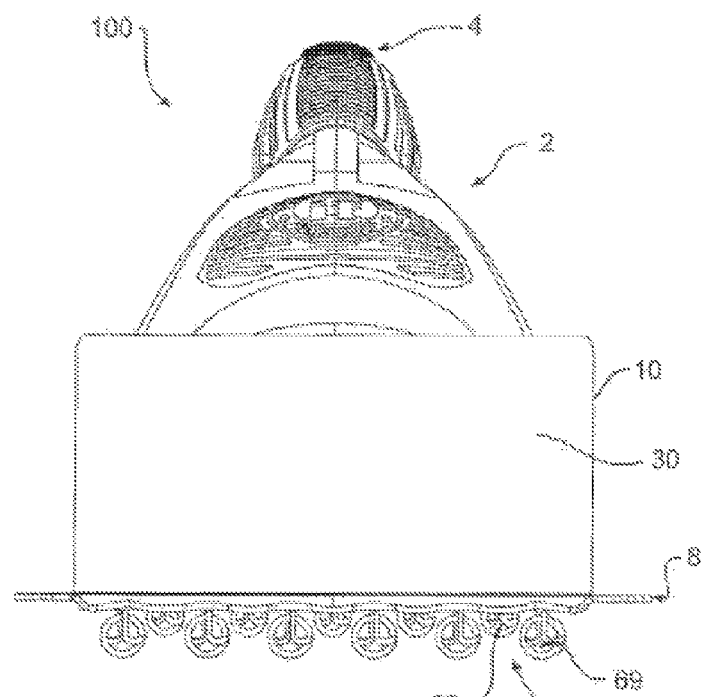
FIG. 22(d) is a front view of FIG. 22(a).
Figure 22E:
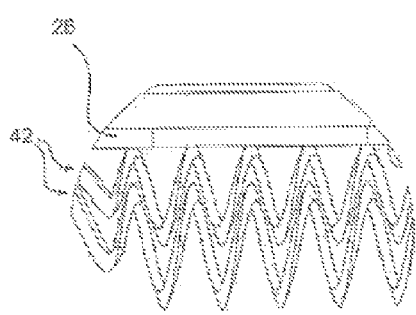
FIG. 22(e) is a side view of the coiled springs of FIG. 22(a).
Figure 22F:
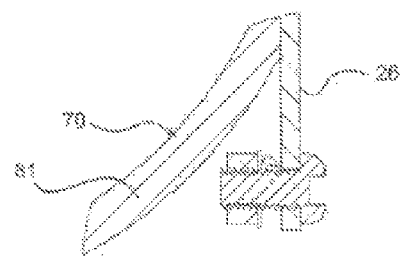
FIG. 22(f) is a cross-sectional view of the suspension spring of FIG. 22(a).

As shown in FIGS. 22(a)-22(c), spring abrader 12 may also be configured as a matrix of coiled springs 42 that can be used in compression and/or extension. Each coiled spring 42 may have an elongate coiled body 67, such as a cylindrical coiled body, comprising a plurality of coils 68 that forms a central aperture 69, that may be horizontally mounted to housing 6, frame 16 and/or modular frame component 26 via a suspension spring 70 such that coiled body 67 is either aligned perpendicular to or parallel to, sit on an upper surface of and/or slide between a set of grate bars 1 to facilitate cleaning. When pressure is applied to scraper head 2, coils 68 of coiled springs 42 may abrade an upper surface of and/or slide between grate bars 1 to abrade a side of coils 68. Coiled spring 42 operates by manipulating the coils 68 in a slicing action to remove debris from a grate or cross-bar. Furthermore, the highly flexible nature of coiled spring 42 ensures that it does not damage or mar a surface being abraded.

In a first embodiment shown in FIGS. 2-3, coiled spring 42 may be mounted to frame 16 and/or modular frame component 26 so that the length of coiled body 67 may be positioned perpendicular to the sides of frame 16 and/or modular frame component 26 and wherein the central aperture 69 faces a side of scraper head 2. The length of the hollow elongated body is positioned parallel to the blade edge 19. In this orientation, the length of coiled body 67 and central aperture 69 of coiled spring 42 is positioned perpendicular to a set of grate bars as scraper assembly 100 is moved in a forward and backward direction during operation. Coiled spring 42 may have uniform or variable coil diameters, pitch, handedness, coil density, coil rise angle, spring constants, deflection or any combination thereof.

Figure 23:
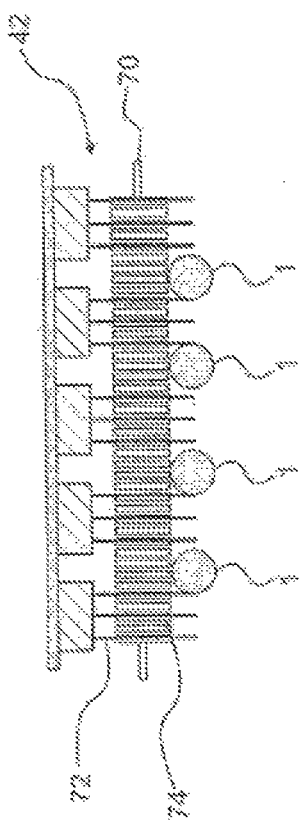
FIG. 23 is a cross-sectional view of two coiled springs in accordance with an embodiment of the present invention.

In this embodiment, scraper head 2 may include one or more sets of coiled springs 42 having different properties, as shown in FIG. 23. A set of first coiled springs 72 may be specifically configured to abrade a side surface of grate bar 1. Here, first coiled springs 72 may have individual coils 68 or groups of coils 68 that are spaced apart so as to generally correspond to the spacing between the grate bars 1. In this configuration, coils 68 or groups of coils 68 may slide between and abrade a side surface of grate bars 1. Notably, due to the resilient spring property of first coiled spring 72, coils 68 automatically expand or contract to complement a grate surface; therefore, the spacing between coils 68 need not precisely match that of the grate bars 1. The flexibility of coiled spring 72 enables it to conform to a wide variety of different grate configurations. In an exemplary embodiment, the spacing between coils 68 or groups of coils 68 may be about 0.22 inches to about 0.46 inches, preferably about by 0.31 inches to about 0.46 inches, more preferably, about 0.34 inches to about 0.46 inches and most preferably, about 0.35 inches to about 0.45 inches. First coiled springs 72 may have be highly flexible and loosely packed groups of coils 68 for accommodating a wide variety of grate configurations. In an exemplary embodiment, first coiled spring 72 may have a fixed variable spring constant or a spring constant of 2.2 kN/m to about 15 kN/m, preferably about 5 kN/m to about 15 kN/m. The outer diameter of first coiled spring 72 may be about 0.25 inches to about 0.5 inches. The pitch may be about 32 per inch to about 5 per inch. In one embodiment, first coiled springs 72 may be capable of sustaining 5-20 $lb_f$ over a range of 0.25 inches to about 0.4 inches, and the compressive strength of the spring may be small.

A set of second coiled springs 74 may be configured to effectively clean an upper portion of a grate. Second coiled springs 74 may have a plurality of individual coils 68 or group of coils 68 that are more tightly packed and may be less flexible than that of the first coiled springs 72. Coils 68 may either be uniformly or irregularly spaced along the length of its coiled body 67. Additionally, in an exemplary embodiment, second coiled springs 74 may have a variable spring constant or a spring constant of about 2.2 kN/m to about 15 kN/m, preferably about 5 kN/m to about 15 kN/m. The outer diameter of second coiled spring 74 may be about 0.25 inches to about 0.5 inches. The pitch may be about 32 per inch to about 5 per inch. In one embodiment, second coiled springs 74 may be capable of sustaining 5-20 $lb_f$ over a range of 0.25 inches to about 0.4 inches, and the compressive strength of the spring may be small.

Figure 25A:
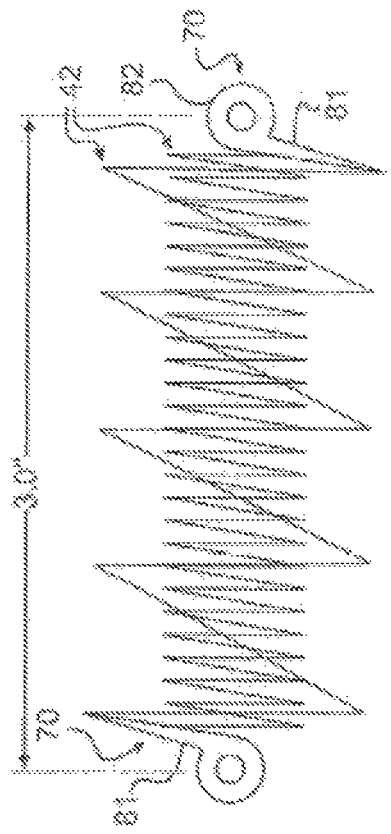
FIG. 25(a) is a top view of one suspension spring embodiment.
Figure 25B:
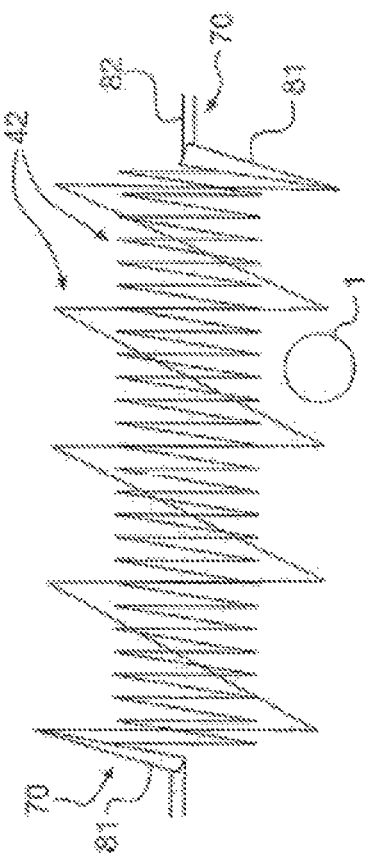
FIG. 25(b) is a front view of the suspension spring of FIG. 26(a).
Figure 25C:
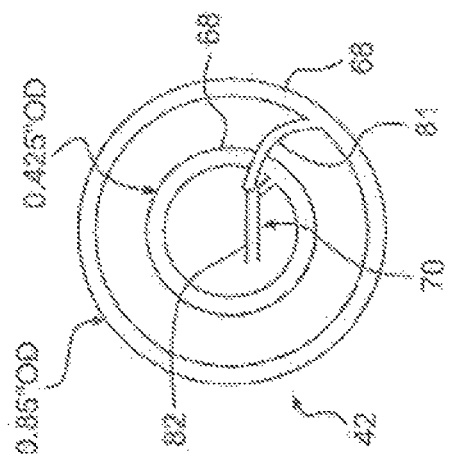
FIG. 25(c) is a side view of the suspension spring of FIG. 26(a).
Figure 26A:
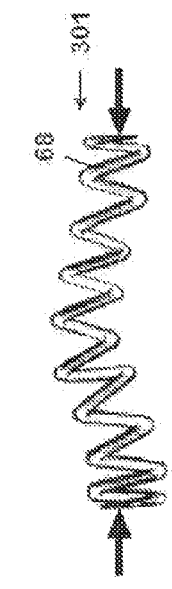
FIG. 26(a) is a schematic diagram showing a wire rope coiled spring buckling under a compressive force.
Figure 26B:
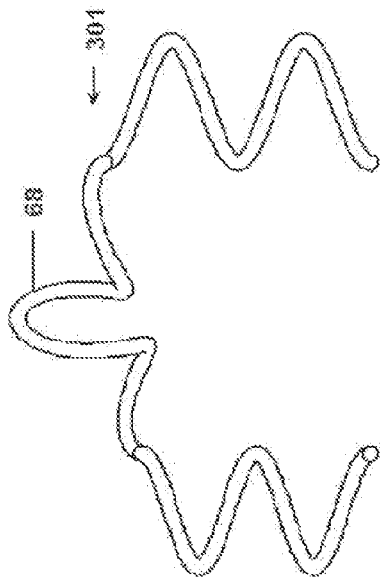
FIG. 26(b) is a schematic diagram showing a wire rope coiled spring conforming to the shape of a multiplaner surface to be cleaned.
Figure 26C:
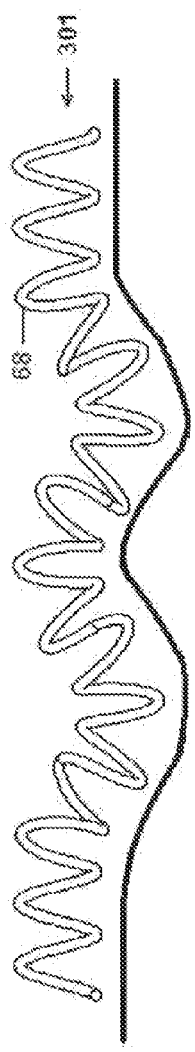
FIG. 26(c) is a schematic diagram showing a wire rope coiled spring in tension.
Figure 26D:
FIG. 26(d) is a schematic diagram showing a wire rope coiled spring when bent.

Scraper head 2 may include a plurality of first coiled springs 72, second coiled springs 74 or any combination thereof to effective clean multiple surfaces of a grate or cross-bar. In an exemplary embodiment, first coiled springs 72 may be arranged in a plurality of rows within scraper head 2. As the scraper head 2 is pressed against a grate, first coiled springs 72 are seated between the grate bars 1 while second coiled spring 74 conforms to the upper surface of the grate bars 1. Linear movement of the coils along the grate removes residue from the top and side portions of the bars 1. Rows of second coiled springs 74 may be interspersed between first coiled springs 72. In an exemplary embodiment, first and second coiled springs 72, 74 may be arranged in alternating rows. In an alternative embodiment, as shown in FIG. 25(*a*)-25(*c*), second coiled spring 74 may be located within first coiled springs 72. As shown here, an outer first coiled spring 72 may have about 5 loose coils for scraping in between grates. Inner second coiled compression coils 74 may have about 25 stiffer coils for cleaning a top of a grate and also for acting as a suspension mechanism. The diameter of the coils 68 of second coiled spring 74 may smaller than that of first coiled spring 72. Additionally, second coiled spring 74 may be mounted to housing 6 and/or modular frame component 26 a higher or lower elevation than first coiled spring 72.

Coiled spring 42 may be mounted to housing 6, frame 16 and/or modular frame component 26 using any suitably flexible suspension spring 70. Suspension spring 70 may have a flexible spring body 81 integrally or removably attached to a distal end of coiled spring 42 and a fastener 82 that for mounting to housing 6, frame 16 and/or modular frame component 26. In an exemplary embodiment, spring body 81 may be configured as length of a linear or curved resilient spring wire. Spring body 81 may also be an extension of coiled spring 42. In an alternative embodiment, spring body 81 may have the same shape, configuration as the flat springs 44 and/or individual segments 88 described below wherein spring body 81 is a resilient cantilever beam having no predisposed structural memory for permanent deformation.

Fastener 82 may be any conventional fasteners, such as a length of wire, threaded means, or eyelet, for connecting the distal ends of coiled spring 42 to housing 6, frame 16 and/or modular frame component 26. In an exemplary embodiment, fastener 82 may be a threaded means, such as a screw, around which spring body 81 may be wrapped. The screw may then be secured to an aperture positioned on housing 6, plate 16 and/or modular frame component 26.

Depending upon the location of fastener 82, suspension spring 70 may be vertically, horizontally or angularly suspended from housing 6, frame 16 and/or modular frame component 26 so as to enable a wide range of multi-planar motion of coiled spring 42. Two or more coiled springs 42 may be mounted at the same or different elevations with respect to one another. By varying the elevation at which one or more coiled springs are mounted, this design may facilitate the intended operation of first coiled spring 72 and second coiled spring 74. Specifically, first coiled spring 72 may be mounted at a lower elevation than second coiled spring 74 so that first coiled spring 72 may scrape a side surface of grate bar 1 while second coiled spring 74 scrapes an upper surface of grate bar 1. Alternatively or in addition to, plate 36 or any rigid structure anchored to a bottom surface of housing 6, frame 16 or modular frame component 26, may be used to apply pressure against select coiled springs 42, such as first coiled springs 72, forcing them between grate bars 1 while other coiled springs 42. These structures may be intermittently positioned so that only a select number of coiled springs 72 are forced between grate bars 1 while other coiled springs 74 rest on an upper surface of the grate bars 1.

Figure 27A:
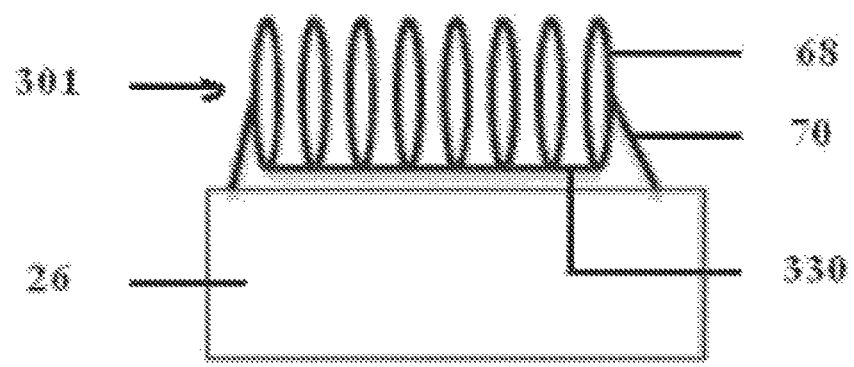
FIG. 27(a) is a schematic diagram showing a support structure attached to an upper surface of a wire rope coiled spring.
Figure 27B:
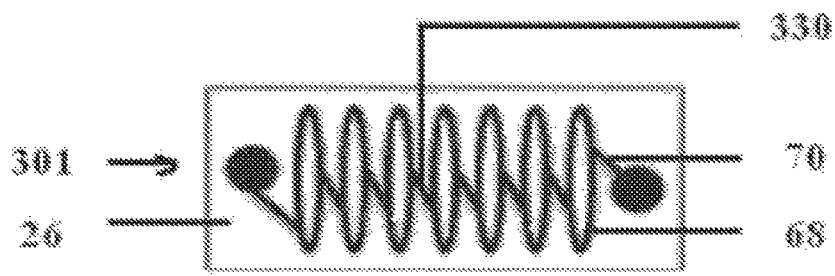
FIG. 27(b) is a bottom view of the support structure and wire rope coiled spring of FIG. 27(a).

In an exemplary embodiment shown in FIGS. 27(*a*)-29(*e*), coiled springs 42 may be constructed from the wire rope and operated under compression and/or extension. In one embodiment, wire rope coiled springs 301 may be constructed from wire rope, having the same or similar configuration, construction, material properties, mechanical properties and abrasive features as or used to form wire rope bristle 300. Consequently, wire rope coiled springs 301 and its strands 50 and wires 49 may also have the same contours, texturing and abrasive elements as that of wire rope bristles 300.

Preferably wire rope coiled springs 301 are constructed from a sufficient number of strands 50 and wires 49 to produce a highly resilient and flexible structure that can conform to a surface being cleaned, wherein the coils 68 of wire rope coiled springs 301 can easily slide between two or more grate bars 1. In one embodiment, wire rope coiled springs 301 are constructed from a single strand 50 having at least about seven wires 49, more preferably, at least about ten wires, more preferably, at least about seventeen wires 49 and most preferably, at least about nineteen wires 49. In another embodiment, wire rope coiled spring 301 is constructed from about two or more strands 50, preferably, about three or more strands 50, more preferably, about five or more strands 50 that are twisted, coiled or braided together, wherein each strand is constructed from about two or more wires 49, preferably about three or more wires 49, more preferably, about seven or more wires 49 and most preferably about nineteen or more wires 49 that are twisted, coiled or braided together.

In an exemplary embodiment, wire rope coiled springs 301 is constructed from a single strand 50 having nineteen or more wires 49. Strand 50 preferably has a diameter of about 0.062 in to about 0.068 in, and the wires 49 forming strand 50 preferably have a diameter of about 0.013 in. Wire rope coiled spring 301 preferably has a coil diameter of about 0.5 to about 3 in wherein the distance between the coils is about 0.25 in to about 0.75 in. Preferably, wire rope coiled spring 301 is constructed from 304 stainless steel.

Wire rope coiled spring 301 is highly flexible in the axial direction, such that one or more individual coil 68 or the entire row of coils 68 may be repeatedly bent at angles and still resist permanent deformation. As shown in FIGS. 26(*a*)-26(*b*), wire rope coiled spring 301 has little buckling resistance and consequently may be easily bent out of its normal resting axial plane. This enables wire rope coiled spring 301 to easily conform to the shape of the surface being cleaned, wherein all the coils 68 along the length of wire rope coiled spring 301 directly contact a multiplanar surface, resulting in a high degree of terrain mapping while still resisting permanent deformation. When subject to nonuniform axial loads, wire rope coiled springs 301 buckles but does not result in the permanent deformation of coils 68 or wire rope coiled spring 301. Furthermore, individual coils 68 may be highly distorted, pulled apart or splayed, as shown in FIGS. 26(*c*)-26(*d*), and resist permanent deformation; wire rope coiled spring 301 therefore has a high fatigue resistance. In addition to axial flexibility, wire rope coiled spring 301 is also resilient and flexible in a direction perpendicular to the axis of coiled spring 301. The flexibility of wire rope coiled spring 301 in both of these directions enhances the abrading capability and durability of wire rope coiled spring 301. In one embodiment, the wire rope coiled spring 301 has a spring constant of about 15 N/m to about 90 N/m, preferably, about 15 N/m to about 60 N/m, and more preferably, about 30 N/m to about 60 N/m, more preferably, about 30 N/m to about 45 N/m and most preferably about 30 N/m to about 35 N/m.

When pressure is applied to scraper head 2, coils 68 of coiled springs 42 may abrade an upper surface of and/or slide between grate bars 1 to abrade a side of coils 68. Coiled spring 42 operates by manipulating the coils 68 in a slicing action to remove debris from a grate or cross-bar. Furthermore, the highly flexible nature of coiled spring 42 ensures that it does not damage or mar a surface being abraded.

A support structure 330 positioned between housing 6, modular frame component 26 or frame 16 and an upper surface of one or more wire rope springs 301 is preferred to enhance the structural integrity and spring force of wire rope coiled spring 301. Support structure 330 provides back pressure against the top surface of wire rope coiled spring 301, inducing wire rope coiled spring 301 to extend towards a surface to be cleaned.

Figure 28:
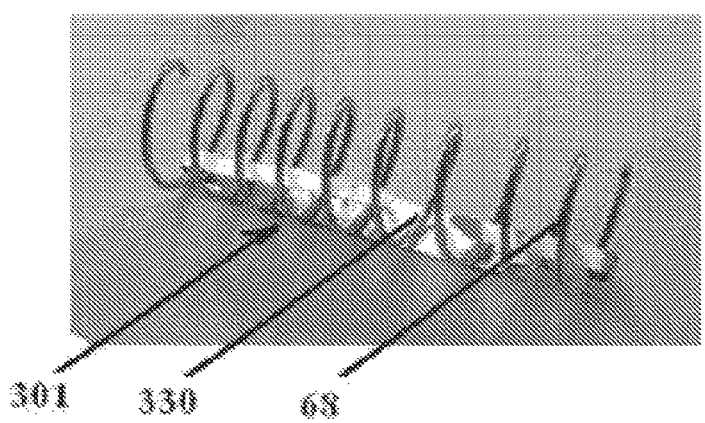
FIG. 28 is a perspective view of a wire rope coiled spring wherein the support member is a removable clip.
Figure 29A:
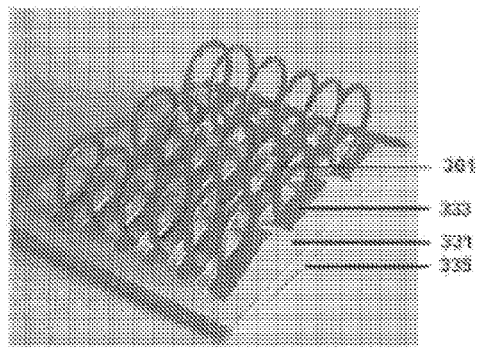
FIG. 29(a) is a perspective bottom view of a wire rope coiled spring coupled to another support structure.
Figure 29B:
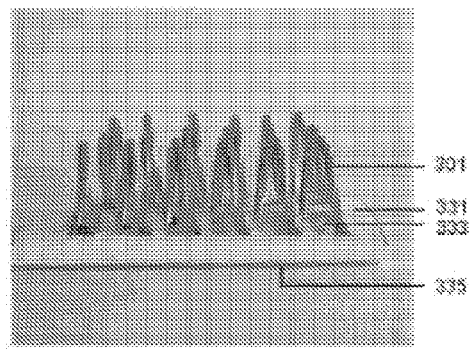
FIG. 29(b) is a perspective side view of the wire rope coiled spring and support structure of FIG. 29(a).
Figure 29C:
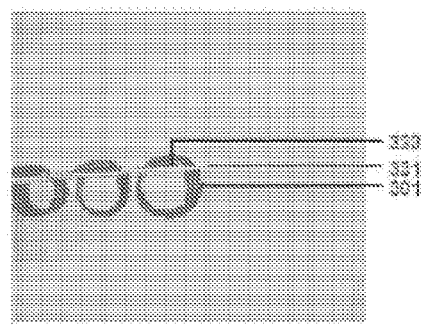
FIG. 29(c) is a perspective side view of the wire rope coiled spring coupled to a planar mounting frame of the support structure of FIG. 29(a).
Figure 29D:
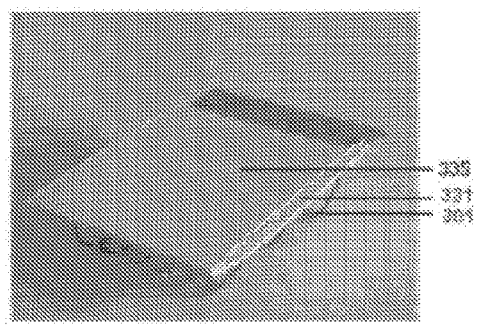
FIG. 29(d) is a perspective top view of the wire rope coiled spring and support structure of FIG. 29(a) showing the rigid backing of the support structure in a closed position.
Figure 29E:
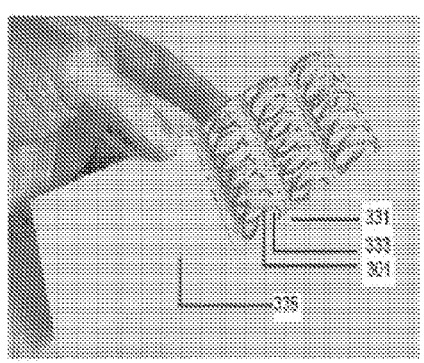
FIG. 29(e) is a perspective top view of the wire rope coiled spring positioned within the planar mounting frame of FIG. 29(a) with rigid backing in an open position.
Figure 29F:
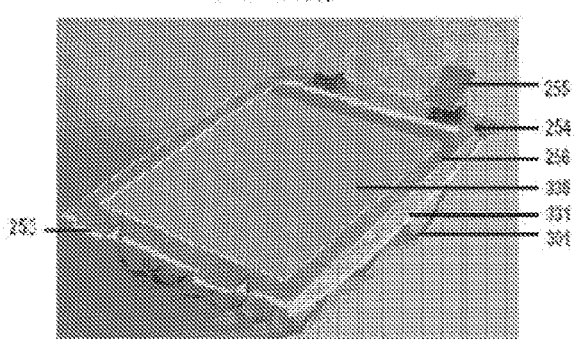
FIG. 29(f) is a perspective top view of the wire rope coiled spring and support structure of FIG. 29(a) coupled to a positioning frame.
Figure 30A:
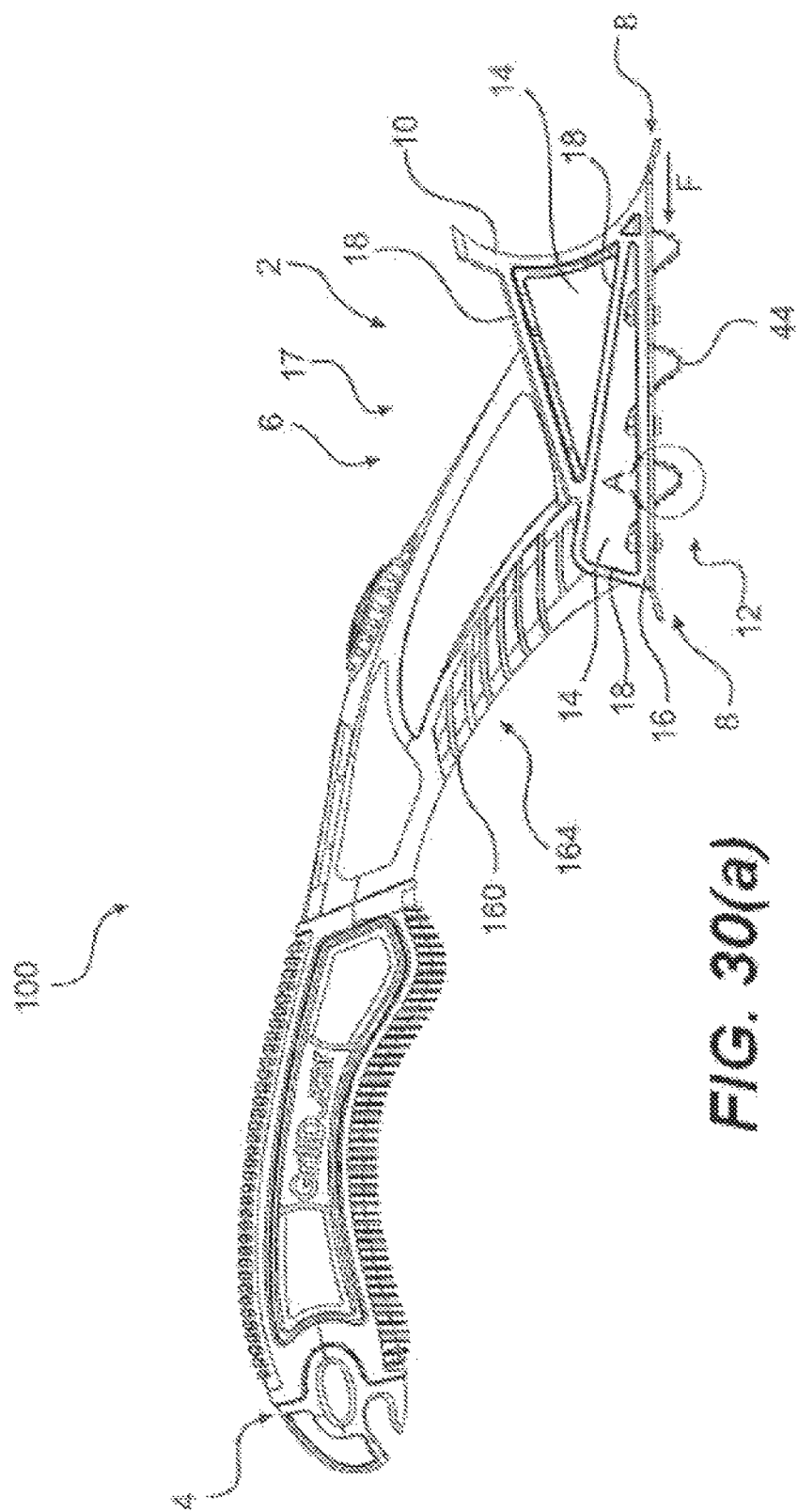
FIG. 30(a) is a side view of a scraper assembly comprising a handle, scraper head and leaf spring configured flat spring abraders in accordance with an embodiment of the present invention.
Figure 30B:
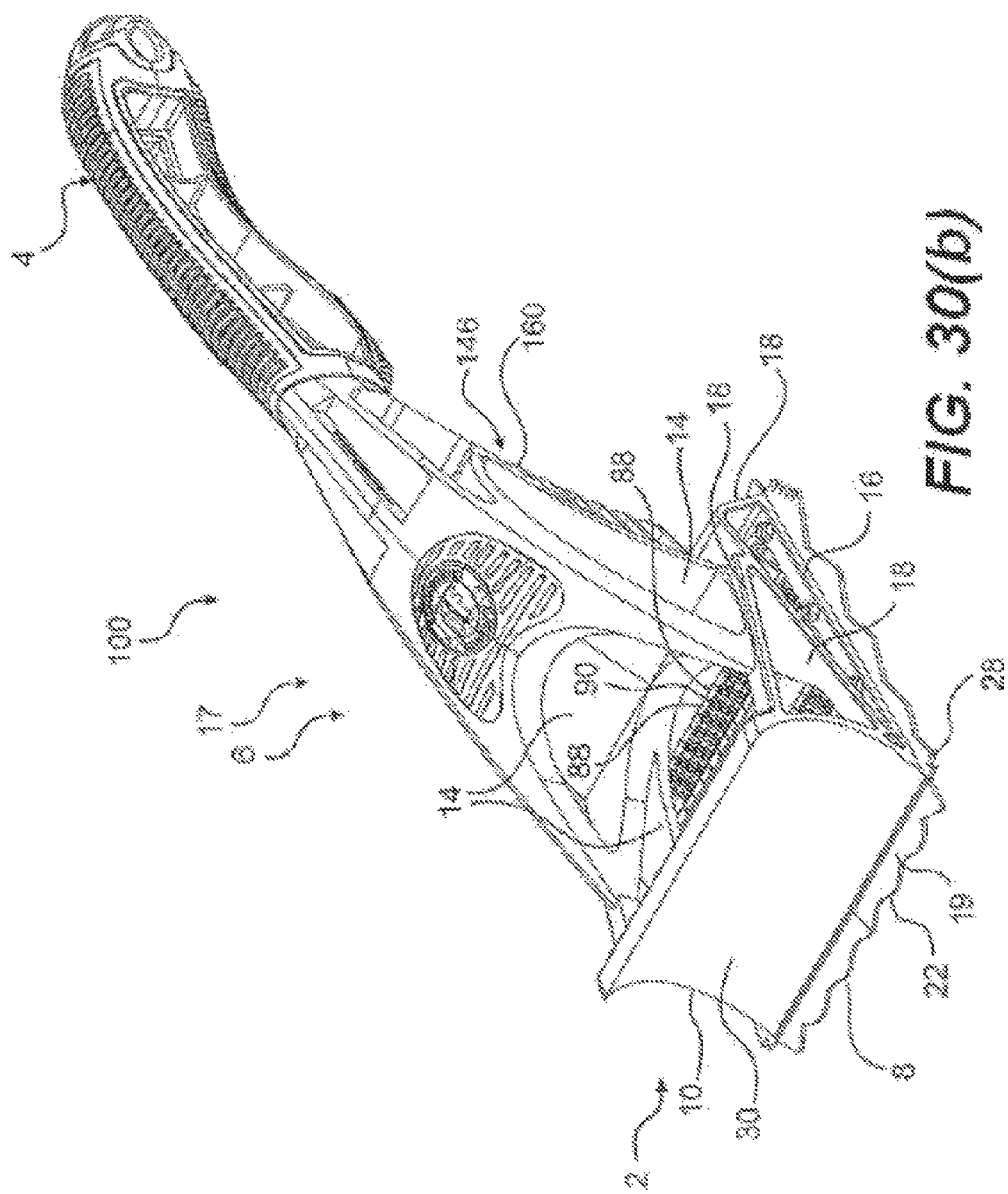
FIG. 30(b) is a perspective view of FIG. 30(a).
Figure 30C:
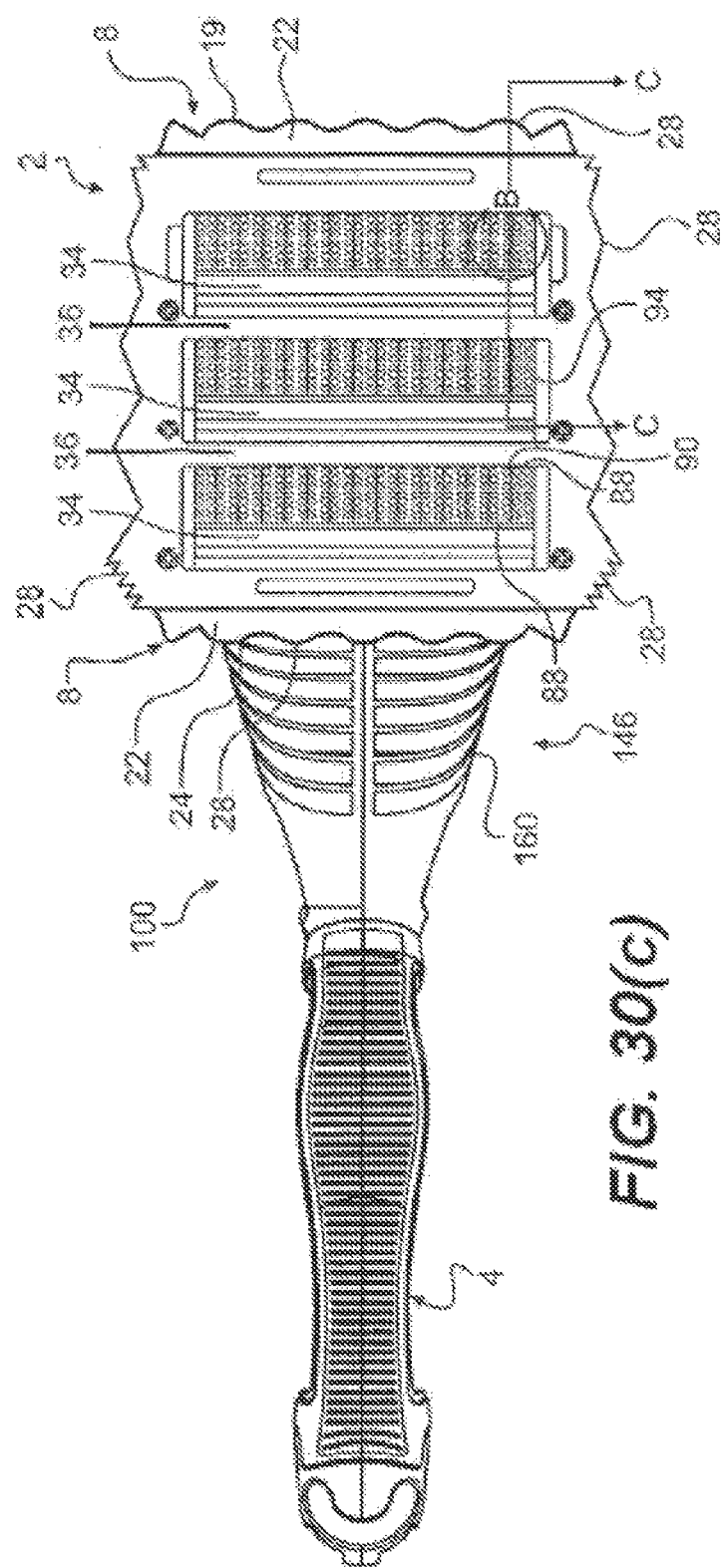
FIG. 30(c) is a bottom view of FIG. 30(a).

In one embodiment, support structure 330 may be a rigid member. Support structure 330 may be integrally formed with or attached to the lower surface of housing 6, modular frame component 26, frame 16 or plate 36 via any conventional means, such as an adhesive or threaded fasteners. Alternatively, as shown in FIGS. 27(*a*)-27(*b*), support structure 330 may be integrally formed with an upper surface of one or more wire rope coiled springs 301. When integrally formed with or removably attached to an upper surface of wire rope coiled spring 301, support member 330 traverses and rigidly connects two or more coils 68 along the upper surface of wire rope coiled spring 301, as shown in FIGS. 27(*a*)-27(*b*). Alternatively, support member 330 can be configured as a clip positioned along an upper or side surface of wire rope coiled springs 301 to assist in maintaining a desired coiled form, as shown in FIG. 28, wherein the clip may be used to adjust the space between each coil. Support structure 330 therefore functions to brace, provide back pressure to and connect the coils 68 of wire rope coiled spring 301, enabling effective surface abrasion.

In an exemplary embodiment shown in FIGS. 29(*a*)-29(*d*), support structure 330 includes a planar mounting frame 331 including a plurality of slots 333 oriented parallel relative to one another for receiving and positioning the coils of wire rope coiled springs 301. As shown, planar mounting frame 331 may have multiple rows of slots 333 for receiving a plurality of wire rope coiled springs 301. A rigid backing 335 of the support structure 330 hingedly connected to planar mounting frame 331 applies pressure against the upper surface of the wire rope coiled springs 301. As shown in FIG. 29(*e*), wire rope coiled springs 301 may be removably mounted to planar mounting frame 331 and its rigid backing 335. During assembly, wire rope coiled springs 301 is inserted in the slots of planar mounting frame 331. Subsequently, hinged rigid backing 335 is closed over so as to cover an upper surface of wire rope coiled springs 301. A fastener, such as a snap or clamps may be used to removably position rigid backing 335 in this closed position relative to planar mounting frame 331.

FIG. 29(*f*) shows a positioning frame 254 that can be coupled to support structure 330 and subsequently attached to a frame 16 of scraper assembly 100. Positioning frame 254 may be integrally formed with rigid backing 335 or may be attached to support structure 330 by welding, an adhesive means or other fasteners. In one embodiment, positioning frame 254 may be attached to support structure 330 in the same manner as shown in FIG. 35(*a*)-35(*f*), described below. In this embodiment, the latches 253 of positioning frame 254 can be inserted through corresponding holes positioned along a perimeter of support structure 330 and corresponding holes of frame 16. Subsequently, a pair of snaps 253 may be used to clamp positioning frame 254 to frame 16.

In an exemplary embodiment, due to the variability in grate bar spacing, coiled springs 42 may be manually adjusted to accommodate multiple surfaces having different grate spacing or configurations. In an exemplary embodiment, shown in FIGS. 26(*a*)-26(*b*), a screw may be inserted in the aperture defined by suspension spring 70. As the screw is turned, suspension spring 70 applies tension to one or more coiled springs 72, 74 so that coils 68 become more spread apart. Additionally, the applied tension may also change the pitch of coils 68 which also affects the coil spacing. Therefore, by turning fastener 82, it may be possible to adjustably spread apart, compress or angled a coiled spring 42 to compliment the topography of a specific surface.

Figure 24:
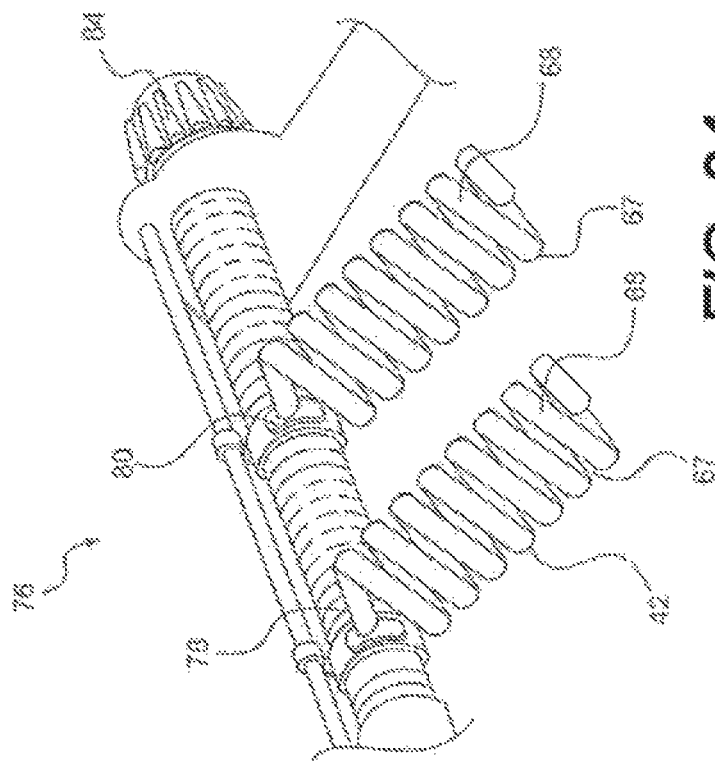
FIG. 24 is a coiled spring adjustment mechanism in accordance with an embodiment of the present invention.

In the exemplary embodiment shown in FIG. 24, coiled spring 42 may be attached to a worming mechanism 76 that controls the tension, spacing and/or of coils 68. Worming mechanism 76 may be used to rotate and/or adjust the spacing and angular orientation of coiled spring 42, thereby minimizing or eliminating the occurrence of fatigue or fracturing and/or enabling coiled springs 42 to accommodate a wide variety of grated surfaces. In this embodiment, a fastener 82 of suspension spring 70 attaches coiled springs 42 to one or more adjustment rods 78 via a collar 80. Collar 80 may slide along adjustment rod 78 to adjust the spacing between two coiled springs 42. Adjustment rod 78 which may be received in a slot of housing 6, frame 16 and/or modular frame component 26. A knob 84 may be attached to and may induce rotational movement of adjustment rod 78 to enable rotational and angular adjustment of coiled spring 42. When rotated, adjustment rod 78 applies tension to coiled spring 42 so that the relative spacing between coils 68 may be changed. Additionally, the applied tension also changes the pitch of coils 68 which may further affect the spacing between coils 68. Therefore a user may manually adjust the position of coiled springs 42 and spacing as well as angular orientation of coils 68 to enable a wide range of applications. Moreover, worming mechanism 76 may further include a mechanism for rotating coiled springs 42 so that it turns on its axis to present a new coil surface for cleaning a surface.

In a second embodiment shown in FIGS. 22(*a*)-22(*f*), coiled spring 42 may be mounted to frame 16 and/or modular frame component 26 so that the length of coiled body 67 may be positioned parallel to the sides of frame 16 and/or modular frame component 26 and wherein the central aperture 69 faces a frontal region of scraper head 2. The length of the hollow elongated body is positioned perpendicular to a blade edge 19. In this orientation, the length of coiled body 67 and central aperture 69 of coiled spring 42 are positioned parallel to a set of grate bars as scraper assembly 100 is moved in a forward and backward direction during operation. This orientation provides a number of unexpected advantages, namely the sides of coils 68 when oriented in this direction provide greater resistive force against a side of the grate bars 1 in comparison coils 68 of the first exemplary embodiment, thereby enhancing the abrasive force. Moreover, this orientation also increases the abrasive surface area in comparison to the coiled springs of the first exemplary embodiment.

Unlike the first coiled spring embodiment, in this embodiment only one set of coiled springs 42 need be employed to clean both an upper and side surface of grate bar 1. In this embodiment, when pressure is applied to scraper head 2, the entire length of coiled bodies 67 of coiled springs 42 located between grate bars 1 may automatically be squeezed between grate bars 1. Other coiled springs that are positioned on top of grate bars 1 may rest on an upper surface thereof upon application of pressure. In an exemplary embodiment, a central aperture 69 of coils 68 may have a diameter that generally correspond to the spacing between the grate bars 1. This configuration may facilitate the sliding of coiled spring 42 between grate bars 1. Notably, due to the resilient spring property of first coiled spring 42, coils 68 automatically expand or contract to complement a grate surface; therefore, the diameter of a central aperture 69 of coils 68 need not precisely match the spacing between grate bars 1. The flexibility of coiled spring 42 enables it to conform to a wide variety of different grate configurations. In an exemplary embodiment, the diameter of a central aperture 69 of coils 68 may be about 0.22 inches to about 0.46 inches, preferably about by 0.31 inches to about 0.46 inches, more preferably, about 0.34 inches to about 0.46 inches and most preferably, about 0.35 inches to about 0.45 inches. In an exemplary embodiment, coiled springs 42 may have a variable spring constant or a spring constant of about 2.2 kN/m to about 15 kN/m, preferably about 5 kN/m to about 15 kN/m.

Although not required, scraper head 2 may also include a second set of coiled springs 42 having a larger central aperture 69. The larger diameter may be used to ensure that the coiled springs 42 remain positioned on an upper surface of the grate bars 1. In this exemplary embodiment, coiled springs 42 may have a variable spring constant or a spring constant of about 2.2 kN/m to about 15 kN/m, preferably about 5 kN/m to about 15 kN/m. The outer diameter of coiled spring 42 may be about 0.25 inches to about 0.5 inches. The pitch may be about 32 per inch to about 5 per inch. In another exemplary embodiment, one coiled spring 42 may have a diameter of about 0.34 inches while another set of coiled springs 42 may have a larger diameter of about 0.40 inches. The compressive strength of the spring may be small.

In an exemplary embodiment, these two types of coiled springs 42 may be arranged in alternating rows. In another embodiment, the smaller diameter coiled springs 42 may be positioned within the larger diameter coiled springs 42. Additionally, larger diameter coiled spring 74 may be mounted to housing 6 and/or modular frame component 26 a higher or lower elevation than the small diameter coiled spring 42.

The previously described suspension spring 70 and/or worming mechanism 76 may also be used in association with the second coiled spring embodiment. In an exemplary embodiment, suspension spring 70 may be a rigid spring wire or hinge that holds coiled spring 42 at a downward inclined, horizontal or upward inclined elevation. The rigidity and ability of suspension spring 70 to maintain a position or angular orientation affects the operation of coiled springs 42.

In this embodiment, a distal end of spring body 81 connected to coiled spring 42 may be positioned substantially in a center or middle region of an end coil 68 of coiled spring 42. This position ensures that coiled spring 42 maintains a substantially uniform formation when a force is applied to a length of coiled body 67. Therefore, when coiled spring 42 encounters a grate bar, the entire coiled body 67, rather than only the portion of coiled spring 42 immediate to the point of contact, responds to the applied force. Preferably, the entire length of coiled body 67 uniformly responds to applied force. The distal end of spring body 81 connected to coiled spring 42 should be positioned so that the proximal end of spring body 81 mounted to housing 6 deforms in the manner of a torsion spring.

In other applications or under other circumstances, positioning the distal end of spring body 81 at an upper region, lower region, side regions or along the perimeter of an end coil 68 of coiled spring 42 may be desirable.

The angular orientation of spring body 81 may also affect the ability the ability of coiled spring 42 to slip between the bars of a grated surface. When spring body 81 is inclined at an upward angle relative to the site of mounting, this position may induce coiled spring 42 to sit atop a grate bar 1. Alternatively, when spring body 81 is oriented at a downward angle relative to the site of mounting, coiled spring 42 may be induced to slip between grate bars 1 upon an application of force. In this embodiment, spring body 81 may be angled in an upward direction relative to the site of mounting any where between about 0 to about 30 degrees or angled downward relative to a site of mounting between about 0 to about 30 degrees.

Additionally, the length of spring body 81 may further affect the ability of coiled spring 42 to slip between the bars of a grated surface. The longer spring body 81, the more flexible coiled spring 42 and the more easily coiled spring 42 may squeeze between grate bars 1. In an exemplary embodiment, scraper head 2 may include a plurality of coiled springs 42 attached to scraper head 2 using spring bodies 81 of different lengths. A plurality of coiled springs 42 may be coupled to scraper head 2 using suspension springs 70 with short spring bodies 81 designed to sit on top of a grate bar 1 and using suspension springs 70 with long spring bodies 81 to facilitate abrasion of a side of a grate bar 1. In an exemplary embodiment, the length of spring body 81 may be between 1 to about 5 inches.

Coiled springs 42 of the aforementioned embodiments may have any shape, size and configuration suitable for their aforementioned functions. In an exemplary embodiment, coils 68 may be circular, oval, rectangular, square, triangular or any other suitable geometric configuration. In an exemplary embodiment, the coiled springs may have a variable wire diameter, coil diameter, pitch, handedness, coil density, coil rise angle, spring constant, lateral deflection. These properties may also change throughout the coiled spring.

Coiled spring 42 may be fabricated from any flexible material that retains a sufficient amount of tension to enable scraping, including metals, including tempered metals, non-tempered metals and memory metals like nitinol, plastics, such as thermoplastics, ceramics or any combination thereof. In an exemplary embodiment, coiled spring 42 may be a flexible gauge stainless steel or a hardened stainless steel having a gauge of at least 1060. A brass and/or ceramic material may be particularly well suited for minimizing and/or preventing damage to a surface. Coiled spring 42 may also be coated with a non-stick material, such as a non-toxic fluoropolymer resin or Teflon®, to prevent debris from adhering to coiled springs 42. Coiled spring 42 may further be heat treated to enable operation at high temperatures.

As shown in the exemplary embodiments of FIGS. 30(*a*)-30(*f*) spring abrader 12 may be configured as one or more flat spring 44 that are designed to enable fine microcleaning of a surface. Flat spring 44 may have a high degree of flexibility suitable for applying sufficient force to remove embedded debris without scratching, marring or otherwise damaging a surface. Specifically, the flat spring 44 may function as a cantilever beam that has an active vertical deformation that given its properties will exhibit a normal force onto the surface during scraping. Once depressed, the sides of the hinge act as abrasive surfaces along the sides of the grate to remove fine particulates, such as baked-on or crusted food debris.

Flat spring 44 may have any configuration suitable for enabling effective and efficient cleaning. In a first exemplary embodiment shown in FIGS. 30(*a*)-30(*f*), flat spring 44 is configured as a leaf spring may have a thin planar body 86 bent in a curved configuration having one or more independent segments 88. Segments 88 may be independently movable relative to one another and may be particularly effective in cleaning multiplaner surfaces. Segments 88 may be positioned either immediately adjacent to one another or may be separated by a space 90. Each spring segment 88 may have a first end 91 and a second end 92 which may be connected to the second end 92 of adjacent segments 88. In an exemplary embodiment, segments 88 may be joined at either one or both of its ends 91,92 of flat spring 44. Otherwise, segments 88 may be independent relative to each other and may be free to move in different directions. In an exemplary embodiment segments 88 may be free to move backwards, forwards and from side to side. Segments 88 may have a curved configuration that is stiff in one direction but otherwise highly flexible. Therefore, flat spring 44 may be resistant to deformation in a direction of arrow F, as shown in FIG. 30(*a*), namely in a direction substantially parallel to a mounting surface of housing 6, frame 16 and/or modular frame component 26. Segments 88 may be free, however, to roll forward, backward and/or from side to side. This design allows flat spring 44 to achieve a high degree of flexibility wherein the flat spring 44 may have an exemplary spring constant of about 2.2 kN/m to about 15 kN/m, preferably about 5 kN/m to about 15 kN/m. Alternatively, flat spring 44 may have a variable spring rate. Additionally, the dimensions of segments 88 may be designed to enhance flexibility. In an exemplary embodiment, each segment 88 may be about 0.25 inches wide and about 0.02 inches thick. Furthermore, the length of segment 88 may be adjusted to change the flexibility of flat spring 44. The length may be adjusted by fixing flat spring 44 with a locking or immobilization mechanism thereby enabling the vertical deformation and stiffness to change or to be fixed. In general, the flat spring body 86 and/or tip 94 may have any geometric configuration, including, triangular or semi-circular. In an exemplary embodiment, the flat spring 44 body may have a U or V shape with a curved tip that allows back and forth movement over irregular surfaces. While one U shaped segment 88 may be flexed to abrade an upper surface of a grate bar, an adjacent U shaped segment 88 may be extended and used to abrade the sides of a grate bar.

One or more surfaces of segments 88 may be partially or entirely covered in previously mentioned abrasive elements 28. In an exemplary embodiment, abrasive element 28 may have a grater configuration with a plurality of cutting edges 96 surrounding an aperture 98 to create a puckered structure, as shown FIG. 30(*e*). Abrasive elements 28 may vary in size, shape, configuration and angular orientation. Abrasive elements 28 may also be independently moveable with respect to flat spring 44. In one embodiment, flat spring body 86 may have two or more abrasive elements having different sizes, shapes, configurations and/or angular orientations. These abrasive elements may be uniformly arranged or randomly dispersed on any surface of flat spring 44. In an exemplary embodiment, abrasive elements may be arranged in one or more rows and/or staggered relative to one another. To further facilitate abrasion, one or more edge 102 of segment 88 may be sharpened to provide a cutting surface. Additionally, abrasive elements 28, such as teeth or serrations, may be positioned along one or more edge of segment 88.

As shown in the exemplary embodiment of FIG. 30(*f*), a second ends 92 of flat spring 44 and/or segment 88 may be mounted to a surface of housing 6, frame 16 and/or modular frame component 26. As shown in the exemplary embodiment of FIG. 30(*f*), one flat spring end 92 may be mounted to a surface of housing 6, modular frame component 26 and/or housing 6 while an opposing first end 91 may be free to vertically move up and down. In this embodiment, each segment 88 functions like a cantilever spring. Second end 92 may be integrally formed with or removably attached to housing 6, frame 16 and/or modular frame component 26.

In an alternative embodiment, both the first end 91 and the second end 92 may be anchored to housing 6, frame 16 or a modular frame 26. Each segment 88 would then function like a leaf spring that rides up a down while attached at the two ends. In some instances, flat spring 44 may also include segments 88 that are hinged at a second end 92 as well as segments 88 that are hinged at both ends 91,92.

Flat spring 44 may be fabricated from any material, including metals, plastics, such as thermoplastics, ceramics or any combination thereof. In an exemplary embodiment, flat spring 44 may be constructed from a metal or metal alloy, such as stainless steel, specifically stainless steel having a gauge of 1060.

In operation, when pressure is applied from the handle to the curved body of the flat spring 44, tip 94 may deflect upwards and roll back and forth or side to side, enabling the flat spring 44 to more closely conform to and remove debris from a surface. Each segment 88 of flat spring 44 may independently respond to the applied force by moving in one or more directions. Debris may be removed from a surface as abrasion elements 28 and edges 102 of segments 88 roll and bend over the surface. Flat spring 44 and segments 88 function as cantilever beams with a free end that moves vertically up. Upon deflection, a normal force is applied to the scraping surface. Upward deflection of body 86 may be resisted and restricted when the vertical movement of first end 91 hits and is restricted by housing 6, frame 16 and/or modular frame component 26. These structural stops limit blade flexion, focus the energy of attack and/or prevent undue stress and fatigue of flat spring 44. The flat spring end 92 and various stop structures function to prevent flat spring 44 from permanently deforming. Specifically, they inhibit flat spring body 86 and/or individual segments 88 from inverting or moving in a direction that would induce permanent deformation.

FIGS. 1(*a*)-1(*b*) show another embodiment of flat spring 44 that may be particularly suited for gathering debris rather than exerting an outward debris pushing force. The flat spring 44 of this embodiment may be useful for gathering bulky debris. In this embodiment, flat spring 44 is configured as a flat cantilever spring and may have one or more independently flexible fingers 104 that are attached to scraper assembly 100 at only one location.

Fingers 104 may have any suitable configuration that allows for flexibility and facilitates the gathering and removal of debris. In an exemplary embodiment, finger 104 may have one or more flexible members, such as a flexible finger body 110 and a flexible finger tip 112, angularly oriented with respect to one another to facilitate scraping and/or debris removal. In one embodiment, finger tip 112 may be aligned with finger body 110 so as to form an integral structure having a flat blade like construct. Alternatively, finger tip 112 may have an acute, obtuse or oriented at a right angle with respect finger body 110. In an exemplary embodiment, the angle between finger body 110 and a finger tip 112 may be about 5 to about 45 degrees. Finger body 110 and finger tip 112 may have any shape size or configuration. As shown in the exemplary embodiment of FIGS. 1(*a*)-1(*b*), finger body 110 may have a rectangular shape and a flat inclined finger tip 112 having a rectangular or square shape. Other exemplary finger tips 112 may have a structure similar to a blade, wedge, anvil or spear point. In an exemplary embodiment, flat spring 44 may include two or more fingers 104, finger tips 112 and/or finger bodies 110 having different sizes, shapes or configurations, each of which may serve a different purpose and may be suited to different applications. This design creates a high degree of flexibility of about, preferably, about, more preferably, about and most preferably, about 0 to about 0.45 inches. The range of flexibility may be adjusted by adjusting the length, spring rate and/or angle of orientation of fingers 104 and/or its components. In an exemplary embodiment, flat spring 44 has an exemplary spring constant of about 2.2 kN/m to about 15 kN/m, preferably about 5 kN/m to about 15 kN/m. In an exemplary embodiment, the flat spring 44 may have a variable spring rate to enable adjustability. The flexibility of flat spring 44 may be adjusted by immobilizing a length of the spring body.

Each finger tip 112 terminates in a finger scraper edge 114, which may be contoured with abrasive elements 28 to facilitate abrasion. A surface of finger tip 112 and/or finger body 110 may also include one or more abrasive structures 28 to facilitate scraping. The abrasive structures 28 may be the same as previously in the embodiment of FIGS. 30(*a*)-30(*f*). In an exemplary embodiment, these abrasive surfaces may be located on a bottom surface, upper surface, side surface or any combination thereof of fingers 104.

A second end of fingers 104 may be attached to a base 106. Base 106 functions to restrict flexibility of fingers 104 in an upward deflection to prevent deformation and overextension of flat spring 44. Additionally, the upward deflection of fingers 104 may further be restricted by adjacent structures, such as housing 6, scraper blade 8, frame 16, modular frame component 26 or any combination thereof.

As shown in the exemplary embodiment of FIGS. 1(*a*)-1(*b*), fingers 104 may be attached housing 6, frame 16 and/or modular frame component 26 via base 106. Alternatively, base 106 may be suspended from housing 6 via springs or other suspension mechanisms to provide added flexibility. Flat spring 44 and fingers 104 may be positioned at any location on housing 6, scraper blade 8 and/or girder. Fingers 104 may be positioned at a front, rear and/or side surface of housing 6 and/or scraper head 2. Additionally, one or more fingers 104 may have the same or different levels of elevation and/or angular orientation with respect to one another. For example, one or more fingers 104 may be oriented substantially parallel to housing 6, whereas another finger or group of fingers 104 may be oriented at an acute, obtuse or right angle relative to housing 6, frame 16 and/or modular frame component 26. The elevation and/or angular orientation of fingers 104 may also be adjusted to accommodate various surfaces and/or applications. Fingers 104 may further be positioned in any orientation, including a contiguous array that forms a uniform blade like structure or a non-contiguous array, wherein fingers 104 may have a splayed rake like formation.

FIGS. 1(*a*)-1(*b*) show another embodiment of flat spring 44 that may be particularly suited for gathering debris rather than exerting an outward debris pushing force. The flat spring 44 of this embodiment may be useful for gathering bulky debris. In this embodiment, flat spring 44 may have one or more independently flexible fingers 104 that are attached to scraper assembly 100 at only one location.

Flat spring 44 and/or fingers 104 may have any geometric shape, such as a rectangular, circular, elliptical or curved shape. In an exemplary embodiment, flat spring 44 and/or finger scraper edge 114 may form a collective curved configuration, pointed configuration or other geometric shape that optimizes cleaning capability. To optimize removal of entrained debris, flat spring 44 and/or finger scraper edge 114 may have a curved geometry wherein a first set of fingers create a leading edge of abrasive contact followed by subsequent abrasive contact from adjacent fingers 104.

Flat spring 44 may also be fabricated from any suitable flexible material that retains a sufficient amount of tension to enable scraping, including metals, including tempered metals, non-tempered metals and memory metals like nitinol, plastics, such as thermoplastics, ceramics or any combination thereof. In an exemplary embodiment, flat spring 44 may be a flexible gauge stainless steel or a hardened stainless steel having a gauge of at least 1060. A brass and/or ceramic material may be particularly well suited for minimizing and/or preventing damage to a surface. Flat spring 44 may also be coated with a non-stick material, such as a non-toxic fluoropolymer resin or Teflon®, to prevent debris from adhering to flat spring 44. Flat spring 44 may further be h24eat treated to enable operation at high temperatures.

In operation, when pressure is applied from handle 4, fingers 104 may deflect upwards, enabling flat spring 44 to more closely conform to and remove debris from a surface. Upward deflection of fingers 104 may be restricted by the adjacent surfaces and structures of flat spring 44, namely scraper blade 8, frame 16, modular frame component 26, housing 6, handle or adjacent flat springs 44 or any combination thereof. Stop structures may also be attached to any portion of the scraper assembly 100. In an exemplary embodiment, flat spring 44 may also include stops that limit the flexion of fingers 104 in order to focus the energy of attack and prevent undue stress and fatigue of flat spring 44. Flat spring 44 may be designed to allow fingers 104 to react to the contour of the scraping surface and lock in an attack configuration to enable efficient cleaning and avoid deformation due to excessive flexion. Applied pressure from handle 4 may be concentrated at finger tips 112 of fingers 104, to either create an effective scraping force or to gather debris.

Figure 31A:
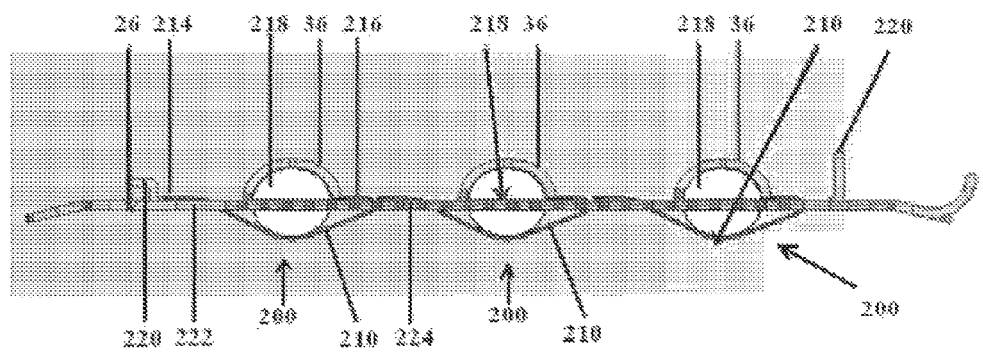
FIG. 31(a) is a side view of one embodiment of a chainmail abrader attached to a modular frame component.
Figure 31B:
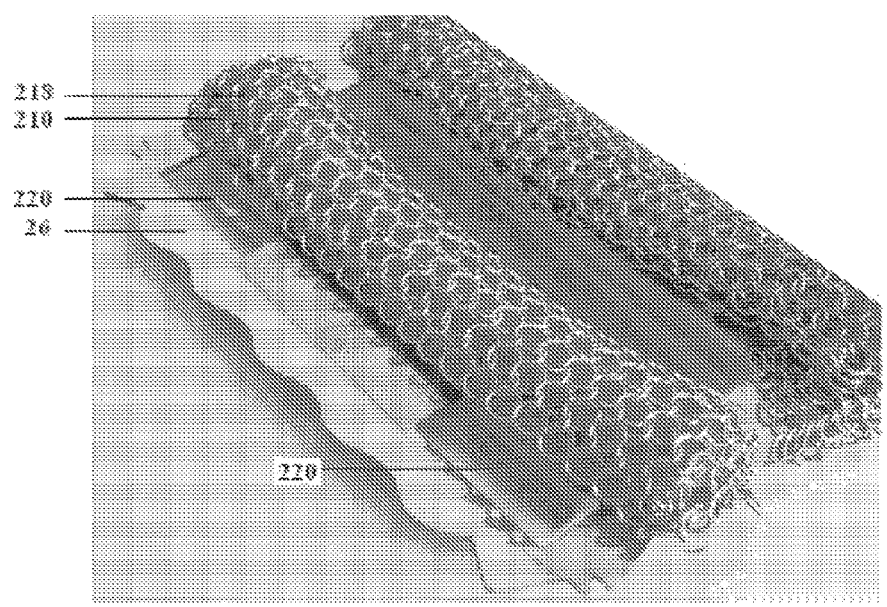
FIG. 31(b) is a perspective bottom view of a portion of the chainmail abrader of FIG. 31(a).

As shown in the exemplary embodiments of FIGS. 31(*a*)-31(*b*) spring abrader 12 may be configured as one or more chainmail abraders 200 designed to enable fine microcleaning of a surface. Chainmail abrader 200 has a flexible chainmail body 210 constructed from a plurality of interlinked rings 212 that form a flexible and abrasive surface area and may be attached to modular frame component 26, frame 16 or housing 6. Chainmail abrader 200 may further include one or more back pressure means 218 adapted to apply pressure against an upper surface of chainmail body 210 so as to conform chainmail body 2010 to a curved or multiplaner surface to be cleaned. Chainmail abrader 200 therefore is capable of conforming to the contours of a surface to be cleaned and applying a sufficient amount of force to remove debris without scratching, marring or otherwise damaging a surface.

Chainmail body 210 can have any shape, dimension, and configuration suitable for scraping and removing substance from a surface. As shown in FIG. 31(*b*), chainmail body 210 is constructed from a plurality of flexible and interlinked or interconnected rings 212. Each ring 212 may be linked with two or more, three or more, four or more or five or more adjoining rings 212 to form a single layer of chainmail material. In the exemplary embodiment of FIG. 31(*b*), each ring 212 is interlinked with four adjoining rings 212 to form a single chainmail layer having a rectangular configuration. Optionally, chainmail body 210 may include two or more connected chainmail layers, wherein all or select rings 212 of two adjoining chainmail layers may be interconnected. For example, the rings 212 positioned along a perimeter, along specific central points or along lines that traverse a central region of a chainmail layer may be interconnected with corresponding rings 212 of an adjoining upper and/or lower chainmail layer.

By virtue of the fact that two adjoining interlinked rings 212 are movable relative to one another, two or more portions of chainmail body 210 are free to move in different directions relative to one another. While one portion of chainmail body 210 may be flexed to abrade an upper surface of a grate bar, an adjacent portion may be extended and used to abrade the adjacent sides of the grate bar. In an exemplary embodiment portions of chainmail body 210 may be free to move backwards, forwards and from side to side. This design allows chainmail abrader 200 to achieve a high degree of flexibility.

Rings 212 can have any suitable shape, dimensions or surface texture. Exemplary rings 212 may be circular or oval in configuration, having a diameter of about 1 to about 2 mm and a thickness of about 0.021 inches to about 0.025 inches. In one embodiment, two or more rings 212 may have the same or different shape or dimensions. Additionally, the surface of ring 212 can be textured to further facilitate abrasion. Preferably, ring 212 may have a plurality of abrasive elements 28 suitable for abrading a surface and removing substances, particularly entrained carbonized material heat sealed to a surface. Abrasive elements 28 may be formed on ring 212 using any conventional means, including sandblasting, pitting, etching, coating, acid dipping, otherwise texturing or combinations thereof. Abrasive elements 28 may vary in size, shape, configuration and angular orientation. In one embodiment, ring 212 may have two or more abrasive elements 28 having different sizes, shapes, configurations and/or angular orientations. These abrasive elements may be uniformly arranged or randomly dispersed on any surface of ring 212 and chainmail body 210. Abrasive elements 28 may be formed along the entire surface of ring 212 or may be formed on select portions of ring 212, including an upper ring surface, lower ring surface, outer ring side surface, inner ring side surface, or combinations thereof. For example, in one embodiment, the upper surface of ring 212 or chainmail body 210 may be smooth while abrasive elements 28 are formed on lower ring surface, outer ring side surface, inner ring side surface, or combinations thereof so that at least abrasive elements 28 are positioned on a lower surface of chainmail body 210. Additionally, it may be possible to modify the appearance of rings 212 by sandblasting, pitting, etching, coating, acid dipping, otherwise texturing rings 212. For example, sandblasting may be used to turn select rings or the entire chainmail body 210 grey, while acid treating may be used to shine rings 212 and chainmail body 210.

Rings 212 may be fabricated from any suitable material, such as metals, metal alloys, plastics and ceramics, for removing debris. Exemplary materials include stainless steel, copper, other metals or metal alloys, carbon fibers, or combinations thereof. Preferably, rings 212 are made from 304 stainless steel. In one embodiment, the material of ring 212 and configuration of chainmail body 210 is designed to prevent or avoid scratching or marring a surface to be cleaned.

A back pressure means 218, positioned between chainmail body 210 and a surface of housing 6, frame 16 or modular frame component 26, is designed to support and apply an appropriate amount of pressure against an upper surface of chainmail body 210 to induce chainmail body 210 to assume a stretched, extended position conforming to the shape of a surface to be cleaned.

In one embodiment, back pressure means may be a plurality of rigid plugs, such as a plurality of steel ball bearings. By virtue of the movement of the individual steel ball bearings relative to one another, chainmail body 210 is able to flexibly conform the shape of a surface to be cleaned. As the scraper assembly moves over a surface, the steel ball bearings move relative to one another dynamically conforming to the changes in the surface terrain. The plurality of rigid plugs are sized such that they cannot pass through the aperture formed by rings 212 or any apertures formed by interconnected rings 212. This prevents the rigid plugs from passing through chainmail body 210. Rigid plugs may be retained in an enclosure formed between chainmail body 210 and a surface of housing 6, frame 16 or modular frame component 26. In one embodiment, the rigid plugs are free to move about the enclosure and directly contact chainmail body 210. In an alternative embodiment, the rigid plugs are encased within a container, such as one or more rubber or cloth sacks, which are positioned within the enclosure formed between chainmail body 210 and a surface of housing 6, frame 16 or modular frame component 26. The container may facilitates the removal, cleaning and replacement of back pressure means 218.

In another embodiment back pressure means 218 is an elastic member that is flexible, resilient, resists deformation and has the ability to resiliently conform to the contours of a surface to be cleaned and maintains an appropriate amount of pressure against chainmail body 210 to abrade the surface without scratching, marring or otherwise damaging a surface. When back pressure means 218 is configured as an elastic member, chainmail abrader 200 is able to achieve a high degree of flexibility and chainmail body 210 mimics the flexibility and resilience of the underlying elastic member. Because the elastic member is resilient and flexible, it does not permanently deform upon encountering a resistive force applied against a lower surface of chainmail body 210 by the surface to be cleaned. Exemplary elastic members may include springs, such as a coiled springs, wire form springs or flat springs; elastomeric materials, preferably elastomeric foams or rubber materials such as silicone; any of the spring abraders 12 of the present application, such as flat springs 44 or coiled springs 42.

In one embodiment, back pressure means 218 is a resilient, substantially water resistant, silicone structure. The silicone structure may be configured as a single silicone block or a plurality of small elastic plugs, such as silicone balls. When configured as a plurality of elastic plugs, each individual plug may be independently movable relative to one another. This enables greater flexibility and allows the chainmail body 210 to better conform to a surface to be cleaned. In this embodiment, the elastic plugs should have a size greater than the apertures of rings 212 or any apertures formed by rings 212 to ensure that the plugs do not pass through chainmail body 210. The elastic plugs may free move about an enclosure formed between chainmail body 210 and a surface of housing 6, frame 16 or modular frame component 26. Alternatively, the elastic plugs may be encased within a container, such as one or more rubber or cloth sacks, which are positioned within the enclosure formed between chainmail body 210 and a surface of housing 6, frame 16 or modular frame component 26. This container may facilitates the removal, cleaning and replacement of back pressure means 218. When the elastic plugs are used with the wire cloth body 410, described below, the plugs have a size greater than the apertures formed by the wire ropes of wire cloth body 410. In one embodiment, the silicone structure may have a shore hardness of about 30 to about 70 shore and may be operable over a range of about −20° F. to about 400° F. Preferably, water absorption is about 5% or less than the weight of the silicone structure.

In another embodiment, back pressure means 218 is configured as a coiled spring having the same construction, configuration and mechanical properties as coiled spring 42. In one embodiment, the spring constant of the coiled spring is about 1 kN/m to about 15 kN/m, preferably about 2.2 kN/m to about 15 kN/m, more preferably about 5 kN/m to about 15 kN/m. In another embodiment, the spring constant of the coiled spring is about 1 kN/M to about 8 kN/m. Alternatively, the coiled spring may have a variable spring rate.

When back pressure means 218 is a wire rope coiled spring, it may have the same construction, configuration, and mechanical properties, including the same flexibility and resilience, as wire rope coiled spring 301. In this embodiment, the wire rope coiled spring is preferably constructed from one or more strand 50, wherein each strand 50 has about seven wires 49 or more, more preferably, about nineteen wires 50 or more. In one embodiment, the spring constant of the wire rope coiled spring is about 15 N/m to about 90 kN/m, preferably, about 15 N/m to about 60 N/m, more preferably, about 30 N/m to about 60 N/m, more preferably, about 30 N/m to about 45 N/m and most and most preferably, about 30 N/m to about 35 N/m. Alternatively, the wire rope coiled spring may have a variable spring rate.

Chainmail body 210 wraps around one or more back pressure means 218, wherein a first end 214 of chainmail body 210 and an opposing second end 216 of chainmail body 210 are mounted to a surface of housing 6, frame 16, modular frame component 26 or combinations thereof. First end 214 and second end 216 of chainmail body 210 may be attached to housing 6, frame 16, or modular frame component 26 using any suitable fastening means. For example, chainmail body 210 may be attached to a surface of scraper head 2 via threaded means, such as rivets, screws and bolts; cords; sewing; crimping; welding; staples; pins; or adhesives, such as industrial epoxy. In one embodiment, rings 212 positioned along a perimeter of chainmail body 210 may be crimped so as to conform to an edge of and enable snap or friction fitted attachment to a mounting surface. In another embodiment, first end 214 and second end 216 of chainmail body 210 may be attached to a mounting surface using wires or cords that are coupled to the housing and also threaded through the perimeter rings 212 of chainmail body 210, creating a drawstring action that encase back pressure means 218.

Chainmail body 210 may be integrally formed with or more preferably, removably attached to housing 6, frame 16, modular frame component 26 or combinations thereof in order to facilitate cleaning and replace worn or broken chainmail. Preferably, modular frame component 26 coupled to chainmail abrader 200, may be removably coupled to scraper assembly 100, enabling modular frame component 26 and chainmail abrader 200 to be used as part of scraper assembly 100 and also as an independent hand held scraping tool. Preferably, a handle may be attached to an upper surface of modular housing component 26 to facilitate use as a separate hand held scraper. The detachability of these components further facilitates cleaning and the replacement of scraper assembly 100 parts.

FIG. 31(*a*) shows a chainmail abrader 200 and modular frame component 26 that can be removably attached to any surface of frame 16, including ledge 20 and/or strut 18, or other surface of housing 6 via fasteners 220. Modular frame component 26 has a similar configuration to the modular frame component 26, shown in FIGS. 1(*a*)-1(*b*); in this embodiment, modular frame component 26 has an enlarged central opening 34, the width of which is bridged by three plates 36 arranged in a row and spaced apart from one another in a parallel configuration. Plates 36 are configured as elongated semi-cylindrical struts that are elevated relative to the modular frame surface surrounding opening 34. The lower surface of plate 36 forms an elongated semi-cylindrical concave cavity for receiving back pressure means 218, which is preferably configured as an elastic member, such as a cylindrical sponge, an elastomeric foam or rubber material, such as silicone. As shown, scraper assembly 100 includes three chainmail abraders 200 attached to modular frame component 26 and wrapped around a lower surface of the back pressure means 218 positioned within a concave semi-cylindrical cavity of plate 36. Specifically, a first end 214 and second end 216 of chainmail body 210 are mounted to two surfaces of modular frame component 26 spaced apart from one another and positioned on opposite sides of a plate 36. As shown first end 214 of chainmail body 210 is fixed to a first upper surface 222 of modular frame component 26. Chainmail body 210 extends through opening 34 adjacent to one side of plate 36 and around a lower surface of the back pressure means 218. Second end 216 of chainmail body 210 extends upwards through opening 34 positioned on the opposite side of plate 36 and is attached to a second upper surface 224 of modular frame component 26 on the opposite side of plate 36. As shown in FIG. 31(*a*), each of the three chainmail abraders 200 are attached to frame component 26 in this same manner as described above.

Figure 32A:
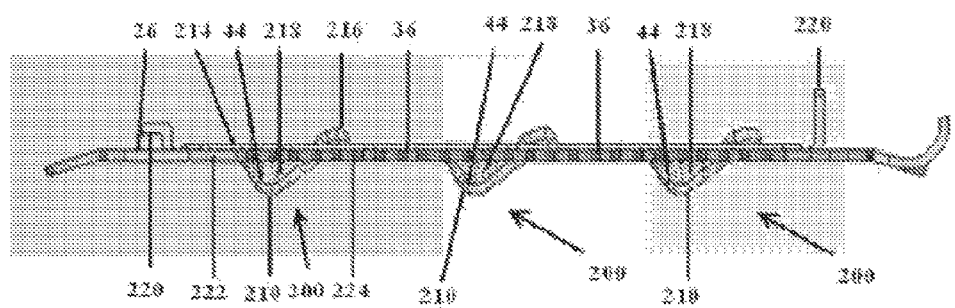
FIG. 32(a) is a side view of another exemplary chainmail abrader attached to a modular frame component.
Figure 32B:
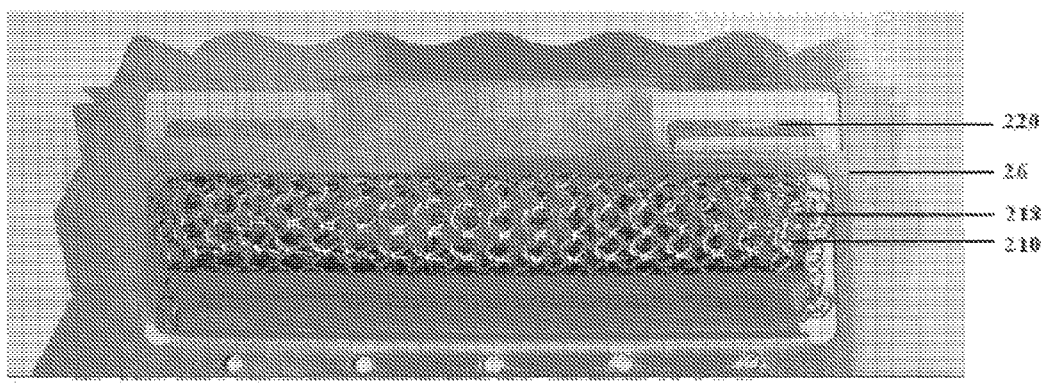
FIG. 32(b) is a perspective bottom view of a portion of the chainmail abrader of FIG. 32(a).

FIGS. 32(*a*)-32(*b*) shows an alternative embodiment, wherein chainmail abrader 200 and modular frame component 26 can be removably attached to any surface of frame 16, including ledge 20 and/or strut 18, or other surface of housing 6 via fasteners 220. Modular frame component 26 has a similar configuration as the modular frame component 26 shown in FIG. 30(*c*). In this embodiment modular component 26 has an enlarged central opening 34, the width of which is bridged by two elongated planar plates 36 arranged in a row and spaced apart from one another in a parallel configuration. The leaf spring configured flat springs 44, as shown in FIGS. 39(*a*)-30(*f*), are attached to modular frame component 26 such that both the first end 91 and second end 92 of segments 99 are fixed to modular frame component 26 in the same manner as shown in FIGS. 30(*a*)-30(*f*). Covering a lower surface of flat spring 44 is chainmail abrader 200. Specifically, a first ends 91, 214 and second ends 92, 216 of flat spring 44 and chainmail body 210 are mounted to two opposing surfaces of modular frame component 26 separated by an opening 34. As shown, first ends 91, 214 of flat spring 44 and chainmail body 210 are fixed to a first upper surface 222 of modular frame component 26 that is either adjacent to an edge of modular frame component 26 or plate 36. Flat spring 44 and chainmail body 210 extends down, through opening 34, traverses its width, and extends up through opening 34 where second end 216, 92 are attached to a second upper surface 224 of modular frame component 26. In this embodiment, flat spring 44 is back pressure means 218 and provides back pressure to chainmail body 210. As shown in FIG. 32(*a*)-32(*b*), each of the three chainmail abraders 200 are attached to frame component 26 in this same manner as described above.

Figure 33A:
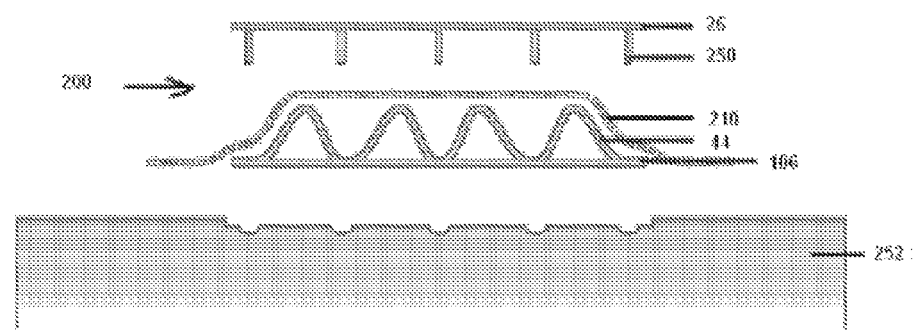
FIG. 33(a) is a schematic diagram showing a means for mounting the chainmail abrader to a modular frame component and a stapling means for bending the retaining pins of a modular frame component to retain the chainmail body over a cantilever type flat spring back pressure means.
Figure 33B:
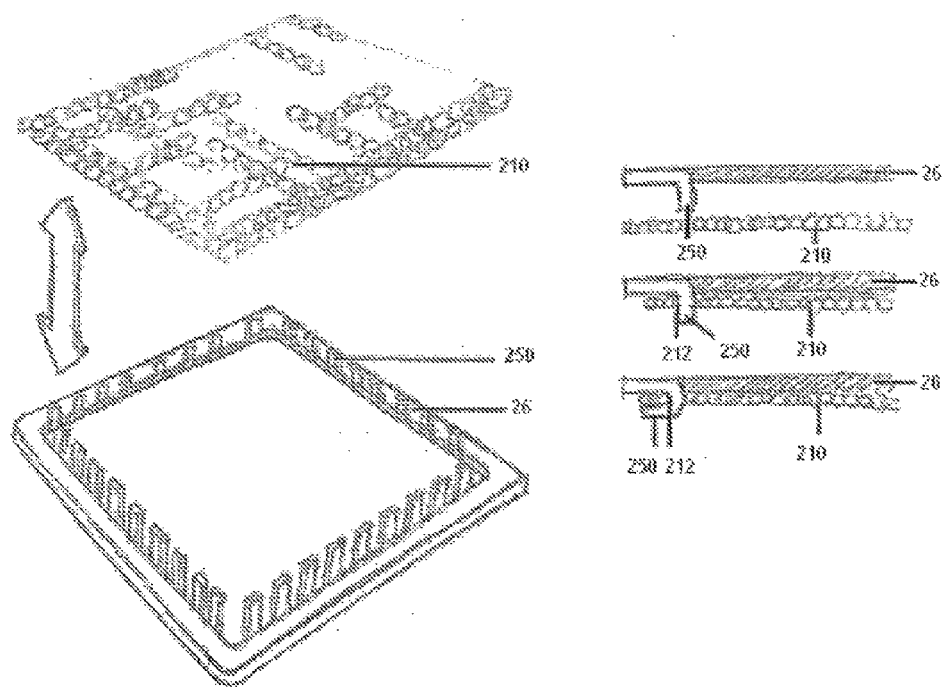
FIG. 33(b) is a schematic diagram showing the chainmail body of FIG. 33(a) hooked onto and locked by the pins of a modular frame component.
Figure 33E:
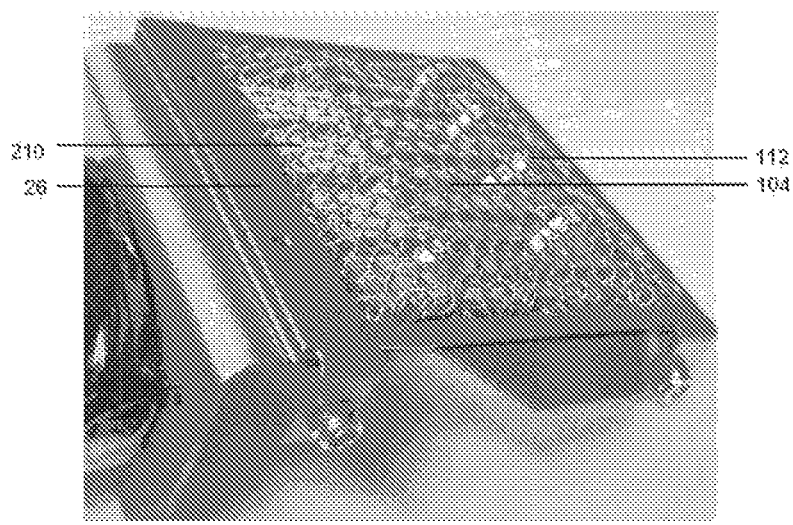
FIG. 33(e) is a perspective bottom view of the assembled mounting means of FIG. 33(a).

In the embodiment, shown in FIGS. 33(*a*)-33(*e*), chainmail body 210 may be attached to pins 250 integrally positioned along the perimeter of modular frame component 26. As shown in FIG. 33(*a*)-33(*c*), pins 250 are oriented substantially perpendicular to a planar, perimeter surface of modular frame component 26 surrounding opening 34. A base 106, to which is attached a plurality of modified cantilever type flat springs 44 is shown in FIG. 33(*c*). The modified cantilever type flat springs 44 having a plurality of fingers 104 with free upward bending tips 112. A plurality of holes positioned along the perimeter are adapted to receive and be coupled to modular frame component pins 250. When base 106 is coupled to modular frame component 26, pins 250 extend through the holes in base 106 and hinged fingers 104, covered by chainmail body 210 extends through opening 34. As shown in FIG. 33(*b*), rings 212 along a perimeter of chainmail body 210 are hooked over pins 250. Pins 250 are subsequently bent or otherwise deformed to lock rings 212 in position between pins 250 and base 106, or alternatively modular frame component 26. The modular frame component 26 may then be removably coupled to frame 16, as shown in FIGS. 33(*d*)-33(*e*) using conventional fasteners, such as by screwing together one or more surfaces of modular frame component 26 to frame 16. Preferably, as illustrated in FIGS. 33(*d*)-33(*e*), modular frame component 26 and frame 16 may include outward extending flanges that may be coupled to one another using screws.

As shown in FIG. 18(a), to facilitate attachment, chainmail body 210 may be stapled to a mounting surface. This process involves pressing frame 26 against base 106 and chainmail body 210, which is draped over flat springs 44. When assembled, the chainmail draped hinged fingers 104 pass through central opening 34. Modular frame component 26 is then pressed against a jig 252 that bends pins 250 extending through base 106 so as to securely couple modular frame 26 to base 106.

Figure 34A:
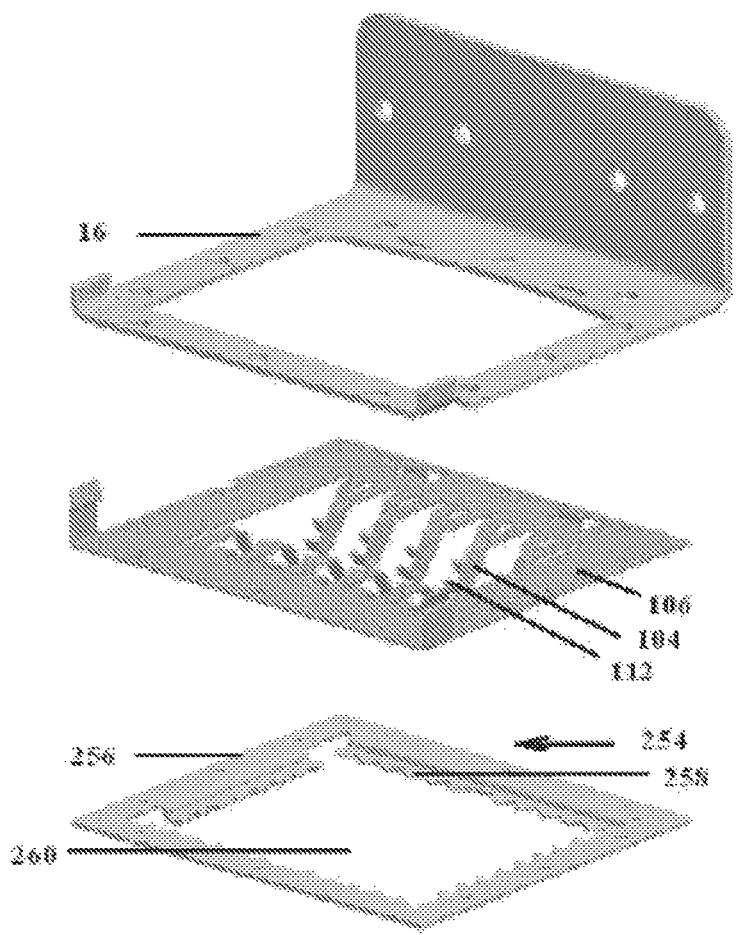
FIG. 34(a) is a schematic diagram showing a scraper head frame and an assembly for retaining a chainmail body between a cantilever type flat spring back pressure means and a positioning frame.
Figure 34B:
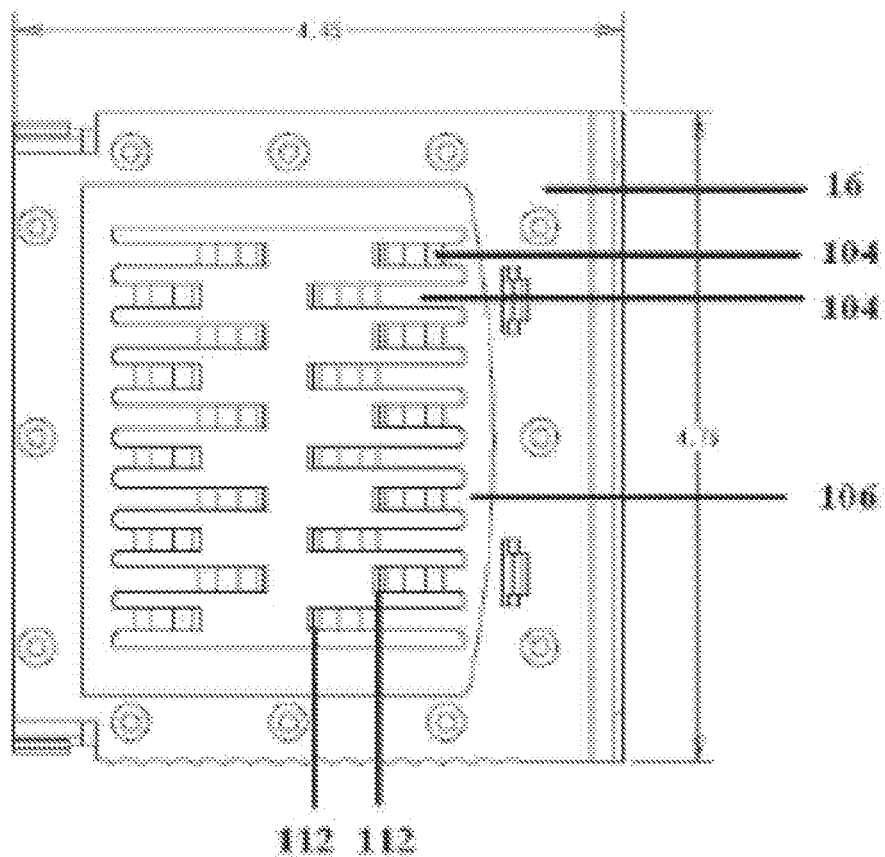
FIG. 34(b) is a bottom view of the assembly of FIG. 34(a).
Figure 34C:
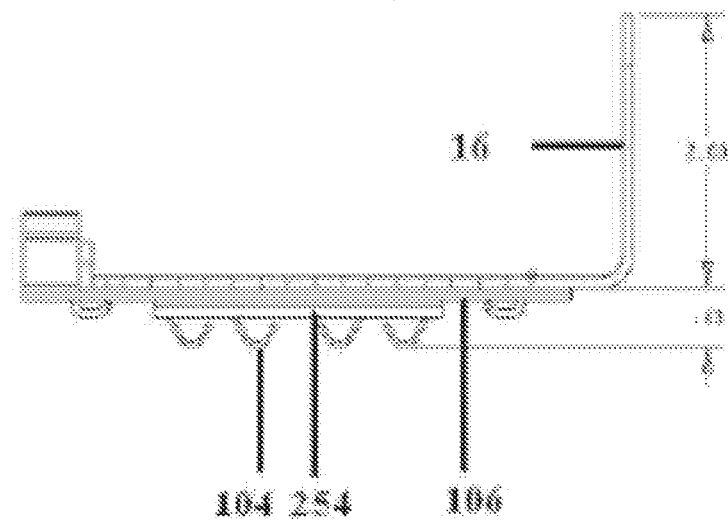
FIG. 34(c) is a side view of the assembly of FIG. 34(a).

In another embodiment, shown in FIGS. 34(a)-34(c), a positioning frame 254 may be used to attach chainmail body 210 to housing 6 or frame 16. Chainmail body 210 can be positioned over a lower surface of base 106, wherein the chainmail body 210 is draped over fingers 104, having upward bending tips 112, of a modified version of flat springs 44. As shown in FIG. 34(a), these upward bending tips 112 push against chainmail body 210 and resist deformation in a direction normal to tips 112. The chainmail body 210 is maintained in position relative to base 106 and fingers 104 with positioning frame 254. In this embodiment, positioning frame 254 is configured as a plate 256 having a central opening 260, the interior perimeter of which has an inwardly protruding toothed surface 258 for engaging and positioning chainmail body 210 between positioning frame 254 and base 106. The perimeter of plate 256 has a plurality of holes through which a threaded fastener, such as a screw, may be used to attach positioning frame 256 to base 106 and a surface of housing 6 or frame 16, wherein base 106 and a surface of housing 6 or frame 16, which have correspondingly positioned holes for receiving the threaded fastener.

Figure 35D:
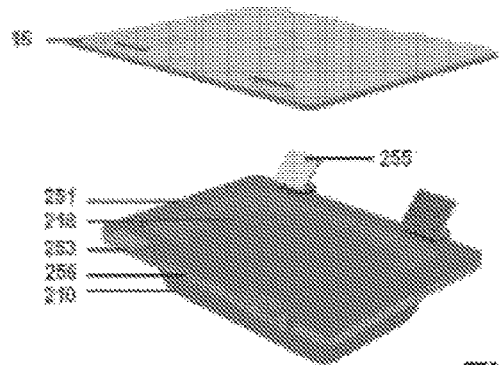
FIG. 35(d) shows the assembly of FIG. 35(a) once the back pressure means is positioned against the chainmail body and positioning frame.
Figure 35E:
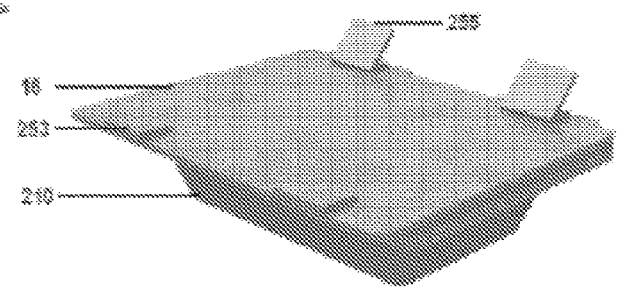
FIG. 35(e) shows the assembly of FIG. 35(a), wherein the chainmail abrader is clamped between the positioning frame and a mounting surface of the scraper assembly.
Figure 35F:
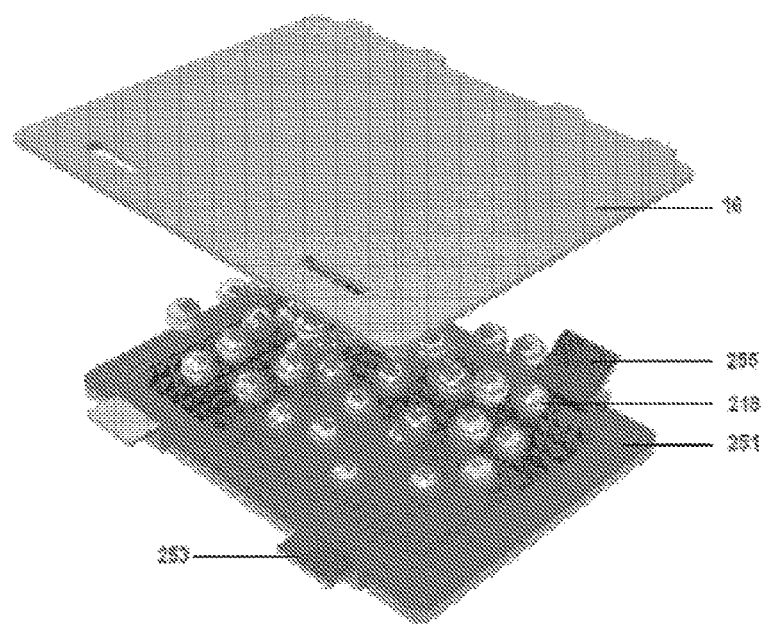
FIG. 35(f) shows the same assembly as illustrated in FIGS. 35(a)-35(f), with the exception that the backing system is a plurality of steel balls.

FIGS. 35(a)-35(e) show another attachment means for removably coupling chainmail abrader 200 to frame 16 of scraper assembly 100. To facilitate attachment and removal of chainmail abrader 200, the perimeter of chainmail body 210 is welded, adhesively bonded, embedded in or otherwise permanently fixed to a plastic rim 251 so as to form a rigid perimeter of chainmail body 210 and a central concave cavity for receiving back pressure means 218. In this embodiment, back pressure means 218 is preferably an elastic member, such as an elastomeric block that fills the concave cavity, as shown in FIGS. 35(a)-35(e). Alternatively, as shown in FIG. 35(f), back pressure means 218 may be a plurality of individual steel balls that are independently movable relative to one another. Alternatively, back pressure means 218 may be a plurality of elastomeric plugs that fill the concave cavity. A positioning frame 254 may be used to couple plastic rim 251 to frame 16. In this embodiment, positioning frame 254 is configured as a plate 256 having a central opening 260. Attached to an edge of plate 256 are a pair of snaps 253 and a pair of latches 255. The plastic rim 251 fixed to chainmail body 210 is positioned on and supported by plate 256, such that plastic rim 251 is nestled between the snaps 253 and latches 255 and back pressure means 218 is inserted through central opening 260. Latches 255 are then inserted through corresponding holes located in frame 6, and snaps 253 may be used to clamp positioning frame 254 to frame 16.

In operation, when pressure is applied from the handle, back pressure means 218 and the chainmail body 210 positioned around back pressure means 218 conform to the shape of the surface against which pressure is applied. As multiple portions of chainmail body 210 are free to simultaneously move in different directions and in different planes relative to one another, chainmail abrader 200 enables the removal of debris from multi-planar and curved surfaces.

When back pressure means 218 is configured as an elastic member, chainmail body 210 resiliently and flexibly conforms to the surface to be cleaned. Upon release of pressure from handle 4, the elastic member returns to its initial expanded state with chainmail body 210 stretched there across. The flexible and resilient nature of the elastic member resists permanent deformation and allows chainmail body 210 to conform to a surface to be cleaned.

As shown in the exemplary embodiments of FIGS. 36-39(b) spring abrader 12 may also be configured as one or more wire cloth abraders 400 designed to enable fine microcleaning of a surface. Wire cloth abrader 400 has a flexible wire cloth body 410 constructed from a plurality of woven, knit or otherwise interconnected wire ropes that form a flexible and abrasive surface area. Flexible wire cloth body 410 may be attached to modular frame component 26, frame 16 or housing 6, thereby forming wire cloth abrader 400. Optionally, wire cloth abrader 400 may further include one or more of the above described back pressure means 218 that support flexible wire cloth body 410. Wire cloth abrader 400 is preferably designed as a highly flexible, resilient structure capable of conforming to the contours of a surface to be cleaned and capable of applying a sufficient amount of force to remove debris without scratching, marring or otherwise damaging a surface.

Figure 36:
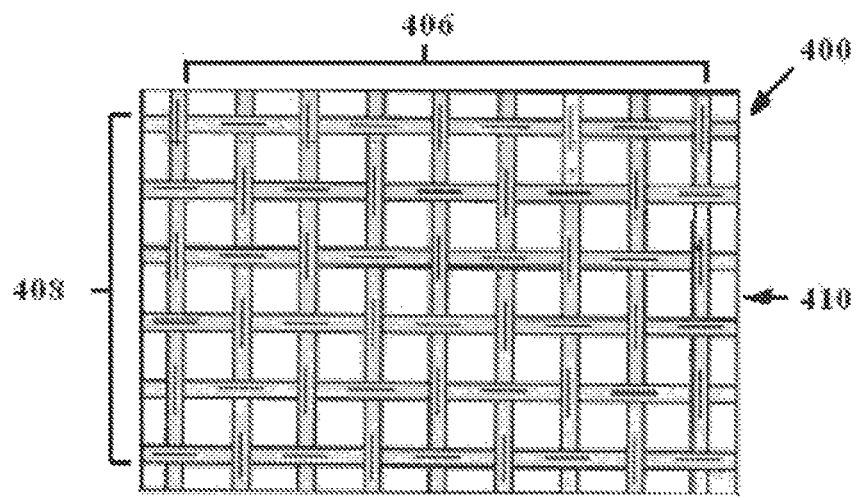
FIG. 36 is a top view of a flexible wire cloth body showing a wire rope weave pattern.
Figure 37:
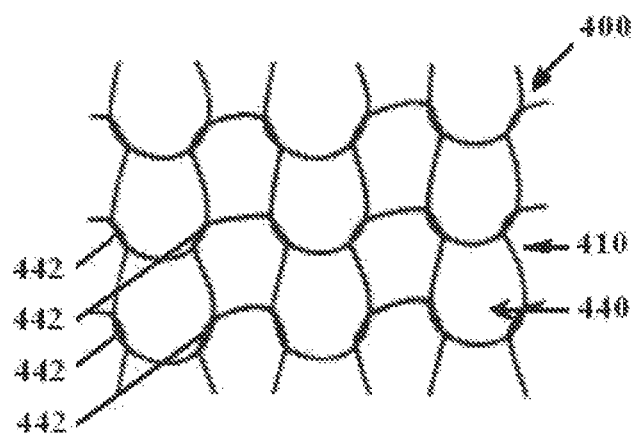
FIG. 37 is a top view of a flexible wire cloth body showing a wire rope knit pattern.

Flexible wire cloth body 410 can have any shape, dimension, and configuration suitable for scraping and removing substance from a surface. As shown in FIGS. 36-37, flexible wire cloth body 410 is constructed from weaving, knitting or otherwise interconnecting a plurality of wire ropes. This structure and configuration of wire cloth abrader 400 is designed to enhance the resilience, flexibility and strength.

Wire ropes may be woven, knitted or otherwise interconnected to form flexible wire rope body 410 using any conventional method or pattern. The number of wire ropes and how they are woven or knitted together to construct flexible wire cloth body 410 may be dependent upon the intended application of wire cloth abrader 400.

FIG. 36 shows one exemplary weave pattern wherein wire ropes are interwoven in a criss-cross pattern. As shown, the weave pattern includes two sets of wire ropes substantially perpendicularly oriented with respect to one another. The first set 406 of wire ropes are woven over and under each of the wire ropes of the second set 408 in a repeating pattern.

Another embodiment, shown in FIG. 37, illustrates an exemplary knit pattern wherein the wire ropes are connected in a loose series of interlocking loops 440 constructed from wire rope. In this embodiment, each wire rope is configured to have a repeating series of U and inverse U shapes. Two wire ropes are connected such that their respective U formations and inverse U formations interlock to form loops 440, wherein each loop 440 is connected to four adjacent loops 440 at four opposing corner points 442.

Wire cloth body 410 may have one or more wire cloth layers that may be coupled to one another. For example, in one embodiment, wire cloth body 410 may include two or more wire cloth layers that are adhesively attached, clamped, fused, sewn, woven or knitted together such that the two layers of wire cloth are interconnected along a perimeter thereof or substantially along the entire external surface of the two wire cloth layers. In another embodiment, wire cloth body 410 may be folded over itself to form two wire cloth layers. Where the wire cloth body 410 is folded over itself or where multiple wire cloth layers adjoin one another, the wire ropes forming this folded region or adjoining wire cloth layers may be connected to enhance flexibility, such as by fusing the wire ropes. This multilayer construction provides greater flexibility and abrasive properties for cleaning a surface. Wire cloth body 410 may therefore have one or multiple layers of wire cloth that may be attached to scraper head 2 and used with back pressure means 218.

In one embodiment, wire cloth body 410 may be constructed from wire rope, having the same or similar configuration, construction, material properties, mechanical properties and abrasive features as or used to form wire rope bristle 300. Consequently, wire cloth body 401 may have the same number, arrangement and diameter of strands 50 and/or wires 49 as that of wire rope bristles 300. Wire cloth body 410 and its strands 50 and wires 49 may also have the same contours, texturing and abrasive elements as that of wire rope bristles 300. In the present invention, any suitable number, configuration and arrangement of strand 50 and wire 49 may be used to form wire rope that would enable the wire cloth body 410 to flexibly bend in multiple directions and conform to the curved or multiplanar contours of a surface.

Wire rope, strand 50 and wire 49 may be constructed from any suitable metal or metal alloy material, preferably, aluminum or stainless steel. The selected material may be further tempered or manipulated to achieve the desired strength or flexibility properties suitable for constructing wire rope.

By virtue of the flexible woven or knitted configuration of wire cloth abrader 400, two or more portions of flexible wire cloth body 410 are free to move in different directions relative to one another. While one portion of flexible wire cloth body 410 may be retracted to abrade an upper surface of a grate bar, an adjacent portion may be extended and used to abrade the adjacent sides of the grate bar. In an exemplary embodiment portions of flexible wire cloth body 410 may be free to move backwards, forwards and from side to side.

A greater degree of flexibility can be achieved by wrapping a portion of flexible wire cloth body 410 around any of the previously described back pressure means 218. This design allows wire cloth abrader 400 to better conform to the surface being cleaned. Back pressure means 218, positioned between flexible wire cloth body 410 and a surface of housing 6, frame 16 or modular frame component 26, is designed to apply an appropriate amount of pressure against an upper surface of flexible wire cloth body 410 to induce flexible wire cloth body 410 to assume a stretched, extended position conforming to a surface to be cleaned. When back pressure system 218 is configured as an elastic member, the flexibility and resilience of back pressure system 218 enables it to resist permanent deformation, allow wire cloth body 410 to conform to the contours of a surface to be cleaned and maintain an appropriate amount of pressure against flexible wire cloth body 410 to abrade the surface.

Flexible wire cloth body 410 wraps around and is supported by one or more back pressure means 218 and is further mounted to a surface of housing 6, frame 16, modular frame component 26 or combinations thereof. In one embodiment, a first end 414 and opposing second end 416 of flexible wire cloth body 410 may be attached to housing 6, frame 16, modular frame component 26 using any suitable fastening means. For example, flexible wire cloth body 410 may be attached to scraper head 2 via threaded means, such as rivets, screws and bolts; cords; sewing; crimping; welding; staples; pins; or adhesives, such as industrial epoxy. In one embodiment, first end 414 and second end 416 of flexible wire cloth body 410 are attached to a mounting surface using wires or cords that are sewn or threaded through flexible wire cloth body 410 creating a drawstring action that encase back pressure means 218. Alternatively, flexible wire cloth body 410 may also be pinned to a mounting surface, wherein the pins formed along the edges of housing 6, may pass through flexible wire cloth body 410 and subsequently, upon bending the pin, lock flexible wire cloth body 410 to the mounting surface. Alternatively, the pins of modular frame component 26 or frame 16 may be configured as hooks for penetrating and latching onto a surface of flexible wire cloth body 410. In another embodiment, a seam is welded at, along a surface adjoining, or along a surface adjacent to a perimeter of flexible wire cloth body 410, including along an edge of second end 416 and an edge of first end 414. The seam functions to prevent wire rope from unraveling and to facilitate attachment to a mounting surface. In an exemplary embodiment, conventional fasteners, such as threaded fasteners, latches, snaps, adhesives, pins, may be positioned on a surface of the welded seam to facilitate attachment. Alternatively, these conventional fasteners may be directly attached to flexible wire cloth body 410.

Flexible wire cloth body 410 may be integrally formed with or removably attached to housing 6, frame 16, modular frame component 26. Preferably, modular frame component 26 and flexible wire cloth abrader 400, including flexible wire cloth body 410 and back pressure means 218, are removably connected to scraper assembly 100 to facilitate cleaning and replace damaged or worn wire cloths. Therefore, modular frame component 26 and wire cloth abrader 400 may be used as part of scraper assembly 100 or as an independent hand held scraping tool. Preferably, a handle may be attached to an upper surface of modular housing component 26 to facilitate use as a separate hand held scraper. The detachability of these components further facilitates the cleaning and replacing parts of scraper assembly 100.

Figure 38A:
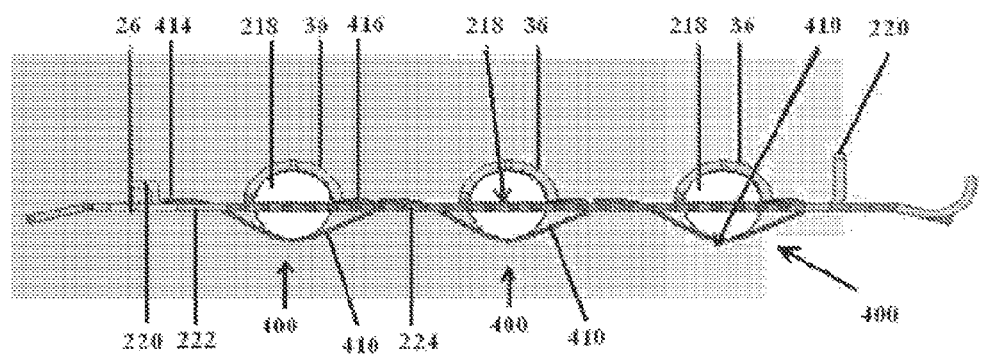
FIG. 38(a) is a side view of one wire cloth abrader embodiment attached to a modular frame component.
Figure 38B:
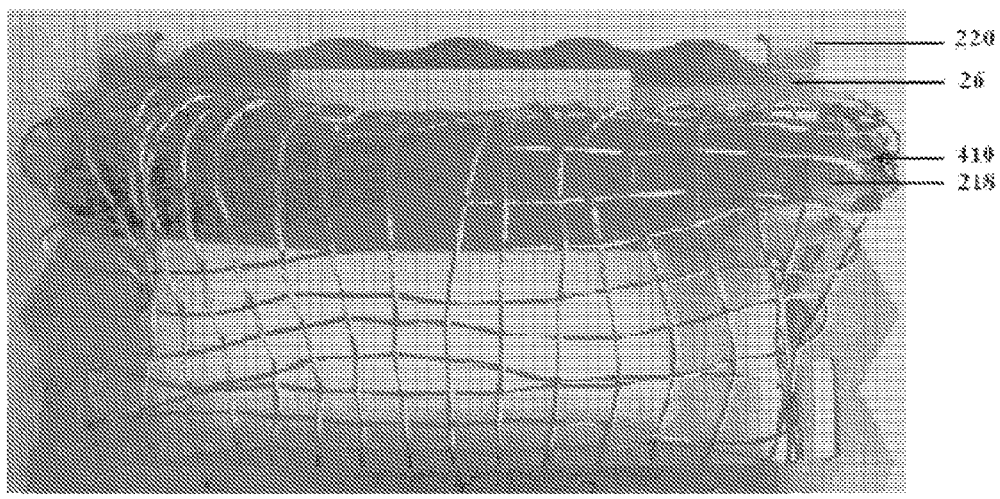
FIG. 38(b) is a bottom view of a portion of the wire cloth abrader of FIG. 38(a).

In the exemplary embodiment of FIGS. 38(*a*)-38(*b*), wire cloth abrader 400 and modular frame component 26 can be removably attached to any surface of frame 16, including ledge 20 and/or strut 18, or other surface of housing 6 via fasteners 320. In this embodiment, modular frame component 26 has a similar configuration to the modular frame component 26 shown in FIGS. 1(*a*)-1(*b*), which has an enlarged central opening 34, the width of which is bridged by three plates 36 arranged in a row and spaced apart from one another in a parallel configuration. Plates 36 are configured as elongated semi-cylindrical struts that are elevated relative to the modular frame surface surrounding opening 34. The lower surface of plate 36 forms an elongated semi-cylindrical concave cavity for receiving back pressure means 218, preferably configured as a cylindrical elastic sponge or cylindrical elastomeric material, such as silicone. As shown, scraper assembly 100 includes three wire cloth abraders 400 attached to modular frame component 26 and wrapped around a lower surface of a back pressure means 218 positioned within a concave semi-cylindrical cavity of plate 36. Specifically, a first end 414 and second end 416 of flexible wire cloth body 410 are mounted to two surfaces of modular frame component 26 spaced apart from one another and positioned on opposite sides of plate 36. As shown, first end 414 of flexible wire cloth body 410 is fixed to a first upper surface 322 of modular frame component 26. Flexible wire cloth body 410 extends through opening 34 adjacent to one side of plate 36 and around a lower surface of a back pressure means 218. Second end 416 of flexible wire cloth body 410 extends upwards through opening 34 positioned on the opposite side of plate 36 and is attached to a second upper surface 324 of modular frame component 26 on the opposite side of plate 36. As shown in FIGS. 38(*a*)-38(*b*), each of the three wire cloth abraders 400 are attached to frame component 26 in this same manner as described above.

FIGS. 39(*a*)-39(*b*) shows an alternative embodiment wherein wire cloth abrader 400 and modular frame component 26 are removably attached to any surface of frame 16, including ledge 20 and/or strut 18, or other surface of housing 6 via fasteners 320. As shown, modular frame component 26 has a similar configuration as the modular frame component 26 shown in FIG. 30(c). In this embodiment, frame component 26 has an enlarged central opening 34, the width of which is bridged by two elongated planar plates 36 arranged in a row and spaced apart from one another in a parallel configuration. Leaf spring configured flat springs 44, as shown in FIGS. 30(a)-30(f), may be attached to modular frame component 26 such that both the first end 91 and second end 92 of segments 99 are fixed to modular frame component 26 in the same manner as shown in FIGS. 30(a)-30(f). Attached to a lower surface of flat spring 44 is wire cloth abrader 400. Specifically, a first end 91, 414 and second end 92, 416 of flat spring 44 and wire cloth body 410 are mounted to two opposing surfaces of modular frame component 26 separated by opening 34. As shown, first end 91, 414 of flat spring 44 and flexible wire cloth body 410 are fixed to a first upper surface 322 of modular frame component 26 that is either adjacent to an edge of modular frame component 26 or plate 36. Flat spring 44 and flexible wire cloth body 410 extends down and through opening 34, traversing its width, and extends up through opening 34 on an opposite side of plate 36, where second end 416, 92 are attached to a second upper surface 324 of modular frame component 26. In this embodiment, flat spring 44 is back pressure means 218 and provides back pressure to flexible wire cloth body 410. As shown in FIGS. 39(a)-39(b), each of the three wire cloth abraders 400 are attached to frame component 26 in this same manner as described above.

In an one embodiment, wire cloth abrader 400 may be coupled to any surface of frame 16, including ledge 20 and/or strut 18, or other surface of housing 6 using the attachment means and system shown in FIGS. 33(a)-35(d), wherein the chainmail body 210 is replaced with wire cloth body 410.

In operation, when pressure is applied from the handle, back pressure means 218 and the flexible wire cloth body 410 positioned around elastic member 218 conform to the shape of the surface against which pressure is applied. As multiple portions of flexible wire cloth body 410 are free to simultaneously move in different directions and in different planes relative to one another, wire cloth abrader 400 enables the removal of debris from multi-planar and curved surfaces.

When back pressure means 218 is configured as an elastic member, wire cloth body resiliently conforms to the shape of the surface being cleaned. Upon release of pressure from handle 4, the elastic member returns to its initial expanded state with wire cloth body 410 stretched there across. Therefore, the flexibility and resilience of elastic member prevents flat spring 44 from permanently deforming.

As demonstrated by the exemplary embodiments of FIGS. 1(a)-1(b) and 40(a)-40(d), scraper head 2 may include any combination of the above discussed spring abraders 12, namely spring bristles 40, coiled springs 42, flat spring 44, chainmail abrader 200 and wire cloth abrader 400. Additionally, removable modular frame component 26 may be used to replace and/or exchange spring abraders 12 to enable a wide variety of applications. These various spring abraders 12 may be arranged in rows, staggered or otherwise spaced apart relative to one another in order to prevent the debris build-up and facilitate cleaning of the scraper assembly. Additionally, removable modular frame component 26 may be used to replace and/or exchange spring abraders 12 to enable a wide variety of applications.

To facilitate operation, spring abrader 12 may be attached to a power source, such as a motor, that may automate the cleaning process. In one embodiment, the motor may be used to motorize the entire head. The power source may be capable of imparting motion to select or all elements comprising scraper head 2, modular frame 26, frame 16 and/or spring abrader 12. In an exemplary embodiment, the power source may adjust, orient, angle, rotate, twirl, bend or otherwise impart motion to spring bristle 40. Similarly, it may be capable of adjusting, orienting, angling, rotating, or otherwise imparting motion to coiled spring 42, chainmail abrader 200 or wire cloth abrader 400. In another exemplary embodiment, it may also adjust, orient, angle or otherwise impart motion to flat spring 44, chainmail abrader 200 or wire cloth abrader 400. The power source may also selectively impart motion to individual spring bristles 40, coiled springs 42, flat spring 44, chainmail abrader 200, wire cloth abrader 400 or any combination thereof. Alternatively, power may be supplied to automate a group of spring abraders 12. The power source may be built into the handle 4 and/or scraper head 2. Alternatively, the power source may be a removable attachment that may be inserted between scraper head 2 and handle 4. The power source may also be used to power other features of scraper assembly 100 including lights or other electronic equipment attached thereto.

Scraper assembly 100 may further include a handle 4 having any configurations suitable for efficiently transferring an applied force to scraper head 2. Handle 4 may be designed to ergonomically facilitate gripping, effectively orient scraper head 2 relative to a surface and enhance the pressure applied to a surface. In the simplest design, handle 4 may be a surface of scraper head 2 that a user may grip.

As shown in the exemplary embodiment of FIG. 40(a), handle 4 may have an elongated handle shaft 118 having a distal handle end 120 designed to fit within a palm. In an exemplary embodiment, handle 4 may have a length of at least 10 inches, preferably, at least 12.5 inches and most preferably, at least 14 inches to enhance leverage. Handle shaft 118 may further have a gripping means 122, such as finger grips, notches, grooves, indentations, contouring or any combination thereof to facilitate gripping. Additionally, one or more surfaces of handle 4 may be covered with an elastomeric overmolding 124 to provide additional comfort and prevent slippage. Handle 4 may also include a mounting hole 126 that enables scraper assembly 100 to hang from any hook.

Handle 4 may be fabricated from any material including metal, plastic, such as a thermoplastic, ceramic or any combination thereof. In an exemplary embodiment, handle 4 may be fabricated from ABS plastic.

Figure 41:
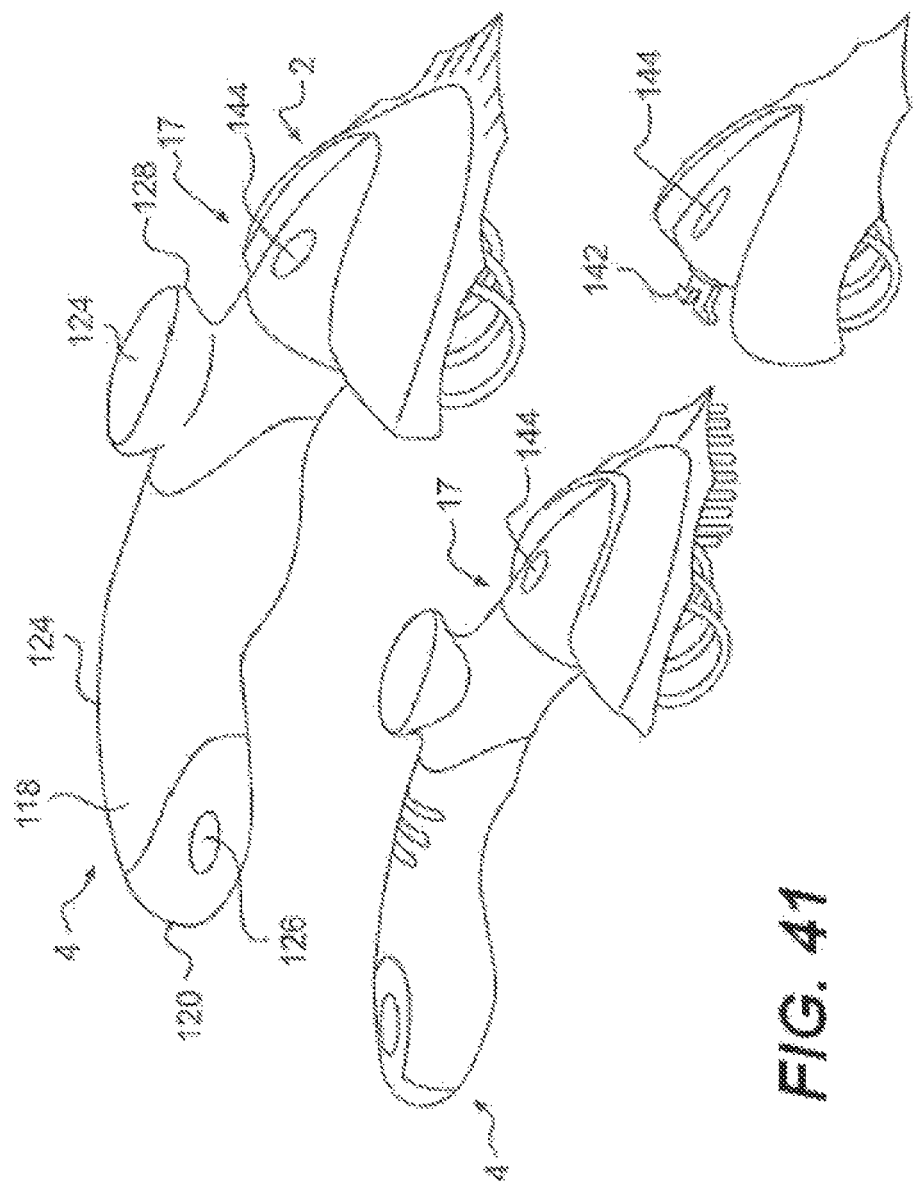
FIG. 41 is a perspective view showing a palm handle in accordance with an embodiment of the present invention.

In another exemplary embodiment shown in FIG. 41, handle 4 may further include a palm handle 128, which may be located at any point along elongated handle shaft 118. In an exemplary embodiment, palm handle 128 is adjacent to scraper head 2. Palm handle 128 may be enlarged and/or covered with an elastic overmolding 124 to facilitate gripping. Palm handle 128 may serve as an additional or alternative means for gripping the scraper assembly 100 and may be designed to further optimize the amount of force applied to a surface to be cleaned. Scraper assembly 100 may be effectively wielded to clean a surface by either gripping palm handle 128 with one hand, gripping a portion of elongated handle shaft 118 with one hand, or gripping both palm handle 128 and handle shaft 118. Additionally, palm handle 128 may also serve as a barrier to prevent a user's hand from slipping down handle shaft 118 towards the surface being cleaned.

Figure 43:
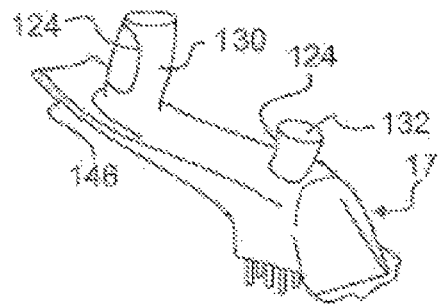
FIG. 43 is a perspective view showing a pistol grip handle in accordance with an embodiment of the present invention.
Figure 42:
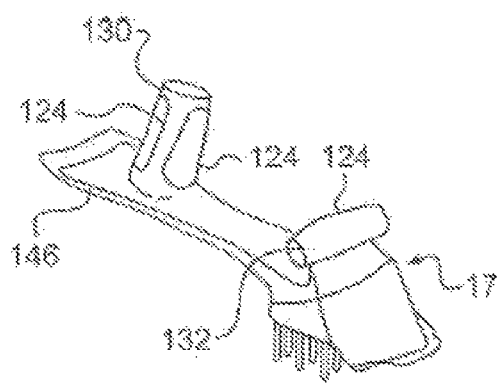
FIG. 42 is a perspective view showing a palm handle in accordance with an embodiment of the present invention.

As shown in the exemplary embodiments of FIGS. 42-43, handle 4 may have a pistol grip configuration including a rear handle member 130 and a front handle member 132. In FIGS. 42-43, rear handle member 130 may be a cylindrical protrusion that a user may grasp with one hand. In an alternative exemplary embodiment of FIG. 44, rear handle member 130 may have an aperture 134 to receive a user's fingers to facilitate grasping. Front handle member 132 may have a knob or enlarged head configuration. Additionally, front handle member 132 may be ergonomically tilted and configured to facilitate gripping and application of pressure. The user's other hand may be placed on front handle member 132 to control the direction of scraper assembly 100 and further apply force to a surface. In an exemplary embodiment, one or more surfaces of handle members 130 and 132 may have gripping means 122 and/or elastic over molding 124 to prevent slippage and provide additional comfort. In an exemplary embodiment, rear handle member 130 may be ergonomically tilted away from a heat source to protect a user's wrist.

Figure 45:
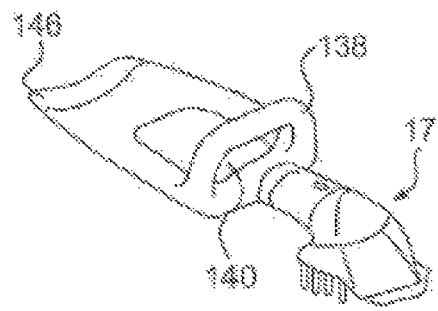
FIG. 45 is a perspective view showing a frame handle in accordance with an embodiment of the present invention.
Figure 44:
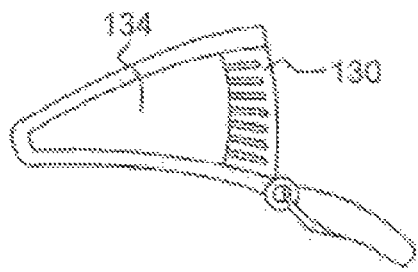
FIG. 44 is a perspective view showing a rear handle member in accordance with an embodiment of the present invention.
Figure 46:
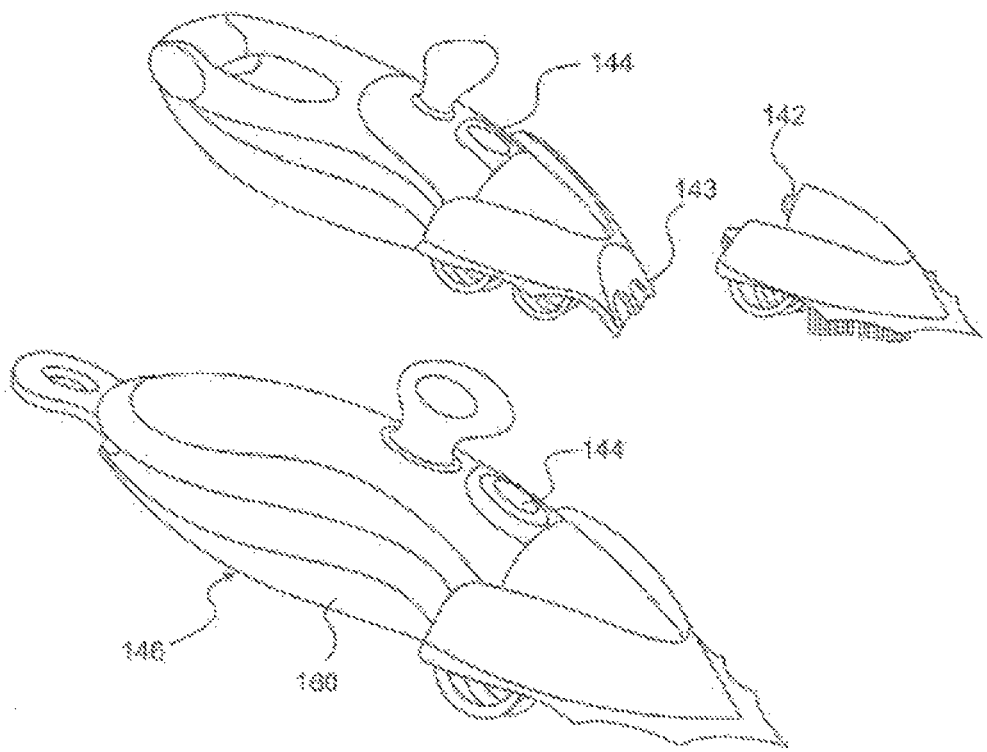
FIG. 46 is a perspective view showing a removable handle and scraper head in accordance with an embodiment of the present invention.

In the alternative exemplary embodiment of FIG. 45, handle 4 may have a handle frame 138 with an opening 140 for receiving a user's fingers. Handle frame 138 may be sized to enable one or two handed gripping.

The various handles of the present invention may be designed to maximize the amount of force applied to effectively clean a surface while reducing the amount of stress and effort required by a user. Handle 4 may be efficiently designed to provide comfort, power and control during operation. Additionally, the ergonomic design of handle 4 allows a user to grip the scraper assembly 100 with one hand or apply pressure with two hands.

Handle 4 may be integrally or removably attached to scraper head 2. In the exemplary embodiment shown in FIGS. 42 and 46, scraper assembly 100 of the present invention may be a modular device and may include multiple interchangeable handles 4 and scraper heads 2. By interchanging handles 4 and scraper heads 2, scraper assembly 100 may be capable accommodating wide variety of surfaces. Furthermore, the ability to replace scraper head 2 or a component thereof may further increase the durability scraper assembly 100.

Handle 4 may be removably attached to scraper head 2 using any standard fastening means 142 and corresponding mating feature 143, such as a snap junction, a male/female connector, a threaded mechanism or any combination thereof. In an exemplary embodiment, fastening means 142 is a male/female modular docking mechanism that enables handle 4 to be removably attached to scraper head 2 by pressing button 144.

In addition to the aforementioned features and components of scraper head 2 and handle 4, scraper assembly 100 of the present application may further include a number of optional features, such as a hand shield 146, a sweep brush 148, a liquid dispenser 150, a light 152, a thermometer 154 and power source 158. These features are designed to improve the cleaning capability of the scraper assembly 100 and may be operable with any of the above embodiments of scraper head 2 and handle 4.

As shown in the exemplary embodiment of FIGS. 40(*a*), 42-43, 45-47, one or more hand shields 146 separating a user's hand from a surface being cleaned may be mounted to scraper head 2 and/or handle 4. Hand shield 146 may be removably attached to or integral with the scraper head 2 and/or handle 4. In an exemplary embodiment, hand shield 146 may comprise one or more flanges 156. In an exemplary embodiment, hand shield 146 may comprise one or more flanges 160, preferably a plurality of flanges 160, that extend away from the body of scraper head 1 and/or handle 4. Flanges 160 may function as a heat sink to expel heat. As shown in FIG. 40(*a*), hand shield 146 may include a plurality of stacked or overlapping flanges.

Hand shield 146 and flange 160 may extend from or may be attached to any portion of scraper head 2 and/or handle 4. In an exemplary embodiment, hand shield 148 may be configured to encase a portion or the entire length of user's hand and/or forearm. As shown in FIGS. 42-43 and 45-46, hand shield 146 may be formed along and extend away from a perimeter of handle 4 and/or scraper head 2. Hand shield 146 may extend along a portion or substantially the entire length of the perimeter of handle 4 and/or scraper head 2.

Figure 47:
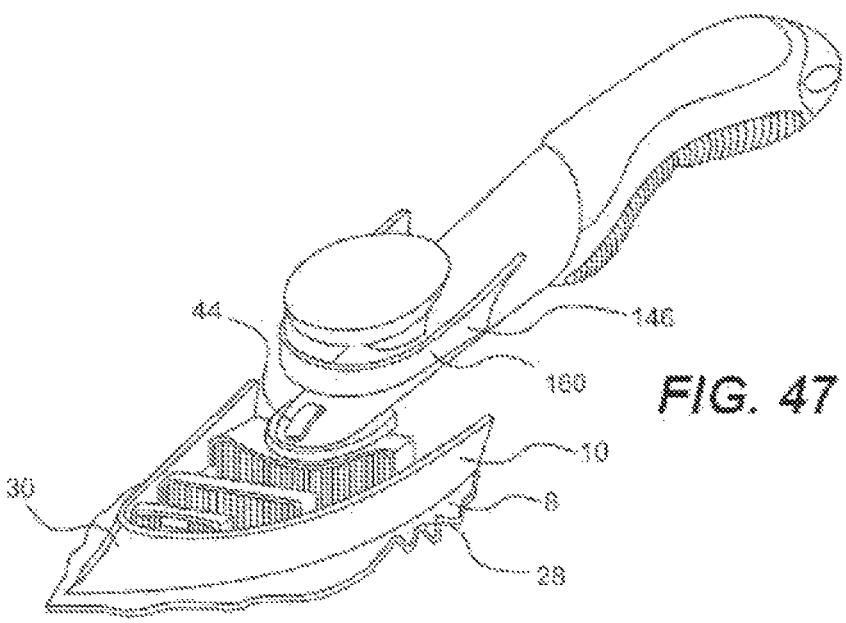
FIG. 47 is a perspective view showing a handle with a heat shield in accordance with an embodiment of the present invention.
Figure 48:
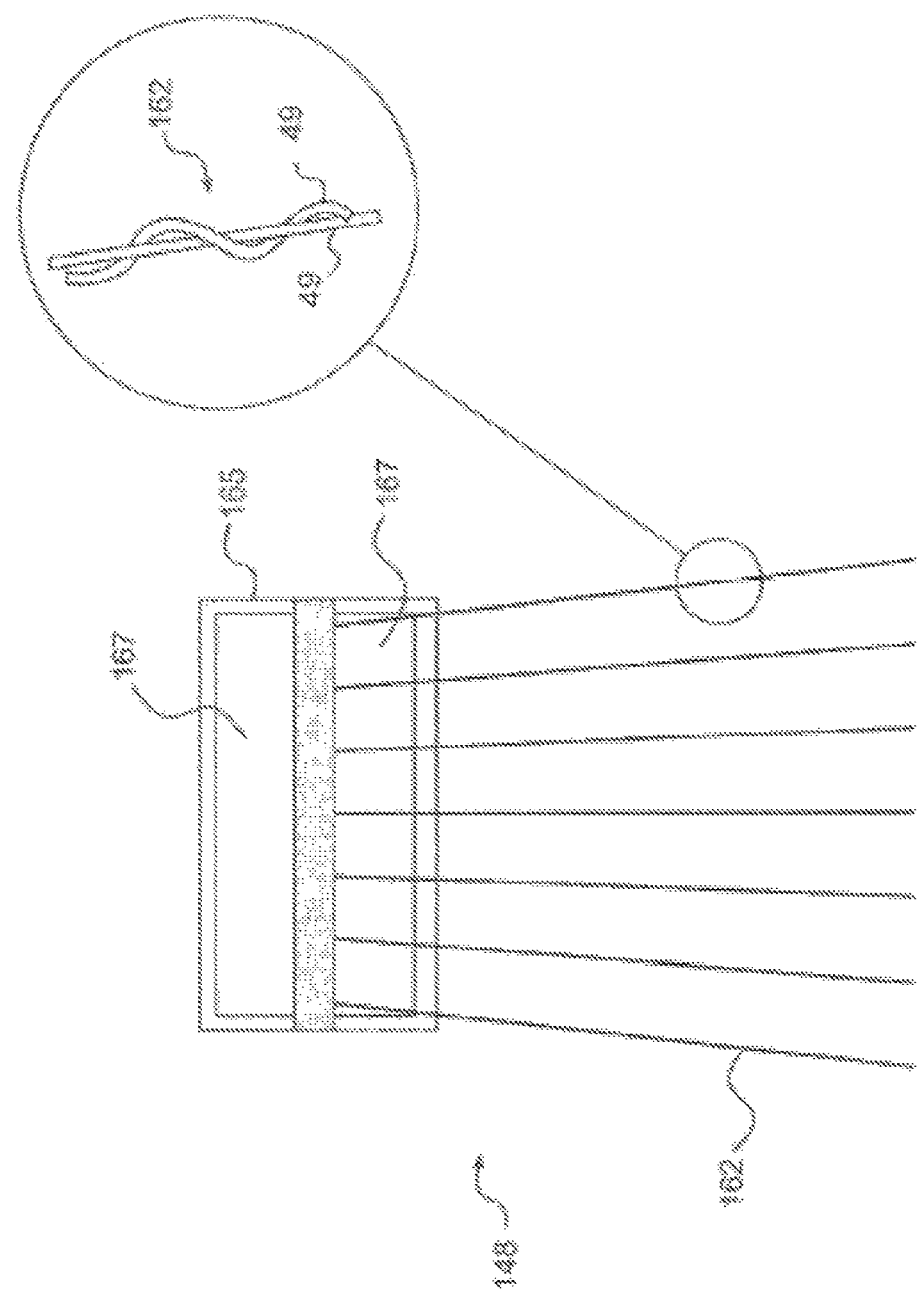
FIG. 48 is a schematic diagram and close up view showing a brush sweep in accordance with an embodiment of the present invention.

In an exemplary embodiment, scraper assembly 100 may include multiple hand shields 146 or multiple flanges 160 that surround hand gripping portions of handle shaft 118, such as handle end 118, palm handle 128, pistol grip components 130, 132, handle frame 138 or any combination thereof. These flanges 160 may function as heat sinks to dissipate heat. As shown in FIG. 47, hand shield 146 may substantially surround one or more structures of handle 4, such as palm grip 128, or scraper head 2.

Hand shield 146 may be constructed from any suitable material capable of protecting a user's hand from dislodged debris and severe heat, such as metal, plastic, ceramic or any combination thereof. In an exemplary embodiment, hand shield 146 may be constructed from a thermally insulated material such as a thermoplastic. In another exemplary embodiment, hand shield 146 may be constructed from stainless steel.

Scraper assembly 100 may further include a sweep brush 148 that may function to remove and/or disperse residue dislodged by spring abrader 12, scraper blade 8, plow shield 10 or any combination thereof. Sweep brush 148 may include a plurality of sweep bristles 162 and a platform 165.

Sweep brush 148 may be constructed from a plurality of sweep bristles 162 having any suitable size, dimension or configuration. In an exemplary embodiment, sweep bristles 162 may have different lengths to accommodate multiplaner surfaces. In an exemplary embodiment, each sweep bristle 162 may incorporate a plurality of elements. In an exemplary embodiment each bristle may have any where between 1 to about 7 elements, such as strands 50, per bristle. Sweep bristles 162 may have a length of about 0.5 inches to about 5 inches and may have a diameter of about 0.0625 to about 0.25 inches. Sweep bristles may be thinly or thickly set. In an exemplary embodiment, sweep brush 148 may have about 12 wires that are widely spaced apart. Sweep bristles 162 may be arranged in one or more rows wherein sweep bristles 162 are offset, parallel, or splayed relative to one another to facilitate debris removal and cleaning of the scraper assembly. In an exemplary embodiment, sweep bristles 162 may be mounted with a directional bias to facilitate sweeping. Additionally sweep bristles may include a plurality of abrasive elements 28 positioned along a surface thereof, preferably on all 360 degree surfaces thereof.

In one exemplary embodiment, sweep bristles 162 may be constructed in the same manner as shaft 48. Sweep bristles are preferably constructed from wire rope, having the same or similar structure, configuration, material composition and properties as wire rope bristle 300. In this embodiment, sweep bristles 162 are preferably a braided and contoured wire rope. Sweep bristles 162 may be strong and highly flexible wires. The ends of sweep bristles 162 may be sealed, splayed out, flattened or blunted, such as by applying a material coating. The ends of the wires may bend upon contacting a surface.

In another exemplary embodiment, sweep bristles 162 may be strong, flexible pins, which are pre-threaded, contoured or otherwise textured so as to have a substantially 360° degree abrasive surface area. The relative thickness and dimension of the pin may be similar to a standard pin or sewing needle.

In another exemplary embodiment, sweep bristles 162 may be an array of chains, preferably chains which have been contoured or otherwise textured so as to have a substantially 360° degree abrasive surface area. The suspended chains may be substantially strong and flexible to abrade a surface. In another exemplary embodiment, sweep brush 148 may be configured as a coiled spring. In one embodiment, it may have the same properties and characteristics as that of coiled spring 42 or spring tip 68. Moreover, sweep brush 148 and/or sweep bristles 162 may be configured to catch debris in only one direction in order to facilitate the removal of debris and cleaning of sweep brush 148.

In an exemplary embodiment, sweep bristles 162 may further have a spring suspension system have the same structure, configuration and material as suspension mechanism 46 to which any of the aforementioned configurations of sweep bristles 162 may be attached.

Sweep brush 148 and/or sweep bristles 162 may be mounted to a surface of housing 6, frame 16, modular frame component 26, handle 4 or any combination thereof. Sweep brush 148 and/or sweep bristles 162 may be located immediately behind, along a perimeter of or at a distance from spring abrader 12, scraper blade 8, plow shield 10 or any combination thereof.

In an exemplary embodiment, sweep bristles 162 may be attached to a platform 165 that may be detachable from scraper assembly 100, enabling the sweep brush 148 to function as an independent and separate brush. Platform 165, shown in FIG. 48, may have an open architecture including a plurality of openings 167 suitable for allowing the passage of debris therethrough. Further openings 167 may allow a user to flush water through platform 165, over sweep bristles 162 and onto a surface being cleaned. In an exemplary embodiment, platform 165 may have the same configuration as plate 36, modular frame 26 or a combination thereof. The platform may further including any conventional fastening mechanisms for mounting to frame 16, modular frame component 26 or any other surface of housing 6.

The sweep brush 148 may further include a moving frame that may be mounted to the platform to selectively immobilize a length of sweep bristles 162 and thereby control the stiffness of the sweep bristles 162. In an exemplary embodiment, the frame may be configured as a checkerboard with slots for individually receiving one or more sweep bristles. Additionally, the frame may also be used to clean sweep bristles 162. As it is raised and lowered against sweep bristles 162, it may be used to scrape away debris located on the sweep bristles.

Sweep brush 148 may be fabricated from any resilient flexible material that may enable efficient cleaning, such as metals, plastics, such as thermoplastics, ceramics or any combination thereof. In an exemplary embodiment, sweep bristles 162 may be constructed from flexible stainless steel spring wire. Additionally, sweep bristles 162 may be coated with a non-stick material, such as a non-toxic fluoropolymer resin or Teflon®, to prevent debris removed from a surface from adhering to the sweep bristles 162. In an exemplary embodiment, sweep bristles 162 may be composed of a material that is strong, sufficiently flexible to resist deformation, efficiently abrasive, rust resistant and fracture resistant.

Figure 49:
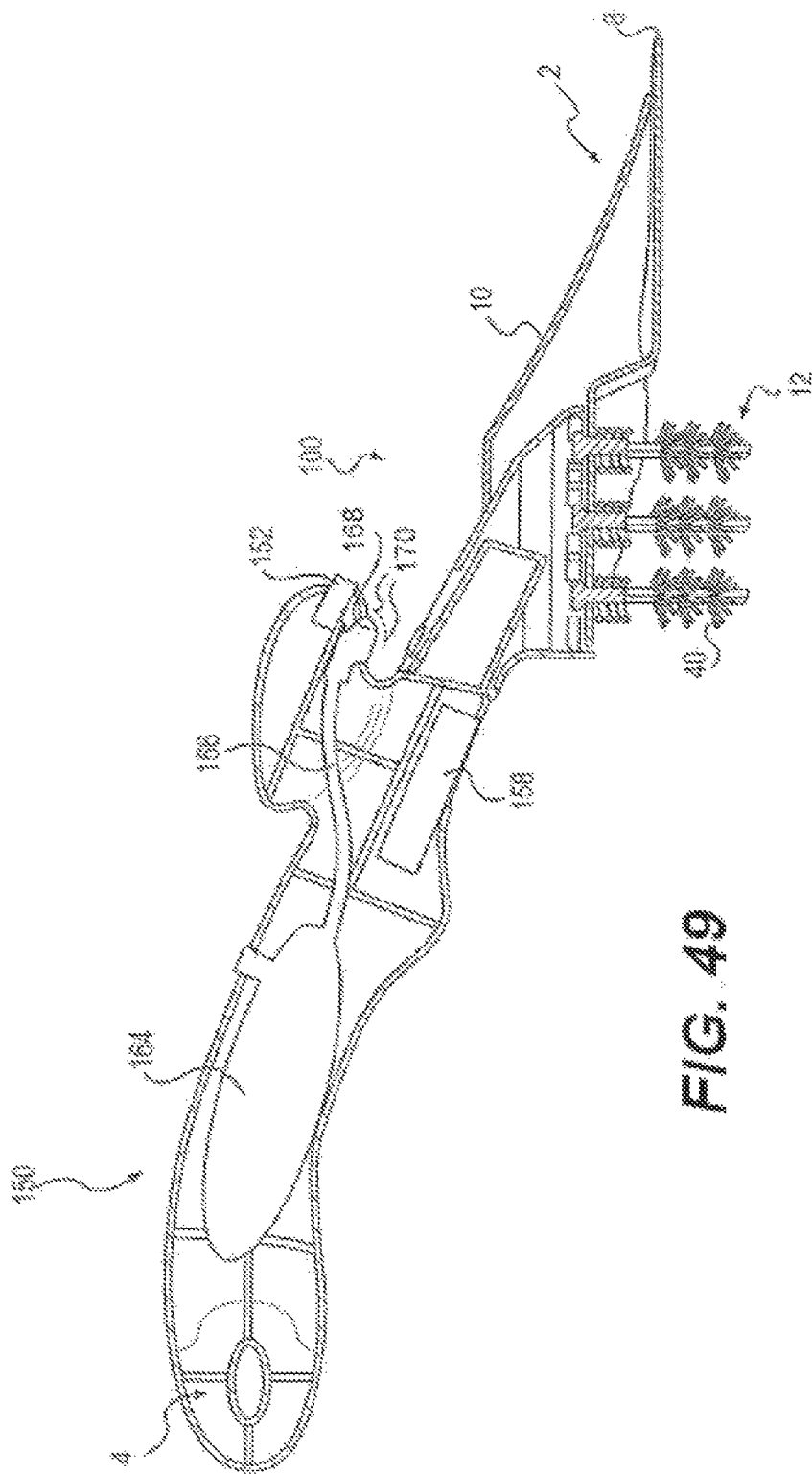
FIG. 49 is a cross-sectional view showing a liquid dispenser, light, thermometer and power source in accordance with an embodiment of the present invention.

As shown in FIG. 49, scraper assembly 100 of the present invention may further include a liquid dispenser 150 within handle 4. The interior of handle 4 may include a reservoir 164, capable of retaining and dispensing a liquid. Upon applying pressure, via a hand pump, to reservoir 164 in handle 4, a liquid is forced though channel 166 and exits spout 168, which may be located on scraper head 2 or handle 4. Alternatively, the liquid may be pressurized such that reservoir 164 may be connected to a pump or motor for automating release of the liquid. Release of the liquid may be activated by pressing a button on handle 4. The liquid may be water or any cleaning solution. In a preferred embodiment, the spout 168 may have a plurality of holes 170 of any size. The size of holes 170 may be adjustably selected, or holes 170 may have different sizes and dimensions. When the scraper assembly 100 is used to clean a hot surface, holes 170 may be sized such that the dispensed liquid is atomized and vaporizes prior to or upon contacting the hot surface. In an exemplary embodiment, holes 170 may be about 5 mm to about 1.3 mm. Additionally, the release pressure may be about 0.1 to about 10 psig to enable atomization. Therefore liquid dispenser 150 may be used to produce a fine liquid mist and/or steam for cleaning a surface. In another embodiment, holes 170 may be sized so that a substantial flow of liquid is released to facilitate cleaning. In a preferred embodiment, a user may be capable of viewing the liquid and/or steam being dispensed through the open housing design of housing 6.

As shown in FIG. 49, scraper assembly 100 may further include a light 152, such as an LED, to illuminate a surface during cleaning or and/or a thermometer 154 for gauging the temperature of the surface being cleaned. These devices may be mounted on either handle 4 or scraper head 2.

Also shown in FIG. 49 is a power source 158, preferably a thermoelectric transducer or other portable power source such as a battery, that may be used for powering light 152 or any other electrical devices incorporated in scraper assembly 100. In an exemplary embodiment, a thermoelectric transducer may be located on a surface of the scraper assembly 100 so as to be exposed to a heat source, such as a hot surface to be cleaned. The thermoelectric transducer may function to convert the rising heat to electrical energy, which may in turn be used to power or store energy for an electrical device mounted to scraper assembly 100.

The scraper assembly 100 of the present invention has a number of advantageous features that enable it to effectively and efficiently clean any surface, including grated surfaces, in a minimal number of passes. Specifically, its highly flexible components, open architecture, plow, plurality of abrasive elements, and adjustability allow for effective use in a wide variety of applications. The highly flexible and resilient nature of scraper blade 23, spring abrader 12, suspension systems or any combination thereof ensures that the surface being cleaned incurs minimal or no damage, scoring, or marring. Additionally, the flexibility and resilience of these components minimizes scraper assembly 100 wear and prevents fracturing or deformation of spring abraders 12.

Furthermore, an open housing prevents the accumulation of debris within the scraper assembly. By quickly guiding debris out of the scraper assembly, this open design facilitates debris removal and prevents clogging and premature degradation of spring abraders 12. Similarly, by enabling mass removal of debris removed by scraper edge 24, the plow also prevents the accumulation of debris within the scraper assembly.

The scraper assembly 100 may further include abrasive elements, such as scraper blade 23 and spring abraders 12, having a plurality of abrasive surfaces that enhance the cleaning efficiency of the scraper assembly. Furthermore, because the abrasive mechanisms and other elements of the scraper assembly 100 have numerous contact points, the applied force is more evenly distributed to a surface being cleaned, thereby preventing or minimizing damage to a surface being cleaned.

Moreover the scraper assembly 100 and one or more of its various components may be adjustable to accommodate a wide variety of surfaces and applications. For example, the scraper assembly 100 may include a number of interchangeable modular frame components 26 having different spring abraders 12, scraper heads 2, handles 4 adapted for different applications. The angle of orientation, elevation, and flexibility of spring abraders 12 may also be manually adjusted. Moreover, the scraper assembly 100 and its various components may be weatherproof, rustproof, dishwasher safe, easy to clean, ergonomically designed and easy to use.

The scraper assembly 100 of the present invention may be used for a wide variety of applications. In particularly, it may be specifically well suited for cleaning grated surfaces, particularly grated cooking surfaces, such as grills and ovens. In an exemplary embodiment, spring abraders 12 and the various other abrasive elements of the scraper assembly 100 may be capable of removing carbonized food residue entrained on a surface. Specifically, scraper assembly 100 may be effective for cleaning grills fabricated from various materials, such as cast iron, stainless steel, porcelain-coated cast iron, porcelain-coated steel, porcelain coatings, and chrome plating. Notably, the scraper assembly 100 of the present invention may capable of effectively removing debris without scoring, marring or otherwise damaging the surface of the grill bars or other grill surfaces. Additionally, because the components of the scraper assembly 100 may be coated with a non-stick material, such as a non-toxic fluoropolymer resin or Teflon®, debris removed from a surface does not adhere to and interfere with the functional components of the scraper assembly.

Scraper assembly 100 of the present invention may be configured as any scraper or brush for cleaning a surface. Exemplary brushes may include standard line wheel brushes having an arbor hole, knot wheel brushes, permanent plate wheel brushes, brush sections that can be used individually or ganged to make a wide face, centerless brushes for use on centerless brushing and grinding machines to remove grinding burrs and surface finishing, small rivet ring wheel brushes adapted for use with electric or air tools, cup brushes for use on electric or air tools, end brushes for use in portable tools and drill presses, twisted-in-wire brushes for hand held or power tool use, brush strips for use in customized brushes, cylinder brushes wound on a shaft core or tubing or conveyor cleaning brushes.

Although the scraper assembly 100 may be particularly well adapted for cleaning any grated surface, it may also be equally effective for cleaning, abrading, scraping, cutting a material from or removing a material from any surface. Scraper assembly 100 may further be used to shape, texture to or otherwise prepare a surface. The scraper assembly 100 of the present invention may be used on any surface, including wood; ceramic, such as porcelain, china and clay; metal; a plated surface or any combination thereof. It is envisioned that the scraper assembly 100 of the present invention may be used for conventional grinding, sanding, and/or polishing applications. In another embodiment, scraper assembly 100 may be used to remove wallpaper remover. The scraper assembly 100 may also be effective for various dental applications, such as cleaning tooth enamel.

Several embodiments of the present invention have been described herein. Nevertheless, it will be understood that various modifications may be made without departing form the spirit and scope of the invention. Accordingly, other embodiments are within the scope of the following claims.

What is claimed is:

1. A scraper apparatus, comprising:
   a handle; and
   a scraper head attached to an end of said handle, wherein the scraper head comprises:
      a frame; and
      a wire rope bristle arrangement for abrading a surface, wherein the wire rope bristle arrangement comprises a plurality of wire rope bristles attached to the frame and wherein the wire rope bristles each comprises one or more strands, wherein each strand comprises two or more wires,
      wherein each wire rope bristle has an elongated stem extending from the frame generally perpendicular to the frame, each wire rope bristle having a loop end forming an abrader surface at an end of the stem.

2. The scraper apparatus of claim 1, wherein at least one strand from the one or more strands comprises at least seven wires.

3. The scraper apparatus of claim 1, wherein at least one strand from the one or more strands comprises at least nineteen wires.

4. The scraper apparatus of claim 1, wherein the one or more strands comprises at least two strands.

5. The scraper apparatus of claim 1, wherein the one or more strands and two or more wires of each bristle are tightly wound at the loop end so that the loop end forms a unitary abrading element.

6. The scraper apparatus of claim 1, wherein the loop end is configured such that: one or more strands are loosely wound at the loop end such that the one or more strands at the loop end are independently movable relative to one another; or two or more wires are loosely wound at the loop end such that the two or more wires at the loop end are independently movable relative to one another.

7. The scraper apparatus of claim 1, where the wire rope bristles extend in parallel to one another and perpendicular to a mounting surface from which they extend.

8. The scraper apparatus of claim 1, wherein the wire rope bristles are spayed at a plurality of angles with respect to a mounting surface from which they extend.

9. The scrape apparatus of claim 1, wherein the wire rope bristles are attached to a modular frame component removably mounted to the frame.

10. The scraper apparatus of claim 1, further comprising a scraper blade and a curved plow surface disposed at an end of the scraper head.

11. The scraper apparatus of claim 1, wherein at least two of the wire rope bristles have a different arrangement of the one or more strands from one another.

12. The scraper apparatus of claim 1, wherein the plurality of bristles comprises at least two groups of bristles, each group comprising a plurality of bristles, and the two groups of bristles have different properties adapted for different cleaning applications.

13. The scraper apparatus of claim 12, wherein the bristles of one of the groups have greater flexibility than the bristles of the other group.

14. The scraper apparatus of claim 13, wherein the scraper head has a front end and a rear end, and wherein the group of bristles having greater flexibility is disposed more proximate to the front end of the head than the other group.

15. The scraper apparatus of claim 12, wherein the bristles of the two groups have a different arrangement of the one or more strands from one another.

16. The scraper apparatus of claim 15, wherein the different arrangement comprises a different number of strands per bristle and/or a different number of wires per strand.

17. A handheld scraper for scraping a grill or oven comprising:
   a handle;
   a scraper head disposed at an end of the handle; and
   a plurality of wire rope bristles extending from one side of said scraper head for abrading a surface,
   wherein the wire rope bristles each comprise two or more strands, wherein each strand comprises two or more metal wires, wherein the strands of each wire rope bristle are wound or coiled with respect to one another to form an elongated bristle stem extending for a majority of the length of said wire rope bristle, wherein each wire rope bristle has an abrading loop end formed at an end of the elongated bristle stem for abrading the surface, wherein at the loop end of each bristle the two or more strands and two or more wires of each bristle are tightly wound so that the loop end forms a unitary loop abrading element.

18. A handheld scraper for scraping a grill or oven comprising:
- a handle;
- a scraper head disposed at an end of the handle; and
- a plurality of wire rope bristles extending from one side of said scraper head for abrading a surface,
- wherein the wire rope bristles each comprises one or more strands, wherein each strand comprises two or more metal wires,
- wherein each wire rope bristle has an elongated bristle stem extending for a majority of the length of said wire rope bristle,
- wherein each wire rope bristle has an abrading loop end formed at an end of the elongated bristle stem for abrading the surface, the abrading loop end comprising a plurality of loop end abraders independently movable relative to one another.

19. The handheld scraper of claim 18, wherein two or more wires of the one or more strands of each wire rope bristle are loosely wound at the abrading loop end to form the plurality of loop end abraders independently movable relative to one another.

20. The handheld scraper of claim 18, wherein each wire rope bristle comprises two or more strands, the two or more strands tightly wound or coiled together to form said elongated bristle stem, the two or more strands being loosely wound at the abrading loop end to form the plurality of loop end abraders independently movable relative to one another.

21. The handheld scraper of claim 18, further comprising a scraper blade and a curved plow surface disposed at an end of the scraper head.

* * * * *